(12) United States Patent
Noda et al.

(10) Patent No.: US 7,221,641 B2
(45) Date of Patent: May 22, 2007

(54) SYNC FRAME STRUCTURE, INFORMATION STORAGE MEDIUM, INFORMATION RECORDING METHOD, INFORMATION REPRODUCTION METHOD, INFORMATION REPRODUCTION APPARATUS

(75) Inventors: Chosaku Noda, Kawasaki (JP); Hideo Ando, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 565 days.

(21) Appl. No.: 10/781,990

(22) Filed: Feb. 20, 2004

(65) Prior Publication Data

US 2004/0252606 A1 Dec. 16, 2004

(30) Foreign Application Priority Data

Feb. 21, 2003 (JP) ............... 2003-045054

(51) Int. Cl.
*G11B 7/00* (2006.01)

(52) U.S. Cl. .................. 369/275.3; 369/47.27

(58) Field of Classification Search ......... 369/47.27, 369/47.28, 59.25, 275.3, 44.26
See application file for complete search history.

(56) References Cited

U.S. PATENT DOCUMENTS 6,385,744 B1 * 5/2002 Ando et al. .............. 714/54

7,042,372 B2 * 5/2006 Weirauch .................. 341/51

FOREIGN PATENT DOCUMENTS

| EP | 0 825 603 A2 | 2/1998 |
| JP | 9-128907 | 5/1997 |
| JP | 2786810 | 5/1998 |
| JP | 11-66750 | 3/1999 |
| JP | 2002-260339 | 9/2002 |
| JP | 2002-260341 | 9/2002 |
| JP | 2002-373472 | 12/2002 |
| JP | 2003-59193 | 2/2003 |
| WO | WO 02/05277 A2 | 1/2002 |
| WO | WO 02/052558 A2 | 7/2002 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

To improve the sync code detection reliability while simplifying the sync code position detection process, when a first pattern as a combination of three successive sync codes is compared with a second pattern in which the allocation of sync codes is shifted by one code from the first pattern, two or more sync codes are changed.

4 Claims, 31 Drawing Sheets

Comparison of combination patterns (column direction) of successive sync codes (2)
— upon extending across guard area —

| Latest sync frame number | 00 | 01 | 02 | 03 | 04 | 05 | 06 | 07 | 08 | 09 | 10 | 11 | 12 |
|---|---|---|---|---|---|---|---|---|---|---|---|---|---|
| Sync code number two codes before | 1 | 1 | 0 | 1 | 1 | 2 | 1 | 2 | 2 | 3 | 1 | 3 | 3 |
| Sync code number one code before | 1 | 0 | 1 | 1 | 2 | 1 | 2 | 2 | 3 | 1 | 3 | 3 | 1 |
| Latest sync code number | 0 | 1 | 1 | 2 | 1 | 2 | 2 | 3 | 1 | 3 | 3 | 1 | 2 |
| Number of code changes between neighboring patterns | 2 | 2 | 2 | 2 | 3 | 2 | 2 | 2 | 3 | 2 | 2 | 2 | 3 |
| Number of code changes shifted by one frame | 2 | 2 | 2 | 1 | 1 | 2 | 3 | 2 | 2 | 2 | 3 | 3 | 2 |

| Latest sync frame number | 13 | 14 | 15 | 16 | 17 | 18 | 19 | 20 | 21 | 22 | 23 | 24 | 25 | PA |
|---|---|---|---|---|---|---|---|---|---|---|---|---|---|---|
| Sync code number two codes before | 1 | 2 | 3 | 2 | 2 | 1 | 3 | 1 | 1 | 3 | 2 | 3 | 3 | 2 |
| Sync code number one code before | 2 | 3 | 2 | 2 | 1 | 3 | 1 | 1 | 3 | 2 | 3 | 3 | 2 | 1 |
| Latest sync code number | 3 | 2 | 2 | 1 | 3 | 1 | 1 | 3 | 2 | 3 | 3 | 2 | 1 | 1 |
| Number of code changes between neighboring patterns | 3 | 2 | 2 | 2 | 3 | 2 | 2 | 2 | 3 | 2 | 2 | 2 | 2 | 2 |
| Number of code changes shifted by one frame | 2 | 2 | 3 | 2 | 2 | 2 | 3 | 2 | 2 | 2 | 3 | 3 | 3 | 2 |

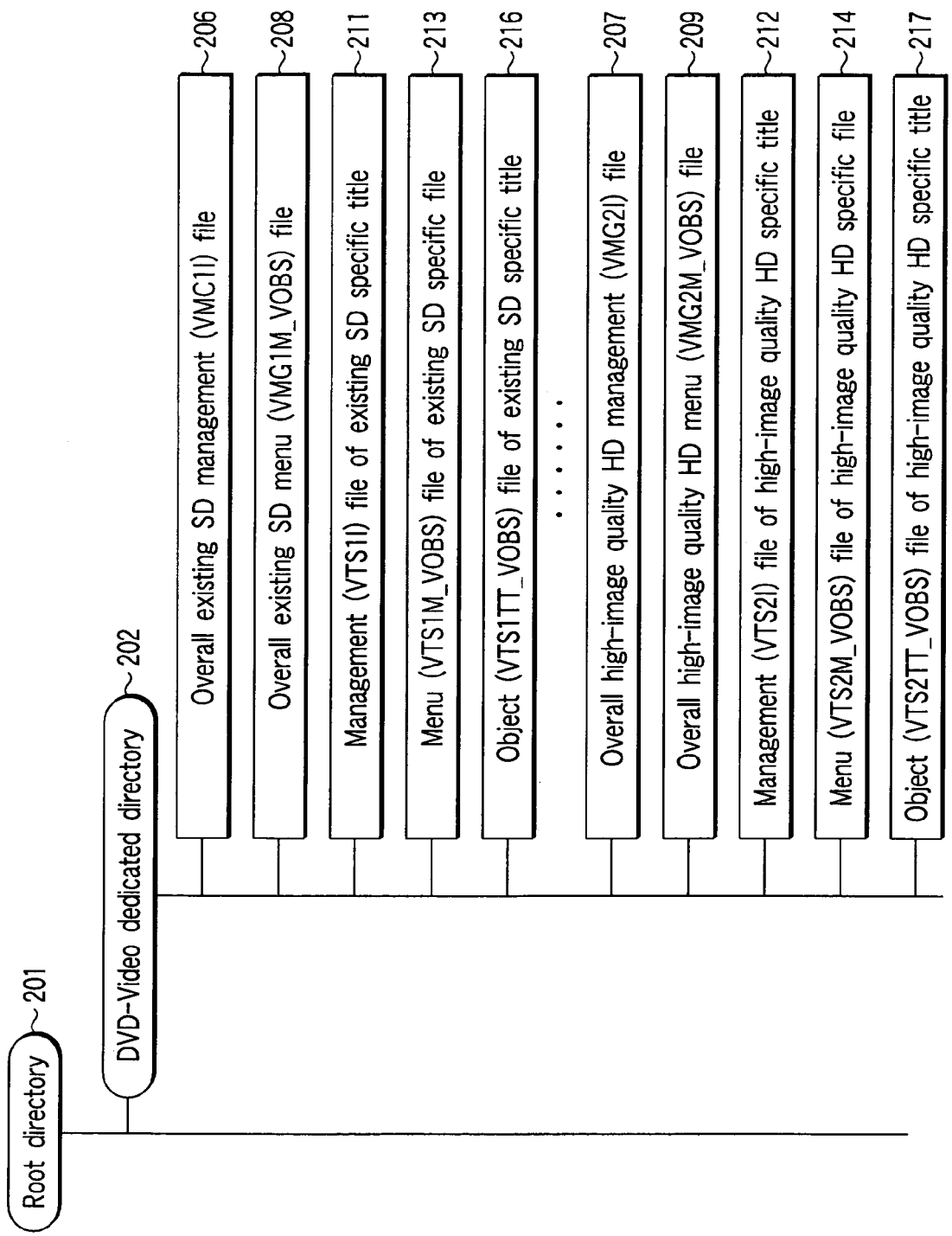
F I G. 1

Compression rule explanatory view (1)

| d0 d1 | d2 d3 |
|---|---|
| Number of successive pixels | Pixel data |

FIG. 4A

Compression rule explanatory view (2)

| d0 d1 | d2 d3 d4 d5 | d6 d7 |
|---|---|---|
| 0  0 | Number of successive pixels | Pixel data |

FIG. 4B

Compression rule explanatory view (3)

| d0 d1 d2 d3 | d4 d5 d6 d7 d8 d9 | d10 d11 |
|---|---|---|
| 0  0  0  0 | Number of successive pixels | Pixel data |

FIG. 4C

Compression rule explanatory view (4)

| d0 d1 d2 d3 d4 d5 | d6 d7 d8 d9 d10 d11 d12 d13 | d14 d15 |
|---|---|---|
| 0  0  0  0  0  0 | Number of successive pixels | Pixel data |

FIG. 4D

Compression rule (5)

| d0 | d1 | d2 | d3 | d4 | d5 | d6 | d7 | d8 | d9 | d10 | d11 | d12 | d13 | d14 d15 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | Pixel data |

FIG. 4E

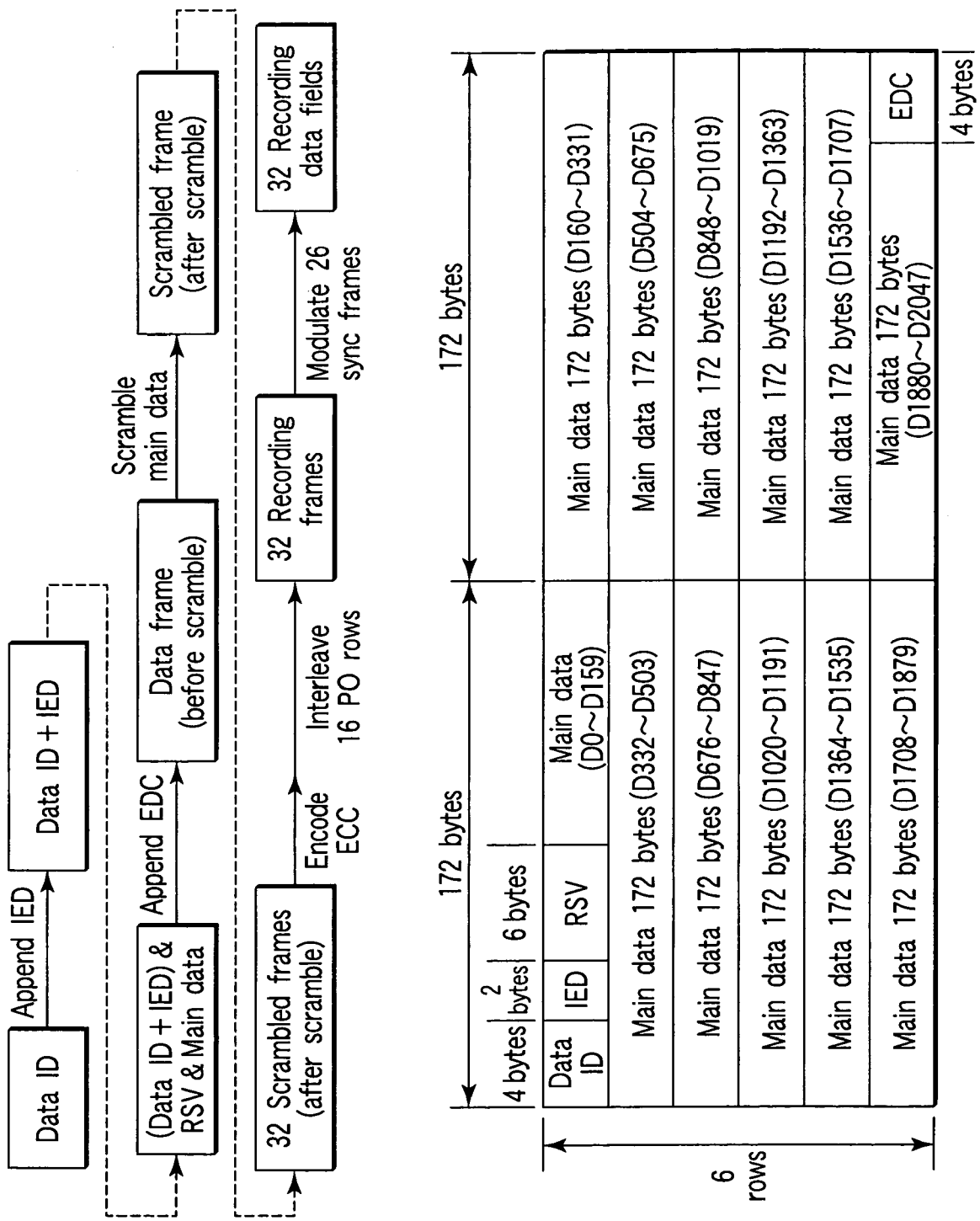
F I G. 5
F I G. 6

| Area | Contents |
|---|---|
| Embossed data zone | Sector number |
| Defect management area | Sector number |
| Disc identification zone | Sector number |
| Used block of data area | LSN + 031000h |
| Unused block of data area | State 1 : first 3 bits = 0, incremented number follows<br>State 2 : from 00 0000h to 00 00Hh<br>State 3 : unrecorded |

| Area | | Contents |
|---|---|---|
| Embossed data zone | | Reserved |
| Rewritable data zone | Lead-in area Lead-out area | Reserved |
| | Data area | 0b : general data  1b : real-time data |

| Initial preset number | Initial preset value | Initial preset number | Initial preset value |
|---|---|---|---|
| 0h | 0001h | 8h | 0010h |
| 1h | 5500h | 9h | 5000h |
| 2h | 0002h | 0Ah | 0020h |
| 3h | 2A00h | 0Bh | 2001h |
| 4h | 0004h | 0Ch | 0040h |
| 5h | 5400h | 0Dh | 4002h |
| 6h | 0008h | 0Eh | 0080h |
| 7h | 2800h | 0Fh | 0005h |

Initial value of shift register

Feedback shift register (ECC block structure (D,E))

State0

| | (MSB) | Primary SYNC codes | (LSB) | | (MSB) | Secondary SYNC codes | (LSB) |
|---|---|---|---|---|---|---|---|
| SY0 = | 000010 | 101000 | 001001 | / | 000010 | 001000 | 001001 |
| SY1 = | 100001 | 001000 | 001001 | / | 100010 | 101000 | 001001 |
| SY2 = | 100100 | 001000 | 001001 | / | 101000 | 101000 | 001001 |
| SY3 = | 101000 | 001000 | 001001 | / | 101010 | 001000 | 001001 |

State1

| | (MSB) | Primary SYNC codes | (LSB) | | (MSB) | Secondary SYNC codes | (LSB) |
|---|---|---|---|---|---|---|---|
| SY0 = | 000100 | 101000 | 001001 | / | 000100 | 001000 | 001001 |
| SY1 = | 001001 | 001000 | 001001 | / | 001010 | 101000 | 001001 |
| SY2 = | 010000 | 101000 | 001001 | / | 010000 | 001000 | 001001 |
| SY3 = | 010100 | 001000 | 001001 | / | 010101 | 001000 | 001001 |

F I G. 15

Comparison of combination patterns (column direction) of successive sync codes (1)
— upon moving between sectors —

| | 00 | 01 | 02 | 03 | 04 | 05 | 06 | 07 | 08 | 09 | 10 | 11 | 12 |
|---|---|---|---|---|---|---|---|---|---|---|---|---|---|
| Latest sync frame number | 2 | 1 | 0 | 1 | 1 | 2 | 1 | 2 | 2 | 3 | 1 | 3 | 3 |
| Sync code number two codes before | 1 | 0 | 1 | 1 | 2 | 1 | 2 | 2 | 3 | 1 | 3 | 3 | 1 |
| Sync code number one code before | 0 | 1 | 1 | 2 | 1 | 2 | 2 | 3 | 1 | 3 | 3 | 1 | 2 |
| Latest sync code number | | | | | | | | | | | | | |
| Number of code changes between neighboring patterns | 3 | 2 | 2 | 2 | 3 | 2 | 2 | 2 | 3 | 2 | 2 | 2 | 3 |
| Number of code changes shifted by one frame | 2 | 2 | 2 | 1 | 1 | 2 | 3 | 2 | 2 | 2 | 3 | 3 | 2 |

| | 13 | 14 | 15 | 16 | 17 | 18 | 19 | 20 | 21 | 22 | 23 | 24 | 25 |
|---|---|---|---|---|---|---|---|---|---|---|---|---|---|
| Latest sync frame number | 1 | 2 | 3 | 2 | 2 | 1 | 3 | 1 | 1 | 3 | 2 | 3 | 3 |
| Sync code number two codes before | 2 | 3 | 2 | 2 | 1 | 3 | 1 | 1 | 3 | 2 | 3 | 3 | 2 |
| Sync code number one code before | 3 | 2 | 2 | 1 | 3 | 1 | 1 | 3 | 2 | 3 | 3 | 2 | 1 |
| Latest sync code number | | | | | | | | | | | | | |
| Number of code changes between neighboring patterns | 3 | 2 | 2 | 2 | 3 | 2 | 2 | 2 | 3 | 2 | 2 | 2 | 3 |
| Number of code changes shifted by one frame | 2 | 2 | 3 | 2 | 2 | 2 | 3 | 2 | 2 | 2 | 3 | 3 | 2 |

FIG. 16

Comparison of combination patterns (column direction) of successive sync codes (2)
— upon extending across guard area —

| Latest sync frame number | 00 | 01 | 02 | 03 | 04 | 05 | 06 | 07 | 08 | 09 | 10 | 11 | 12 |
|---|---|---|---|---|---|---|---|---|---|---|---|---|---|
| Sync code number two codes before | 1 | 1 | 0 | 1 | 1 | 2 | 1 | 2 | 2 | 3 | 1 | 3 | 3 |
| Sync code number one code before | 1 | 0 | 1 | 1 | 2 | 1 | 2 | 2 | 3 | 1 | 3 | 3 | 1 |
| Latest sync code number | 0 | 1 | 1 | 2 | 1 | 2 | 2 | 3 | 1 | 3 | 3 | 1 | 2 |
| Number of code changes between neighboring patterns | 2 | 2 | 2 | 3 | 1 | 2 | 2 | 3 | 2 | 2 | 2 | 2 | 3 |
| Number of code changes shifted by one frame | 2 | 2 | 2 | 1 | 1 | 2 | 2 | 2 | 2 | 3 | 3 | 3 | 2 |

| Latest sync frame number | 13 | 14 | 15 | 16 | 17 | 18 | 19 | 20 | 21 | 22 | 23 | 24 | 25 | PA |
|---|---|---|---|---|---|---|---|---|---|---|---|---|---|---|
| Sync code number two codes before | 1 | 2 | 3 | 2 | 2 | 1 | 3 | 1 | 1 | 3 | 2 | 3 | 3 | 2 |
| Sync code number one code before | 2 | 3 | 2 | 2 | 1 | 3 | 1 | 1 | 3 | 2 | 3 | 3 | 2 | 1 |
| Latest sync code number | 3 | 2 | 2 | 2 | 3 | 1 | 3 | 2 | 2 | 3 | 3 | 2 | 1 | 1 |
| Number of code changes between neighboring patterns | 3 | 2 | 2 | 2 | 2 | 2 | 2 | 3 | 2 | 2 | 2 | 2 | 2 | |
| Number of code changes shifted by one frame | 2 | 2 | 2 | 2 | 2 | 3 | 2 | 2 | 2 | 2 | 3 | 3 | 2 | 2 |

FIG. 17

Relationship with abnormal phenomenon upon detection of unexpected combination pattern of sync codes

| Abnormal phenomenon contents → | Frame shift | | Detection error | | Tracking error |
|---|---|---|---|---|---|
| Detected pattern contents ↓ | Case 1 | Case 2 | Case 3 | Case 4 | Case 5 |
| Different by only one position from expected pattern | X | ○ | ○ | X | — |
| Match with pattern shifted from expected pattern by ±1 sync frame | ○ | ○ | X | X | X (△) |
| (1,1,2),(1,2,1),(1,2,2) or (2,1,2) | — | ○ | — | — | — |
| Continuity in data ID | (○) | (○) | ○ | ○ | X |
| Continuity of wobble addresses | (○) | (○) | ○ | ○ | X |

F I G. 18

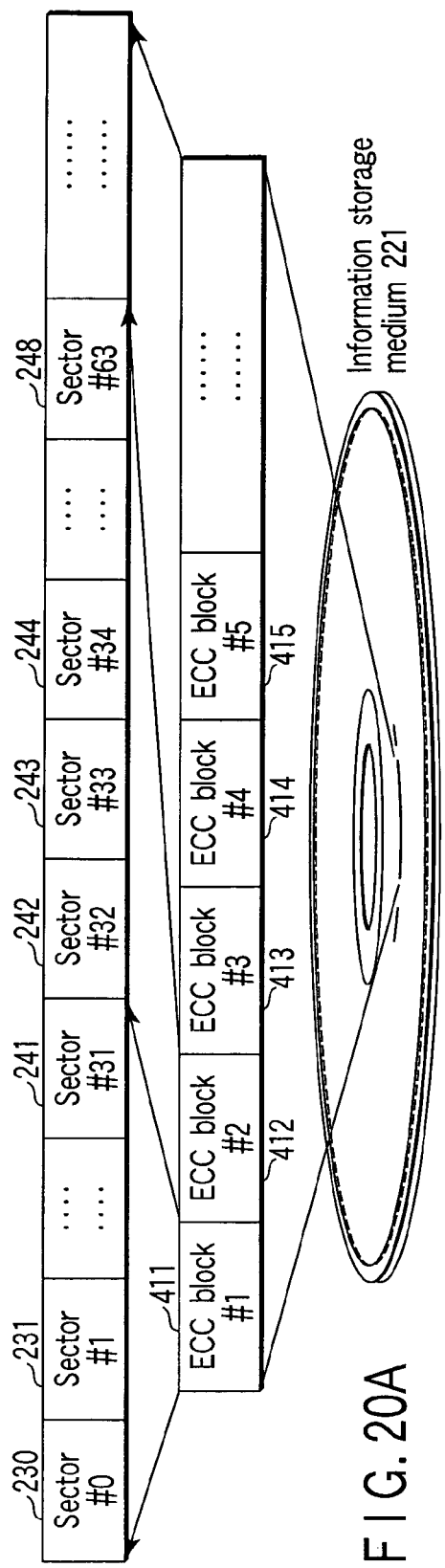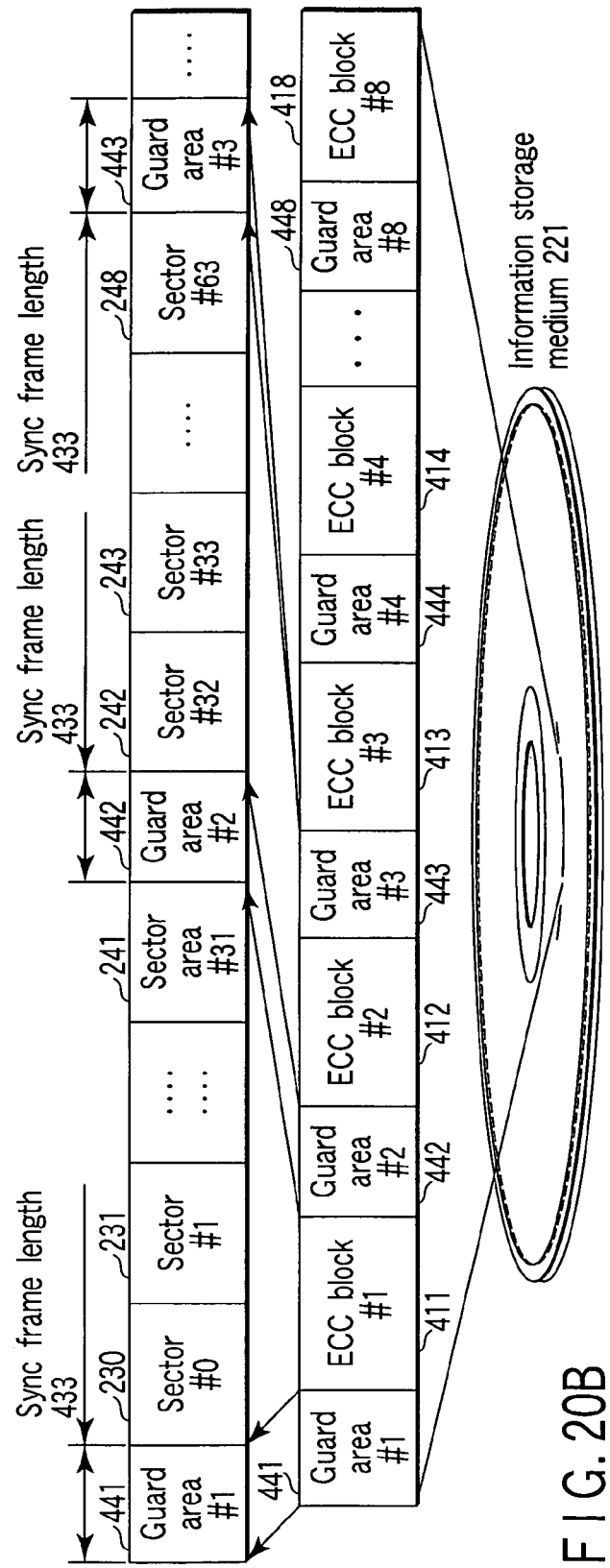
F I G. 20A
F I G. 20B

Gray code example

| Decimal value | Conventional binary notation | Gray code notation |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

F I G. 27

Special track code (present invention)

| Decimal value | Conventional binary notation | Special track code | Decimal value | Conventional binary notation | Special track code |
|---|---|---|---|---|---|
| 0 | 00000 | 00⋯00000 | 1 | 00001 | 10⋯00000 |
| 2 | 00010 | 00⋯00001 | 3 | 00011 | 10⋯00001 |
| 4 | 00100 | 00⋯00011 | 5 | 00101 | 10⋯00011 |
| 6 | 00110 | 00⋯00010 | 7 | 00111 | 10⋯00010 |
| 8 | 01000 | 00⋯00110 | 9 | 01001 | 10⋯00110 |
| 10 | 01010 | 00⋯00111 | 11 | 01011 | 10⋯00111 |
| 12 | 01100 | 00⋯00101 | 13 | 01101 | 10⋯00101 |
| 14 | 01110 | 00⋯00100 | 15 | 01111 | 10⋯00100 |
| 16 | 10000 | 00⋯01100 | 17 | 10001 | 10⋯01100 |
| 18 | 10010 | 00⋯01101 | 19 | 10011 | 10⋯01101 |
| 20 | 10100 | 00⋯01111 | 21 | 10101 | 10⋯01111 |
| 22 | 10110 | 00⋯01110 | 23 | 10111 | 10⋯01110 |
| 24 | 11000 | 00⋯01010 | 25 | 11001 | 10⋯01010 |
| 26 | 11010 | 00⋯01011 | 27 | 11011 | 10⋯01011 |
| 28 | 11100 | 00⋯01001 | 29 | 11101 | 10⋯01001 |
| 30 | 11110 | 00⋯01000 | 31 | 11111 | 10⋯01000 |

Note] only most significant bits are different, and remaining lower bits match in "2n" (n: integer value) and "2n+1"

F I G. 28

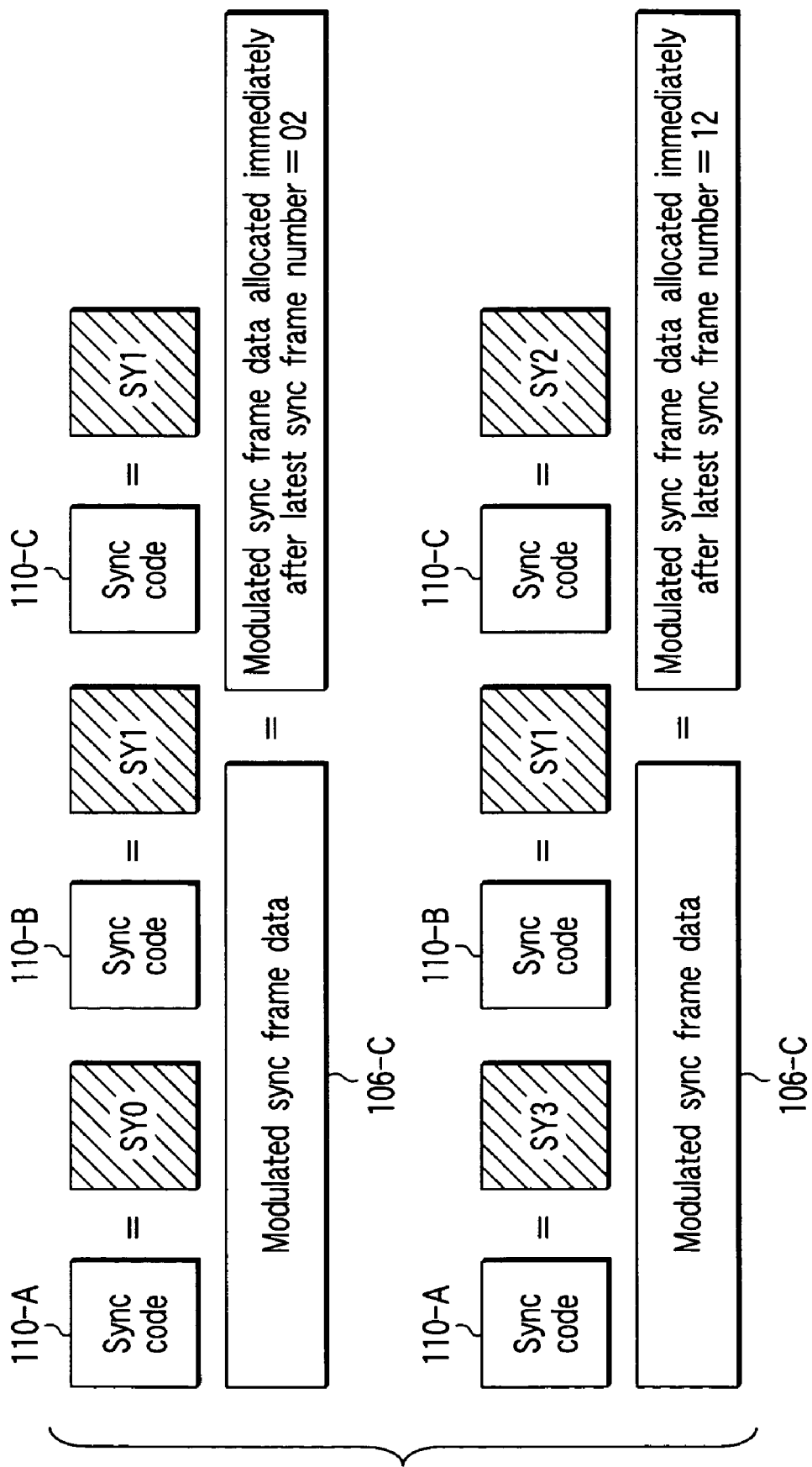
F I G. 32

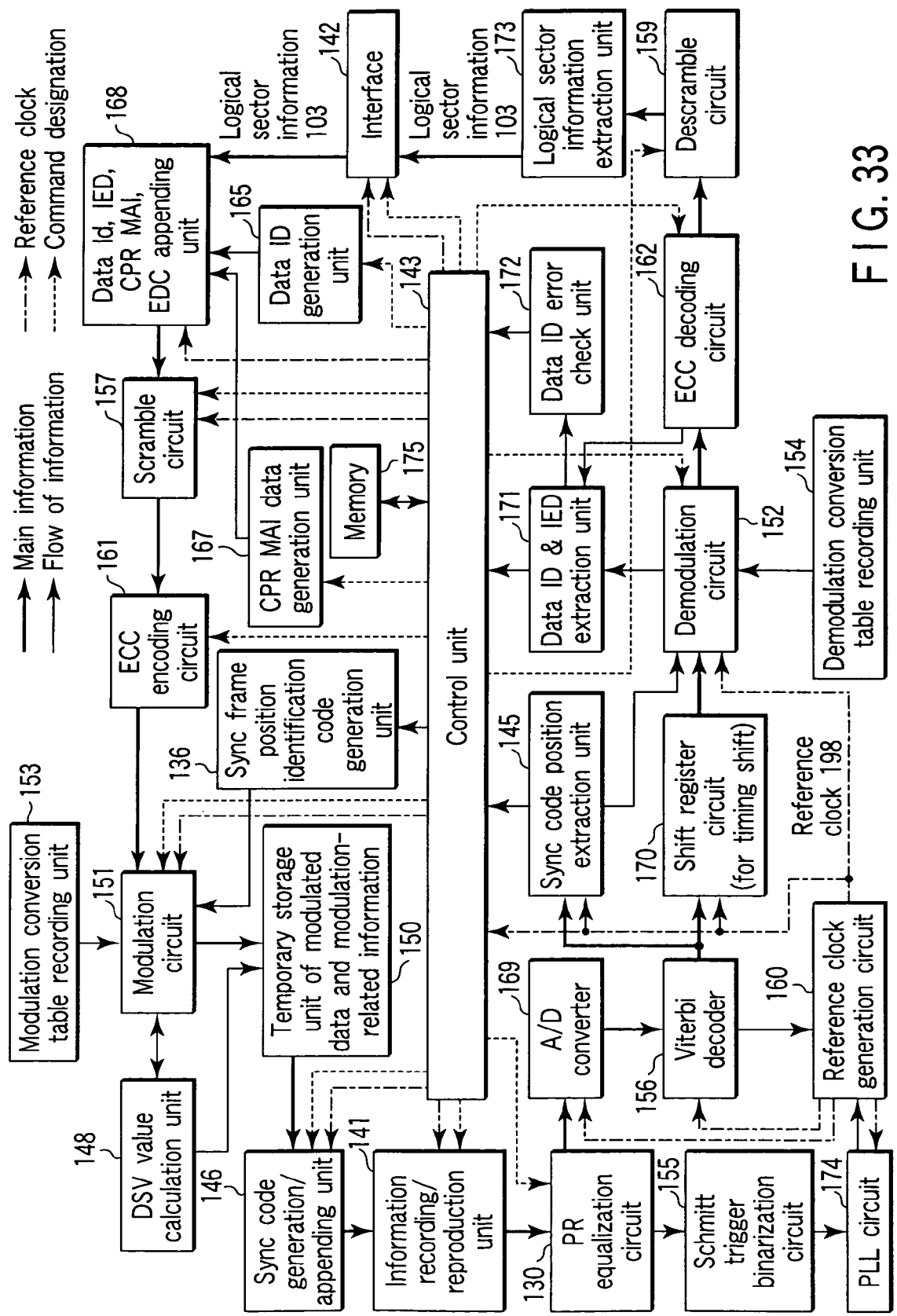
F I G. 33

| Combination effect number | ⟨1⟩ | ⟨2⟩ | ⟨3⟩ | ⟨4⟩ | ⟨5⟩ | ⟨6⟩ | ⟨7⟩ | ⟨8⟩ | ⟨9⟩ | ⟨10⟩ | ⟨11⟩ | ⟨12⟩ | ⟨13⟩ | ⟨14⟩ | ⟨15⟩ |
|---|---|---|---|---|---|---|---|---|---|---|---|---|---|---|---|
| A) File or folder separation between SD and HD | ○ | | | | | | | | | | | | △ | △ | △ |
| B) 4-bit expression of sub-picture information and compression rule | | ○ | | ○ | | | | | | | | | △ | △ | △ |
| C) Allow to set a plurality of types of recording formats for read-only medium | | | | | ○ | ○ | | | | | | | | | |
| D) ECC block structure using product code | | | ○ | | ○ | ○ | ○ | ○ | ○ | ○ | ○ | | | | ○ |
| E) Distribute and allocate data in sectors to a plurality of small ECC blocks | | | ○ | | | ○ | ○ | ○ | | | | | | | ○ |
| F) Insert different PO group data for respective sectors | | | | △ | ○ | | | | ○ | ○ | | | | | ○ |
| G) Segment division structure in ECC block | | | ○ | ○ | ○ | ○ | △ | △ | △ | △ | ○ | | | △ | |
| H) Guard area allocation structure between ECC blocks | | | | | ○ | ○ | | | | ○ | ○ | | | | |
| I) Guard areas are recorded to locally overlap each other | | | | | | | | | ○ | ○ | ○ | | | | |
| J) Number of code changes upon shifting combination of sync codes ≥ 2 | ○ | ○ | | | | | ○ | ○ | ○ | ○ | | | | | ○ |
| K) Set specific condition to address number assignment method | | | | | | | | | | | | | ○ | | |
| L) L/G recording + wobble modulation | | | | | | | | | | | | | | ○ | |
| M) Distribute and allocate unstable bits also on groove area | | | | | | | | | | | | ○ | | | |
| N) Distribute and allocate unstable bits on land and groove | | | | | | | | | | | | ○ | | | |
| O) ±90° wobble phase modulation | | | | | | | | | | | | | | | |
| P) Adopt gray codes or special track codes | ○ | ○ | | | | | | | | | | | | | |

F I G. 38

SYNC FRAME STRUCTURE, INFORMATION STORAGE MEDIUM, INFORMATION RECORDING METHOD, INFORMATION REPRODUCTION METHOD, INFORMATION REPRODUCTION APPARATUS

CROSS-REFERENCE TO RELATED APPLICATIONS

This application is based upon and claims the benefit of priority from prior Japanese Patent Application No. 2003-045054, filed Feb. 21, 2003, the entire contents of which are incorporated herein by reference.

BACKGROUND OF THE INVENTION

1. Field of the Invention

The present invention relates to an improvement of a sync frame (synchronous frame) used in an information storage medium such as an optical disc or the like. More particularly, the present invention relates to an information storage medium, an information recording method, an information reproduction method, and an information reproduction apparatus, which are based on an information recording format (sync frame structure) using the improved sync frame. The present invention is compatible to next-generation optical discs (next-generation DVD-ROM standard, next-generation DVD-R standard, next-generation DVD-RAM standard, and the like).

2. Description of the Related Art

On recordable optical discs, preformat information is recorded in advance. When an optical disc apparatus records data on such optical disc, it detects the preformat information, and determines the recording position of data with reference to the detected information.

Normally, a recording track, which is spirally formed on an optical disc, is segmented into address segments each having a predetermined length. Addresses indicating locations are assigned to these segments, and are written as preformat data.

In a CLV optical disc with a constant recording linear density, the address segment lengths are equal to each other. If the number of address segments is too large, a seek time required to seek address information by random access is prolonged. For this reason, a length that can assign 10 to several 10 address segments per round is selected.

As a method of giving the preformat data, the preformat data may be formed as prepits at the head of each segment. However, with this method, that portion cannot be used as a data area. Hence, recent recordable media adopt a method of recording format information by superposing it on a data recording track as a wobble signal which is formed by wobbling grooves.

Upon recording format information as a wobble signal, modulation such as phase inversion, frequency change, or the like is applied. +R adopts such scheme. On the other hand, DVD-R adopts a method of recording format information by discretely forming prepits on lands between neighboring grooves.

As data to be recorded, error correction codes are generated based on original data, and are segmented into smaller sync frames to obtain recording data. For example, in DVD (Digital Versatile Disc), error correction code blocks (ECC blocks) are modulated, and sync codes are appended at given intervals to generate a plurality of sync frames. These plurality of sync frames are used as recording data.

As references related to the present invention, Japanese Patent No. 2,786,810 (reference 1) and Jpn. Pat. Appln. KOKAI Publication No. 2002-373472 (reference 2) are known. Reference 1 describes the technical contents related to sync codes used in existing DVD. This reference 1 corresponds to U.S. Pat. No. 5,587,991. Reference 2 describes a method of determining a reproduction position in a sector based on the allocation order of a plurality of (three) sync codes.

The existing DVD standard that adopts sync codes associated with the contents described in reference 1 specifies 32 different sync codes. In order to detect such sync code position by an information reproduction apparatus or information recording/reproduction apparatus, round-robin pattern matching detection is made between reproduction data reproduced from an information storage medium and these 32 different patterns. Since this sync code position detection takes a lot of trouble, a sync code detection circuit is complicated, thus increasing the price of an information reproduction apparatus or information recording/reproduction apparatus.

Also, since a sync code detection algorithm is complicated (due to the presence of 32 different sync codes), the detection reliability is low. In addition, since a code length (the number of bits of a whole sync code) which is to undergo pattern matching is as large as 32 bits, defects on an information storage medium further deteriorate the reliability of sync code position detection.

When the reproduction pattern of a sync code is erroneously detected due to defects or the like on an information storage medium, information immediately after that pattern causes an error, thus posing another problem.

Reference 2 describes a method of determining a reproduction position in a sector based on the allocation order of a plurality of (three) sync codes. However, if one of the plurality of sync code values is erroneously detected upon reproduction due to defects or the like on an information storage medium, the intra-ECC block position of subsequent information is detected while being shifted. Then, the error correction performance of the whole ECC block largely impairs. However, reference 2 does not have any description about measures against detection errors of sync codes.

BRIEF SUMMARY OF THE INVENTION

According to an aspect of the present invention, in a sync frame structure for use with an information storage medium having an area divided by sectors, at least one sector includes one or more sync frames, and at least one sync frame includes a plurality of sync codes. With respect to an arrangement of the sync codes in the same sector, two or more sync codes are changed from a first pattern to a second pattern, wherein the first pattern comprises a combination of successive three sync codes, and the second pattern is obtained by shifting the arrangement of the first pattern by one sync code.

BRIEF DESCRIPTION OF THE SEVERAL VIEWS OF THE DRAWING

FIG. 1 is a view showing an example of file allocation on an information storage medium according to an embodiment of the present invention;

FIGS. 4A to 4E are explanatory views showing examples of compression rules of sub-picture information to be recorded on the information storage medium according to the embodiment of the present invention;

FIG. 5 is an explanatory view showing the processing sequence for generating a recording data field;

FIG. 6 is an explanatory view showing the configuration of a data frame;

FIG. 15 is a view for explaining an example of the detailed contents of a sync code;

FIG. 16 is a view for explaining comparative example 1 of combination patterns (column direction) of successive sync codes (upon moving between sectors);

FIG. 17 is a view for explaining comparative example 2 of combination patterns (column direction) of successive sync codes (upon extending across a guard area);

FIG. 18 is a view for explaining an example of the relationship between the detected pattern contents and abnormal phenomenon contents upon detection of an unexpected combination pattern of sync codes;

FIGS. 20A and 20B are views for explaining the first and second embodiments by comparison upon applying the embodiment of the present invention to a read-only information storage medium;

FIG. 27 shows an example of gray codes;

FIG. 28 is an explanatory view of special track codes according to the embodiment of the present invention;

FIG. 32 is a view showing a practical example upon determining the sync frame position from the allocation order of sync frame identification codes (when the data fields shown in FIGS. 14A and 14B are adopted);

FIG. 33 is a block diagram for explaining the arrangement of an information recording/reproduction apparatus according to an embodiment of the present invention;

FIG. 38 is a table exemplifying advantages or merits obtained by various embodiments of the present invention together.

DETAILED DESCRIPTION OF THE INVENTION

Preferred embodiments of the present invention will be described hereinafter with reference to the accompanying drawings.

In an embodiment of the present invention,

A1] the allocation method of sync codes in a single sector is devised to change a combination pattern of three successive sync codes by two or more sync codes compared to that which is shifted by one code;

A2] whether "any frame shift", "any detection error of a sync code", or "any tracking error" has occurred is determined by comparing a combination pattern of a plurality of previous successive sync codes;

A3] the number of types of sync codes is greatly reduced (to four types compared to 32 types in the conventional DVD standard) to facilitate sync code detection of an information reproduction apparatus or information recording/reproduction apparatus so as to reduce their price and to improve the detection reliability of sync codes; or A4] a rewrite (or additional recording) process for respective ECC blocks is allowed, guard areas are formed between neighboring ECC blocks, and a sync code is recorded at the head position of each guard area to facilitate detection of the guard areas.

Figure 19:
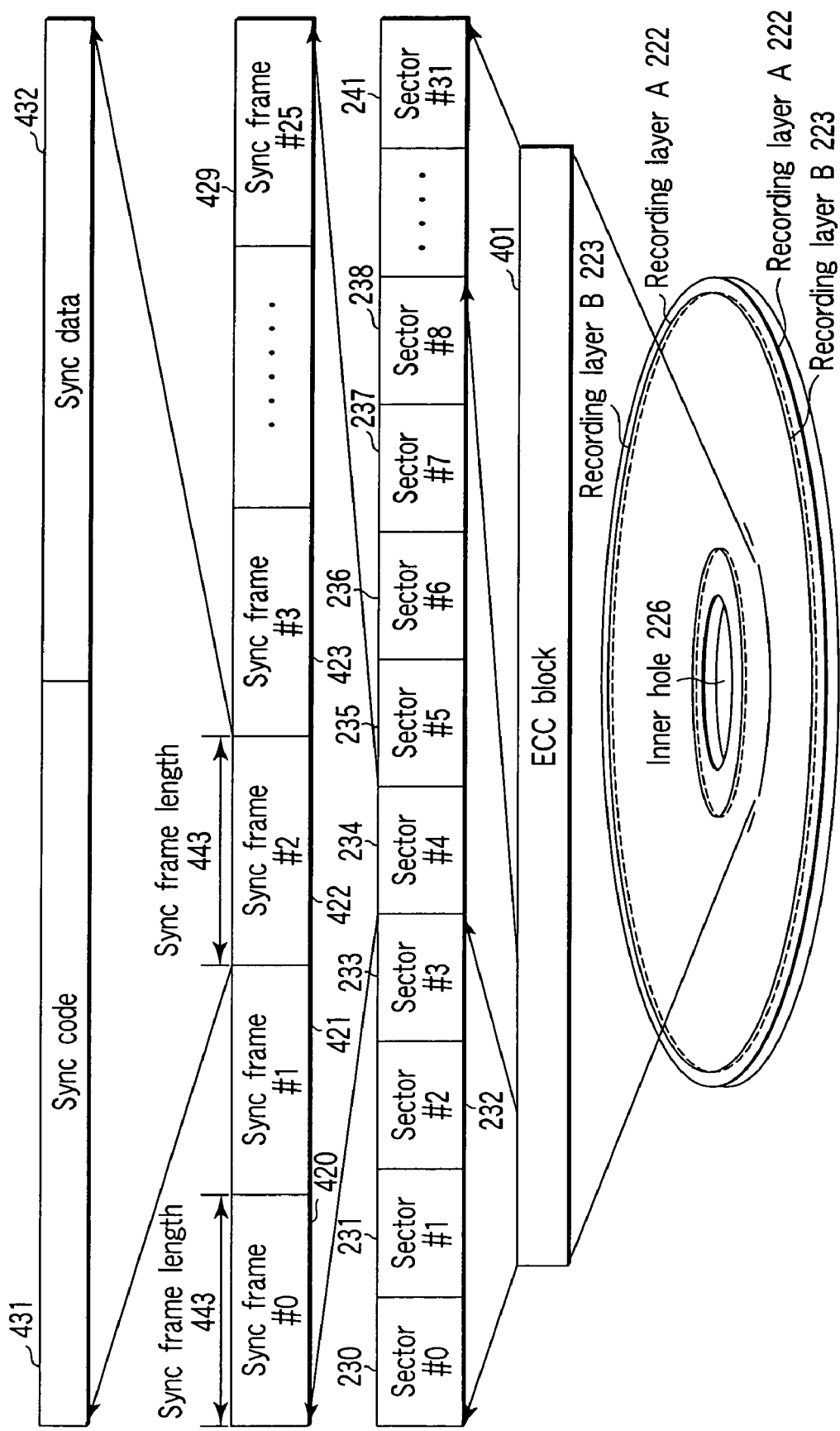
FIG. 19 is a view for explaining an example of a data unit of recording data on the information storage medium.

In other words, another embodiment of the present invention uses:

B1) an information storage medium (221) having areas (401) partitioned by a plurality of sectors (230 to 241 in FIG. 19). Each sector (241) is configured to include one or more sync frames (420 to 429), and each sync frame (422 in FIG. 19; sync frame in FIGS. 14A and 14B; sync code number in FIG. 16) is configured to include a plurality of sync codes (431 in FIG. 19; SY0 to SY3 in FIGS. 14A and 14B; sync code numbers "2", "1", "0", and the like in sync frame number "00" in FIG. 16). As for the allocation of the sync codes in a single sector, when a first pattern as a combination of three successive sync codes (e.g., SY0, SY1, SY1 in FIGS. 14A and 14B; or sync code numbers "2", "1", "0" in sync frame number "00" in FIG. 16) is compared with a second pattern in which the allocation of sync codes is shifted by one code from the first pattern (e.g., SY1, SY2, SY2 in FIGS. 14A and 14B; or sync code numbers "1", "0", "1" in sync frame number "01" in FIG. 16), two or more sync codes (two positions, i.e., first SY0→SY1 and third SY1→SY2 in an example of FIGS. 14A and 14B; three positions, i.e., "2"→"1", "1"→"0", "0"→"1" in an example of FIG. 16) are configured to change;

B2) an information storage medium having areas partitioned by a plurality of sectors. Each sector is configured to include one or more sync frames, and each sync frame is configured to include a plurality of sync codes. As for the allocation of the sync codes in a single sector, whether any frame shift in the sync frame (ST6) or any detection error of the sync code (ST7) has occurred is determined on the basis of a previous pattern as a combination of a plurality of previous successive sync codes (comparison in ST66 in FIG. 36; comparison in ST5 in FIG. 37; see FIG. 18); or B3) an information storage medium having areas partitioned by a plurality of sectors. Each sector is configured to include one or more sync frames, and each sync frame is configured to include a plurality of sync codes. Each area partitioned by the plurality of sectors includes an ECC block which can be used as rewrite or additional recording units, a plurality of ECC blocks (411 to 418 in FIGS. 20A and 20B) are formed on the information storage medium. Guard areas (441 to 448 in FIGS. 20A and 20B; or FIGS. 21 and 22) are formed between neighboring ECC blocks, and the sync code (for example, SY1 in FIG. 21 or 22) is recorded at the head position of each guard area (the sync code at the head position of the guard area facilitates detection of the guard area).

1] Description of Video Information Recording Format on Information Storage Medium According to Embodiment of Present Invention (A)

FIG. 1 shows an example of the file allocation on an information storage medium according to an embodiment of the present invention. Conventional SD (Standard Definition) Object File (object (VTS1TT_VOBS) file of a specific title for existing SD) 216, its management files 206, 208, 211, and 213, HD (High Definition) object file (object (VTS2TT_VOBS) file of a specific title for high-image quality HD) 217, and its management files 201, 209, 212, and 214 are separated as independent files, and are allocated together in conventional DVD-Video dedicated directory 202.

Figure 2:
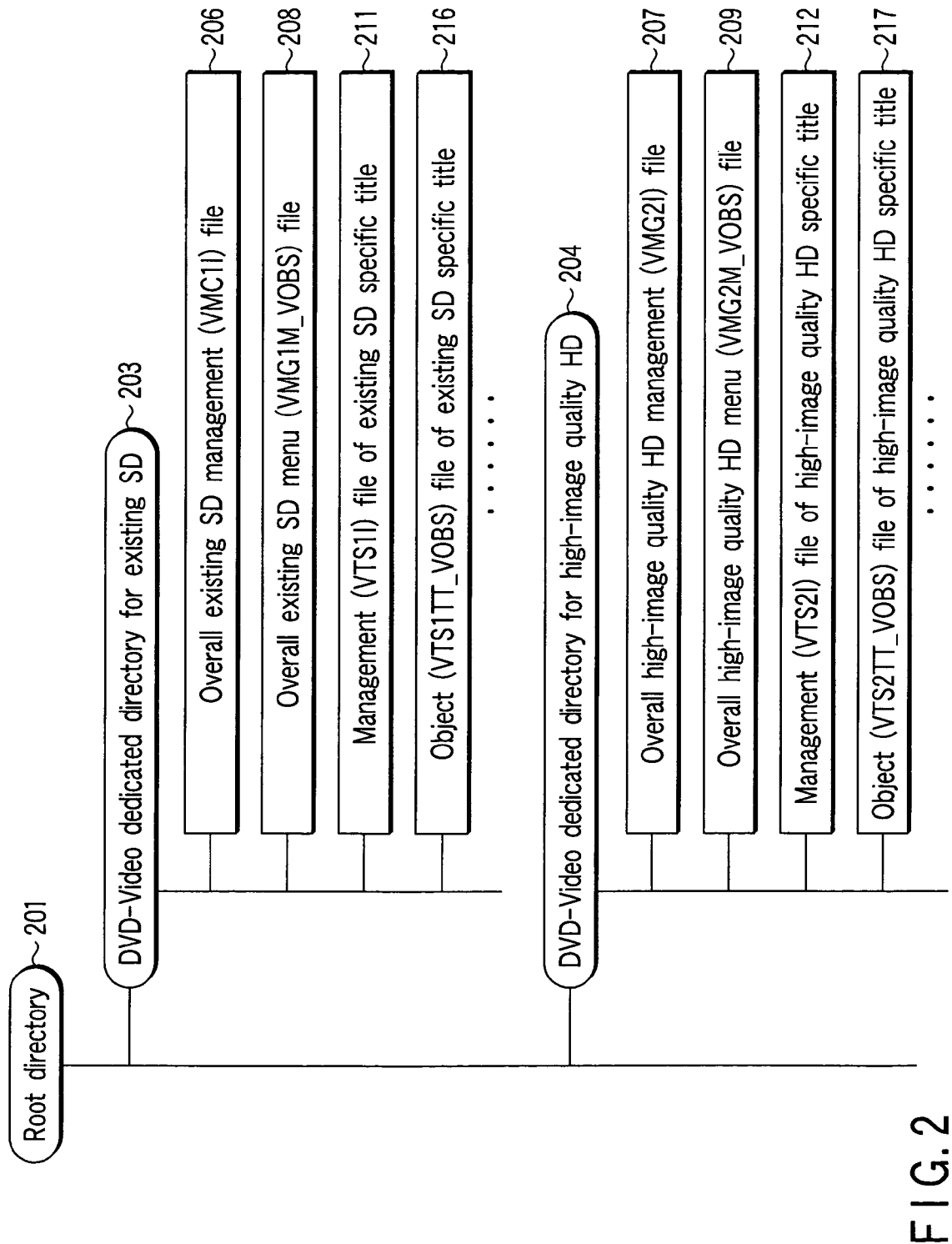
FIG. 2 is a view showing another example of file allocation on the information storage medium according to the embodiment of the present invention.

FIG. 2 shows another example of the file allocation on an information storage medium according to the embodiment of the present invention. In this example, conventional SD (Standard Definition) Object File (object (VTS1TT_VOBS) file of a specific title for existing SD) 216 and its management files 206, 208, 211, and 213, and HD (High Definition) object file (object (VTS2TT_VOBS) file of a specific title for high-image quality HD) 217 and its management files 201, 209, 212, and 214 are respectively allocated under different directories 203 and 204. When Object files and their management files are separately stored in SD and HD directories in this way, not only file management is facilitated, but also an SD or HD decoder can be prepared in advance before reproduction of each Object File, thus greatly reducing the preparation time required until the beginning of video playback.

Figure 3:
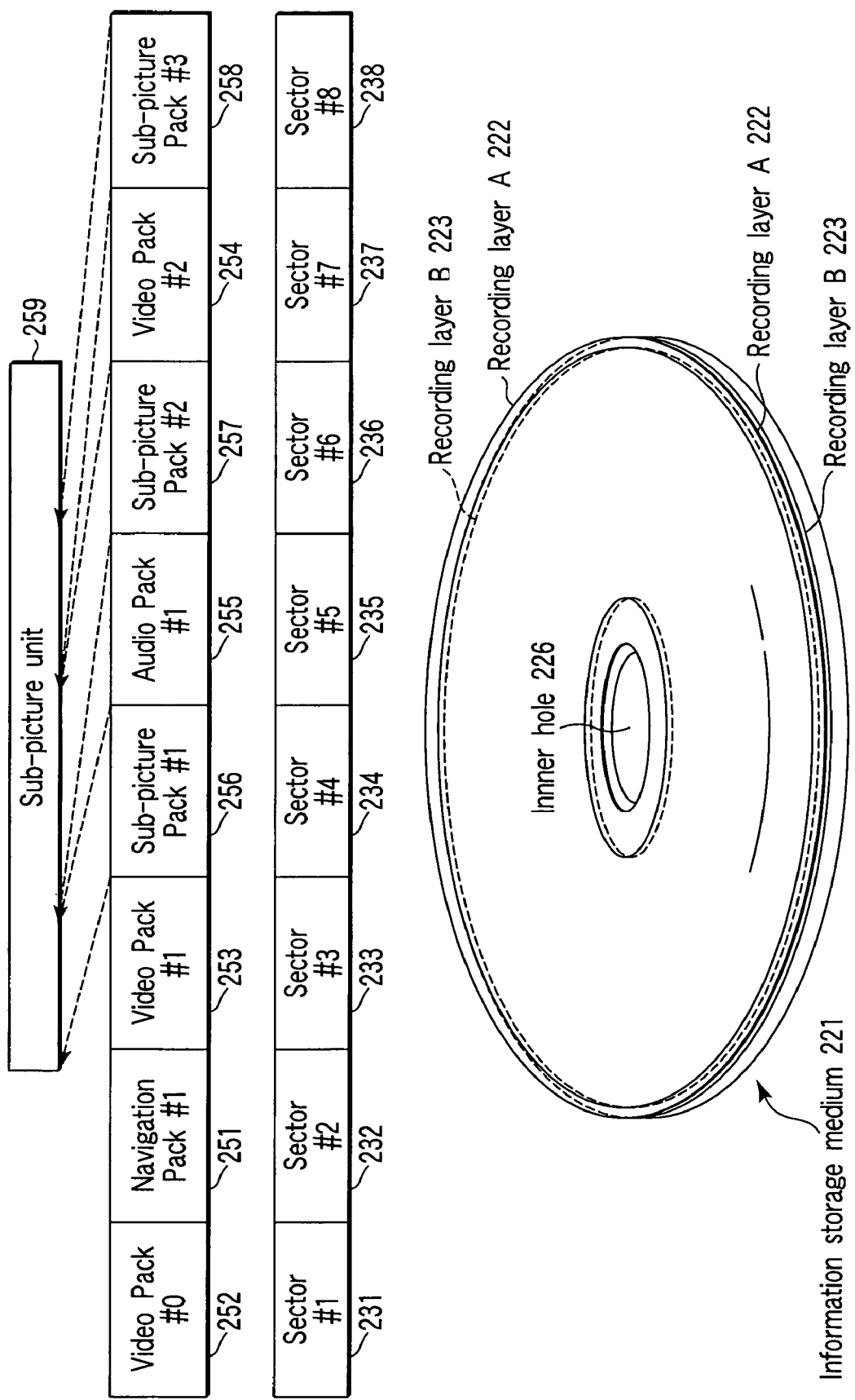
FIG. 3 is an explanatory view of a recording method of video information on the information storage medium according to the embodiment of the present invention.

FIG. 3 is a view for explaining the method of recording video information on the information storage medium according to the embodiment of the present invention. As shown in FIG. 3, the embodiment of the present invention records information on the information storage medium in the form of a Program Stream according to the multiplexing rules specified by MPEG layer 2. That is, main picture information in video information is distributed and allocated in video packs 252 to 254, and audio information is distributed and allocated in audio packs 255. In a system according to the embodiment of the present invention, navigation pack 251 is allocated at the head position of a VOBU (Video Object Unit) as a minimum unit of video information (not shown). Sub-picture information indicating a subtitle, menu, and the like is defined in addition to main picture information recorded in video packs 252 to 254. The sub-picture information is distributed and allocated in sub-picture packs 256 to 258. Upon reproducing video information from the information storage medium, sub-picture unit 259 is formed by collecting sub-picture information distributed and recorded in sub-picture packs 256 to 258, and undergoes a video process by a video processor (not shown). After that, the processed sub-picture information is presented to the user.

In the embodiment of the present invention, sectors 231 to 238 each having a size of 2048 bytes serve as management units of information to be recorded on information storage medium 221. Therefore, the data size per pack of packs 251 to 258 is set to be 2048 bytes in correspondence with the sector size.

FIGS. 4A to 4E are views for explaining an example of compression rules of sub-picture information to be recorded on the information storage medium according to the embodiment of the present invention. The rules will be described below.

2] Expression Format and Compression Rules of Sub-Picture Information in Embodiment of Present Invention (B)

(a) Run-length Compression Rule

Run-length compression is adopted to compress sub-picture information. Some compression rules will be explained below. Some SD- and HD-compatible run-length compression rules compatible have been developed.

1) A case wherein 4 bits are set as one unit (see sub-picture information compression rule (1) in FIG. 4A). If one to three pixel data having identical values successively appear, the first two bits indicate the number of pixels, and the subsequent 2 bits express practical pixel data.

2) A case wherein 8 bits are set as one unit (see sub-picture information compression rule (2) in FIG. 4B). If four to 15 pixel data with identical values successively appear, the first 2 bits are set to be "0". The subsequent 4 bits indicate the number of pixels, and the last 2 bits express practical pixel data.

3) A case wherein 12 bits are set as one unit (see sub-picture information compression rule (3) in FIG. 4C). If 16 to 63 pixel data with identical values successively appear, the first 4 bits are set to be "0". The subsequent 6 bits indicate the number of pixels, and the last 2 bits express practical pixel data.

4) A case wherein 16 bits are set as one unit (see sub-picture information compression rule (4) in FIG. 4D). If 64 to 255 pixel data with identical values successively appear, the first 6 bits are set to be "0". The subsequent 8 bits indicate the number of pixels, and the last 2 bits express practical pixel data.

5) A case wherein 16 bits are set as one unit (see sub-picture information compression rule (5) in FIG. 4E). If pixel data with identical values successively appear to the end of one line, the first 14 bits are set to be "0". The subsequent 2 bits express practical pixel data.

6) If byte alignment cannot be attained upon expressing pixels for one line, 4 dummy bits ('0000b') are inserted for adjustment.

These rules are used upon compressing SD sub-picture information. Also, rules used upon compressing HD sub-picture information have been developed.

FIG. 5 is a view for explaining the processing sequence for generating a recording data field. Data to be recorded on a data field of the information storage medium is called a Data frame, Scrambled frame, and Recording frame or Recorded data field in correspondence with signal process stages, as shown in FIG. 5. The Data frame consists of 2048 bytes, and has main data, a 4-byte data ID, 2-byte ID error detection code (IED), 6 reserved bytes, and a 4-byte error detection code (EDC).

After the error detection code (EDC) is appended, main data is scrambled. Cross Read-Solomon error correction codes are applied to 32 data frames after scramble (scrambled frames) to execute a so-called ECC encode process. As a result, recording frames are formed. The recording frames include parity data of outer-codes (PO) and parity data of inner-codes (PI).

PO and PI are error correction codes respectively generated for each ECC block consisting of 32 scrambled frames. The recording data fields undergo 4/6 modulation. A sync code (SYNC) is appended to the head of every 91 bytes to form recording frames. Four recording data fields are recorded in one data field. FIG. 5 shows transition of data from main data to recording frames.

FIG. 6 shows the format of the data frame. The data frame consists of 2064 bytes (=172 bytes×2×6 rows), which contain 2048-byte main data.

Figures 7, 8:
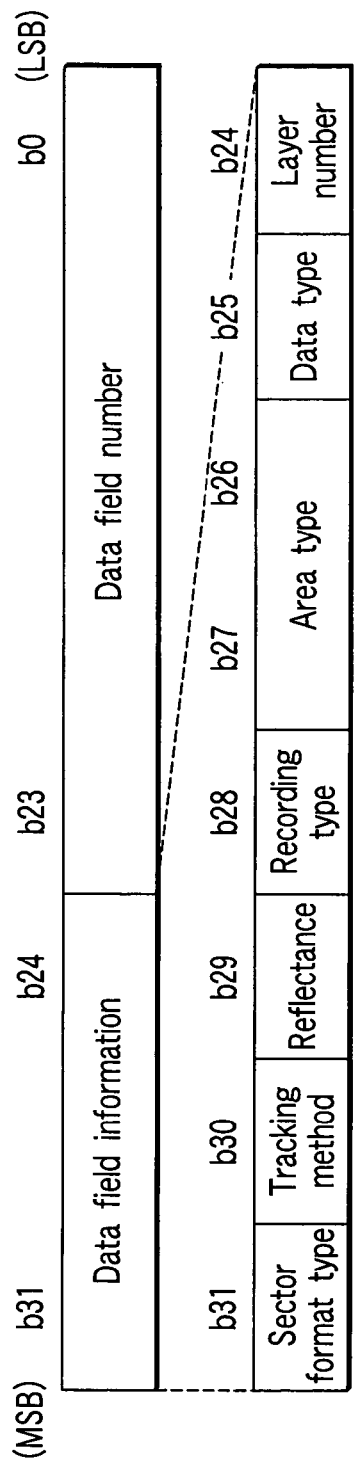
FIG. 7 is an explanatory view showing the contents of a data ID shown in FIG. 6.
FIG. 8 is an explanatory view showing the contents of a data field number in FIG. 7.

FIG. 7 shows the contents of the data ID in FIG. 6. This data ID consists of 4 bytes. The first byte (bits b31 to b24) stores data field information, and 3 bytes (bits b23 to b0) store a data field number.

The data field information in an embossed data zone includes: information of a sector format type, tracking method, reflectance, recording type, area type, data type, layer number, and the like.

Sector format type . . . 1b=zone format type; tracking method . . . 0b=pit tracking; reflectance . . . 1b=40% or less; recording type . . . 0b=general or 1b=real-time information (different defect management methods are used for 0b and 1b); area type . . . 01b=lead-in area; data type . . . 0b=read-only data; and layer number . . . 0b=layer 0 of dual layers or a single-layered disc) or 1b=or layer 1 of dual layers.

The data field information in a rewritable data zone is as follows.

Sector format type . . . 1b=zone format type; tracking method . . . 1b=groove tracking; reflectance . . . 1b=40% or less; recording type . . . 0b=general or 1b=real-time information (different defect management methods are used for 0b and 1b); area type . . . 00b=data area, 01b=lead-in area, or 10b=lead-out area; data type . . . 1b=rewritable data; and layer number . . . 0b=layer 0 of dual layers or a single-layered disc) or 1b=or layer 1 of dual layers. These bits must be assigned according to the aforementioned rules.

FIG. 8 shows the contents of the data field number in FIG. 7. If an ECC block belongs to an embossed data zone, defect management area, or disc identification zone, the data field number describes a sector number. If an ECC block belongs to a data area, that data field number is "logical sector number (LSN)+031000h". At this time, the ECC block contains user data.

In some cases, an ECC block belongs to the data area, but it does not contain any user data, i.e., it is an unused ECC block. Such case corresponds to one of the following three states: (1) the 0th to 3rd bits of the first sector are "0", and the subsequent sector describes a serially incremented field number; (2) this block describes a field number ranging from 00 0000h to 00 000Fh; (3) this block describes no data.

Figures 9, 10A, 10B:
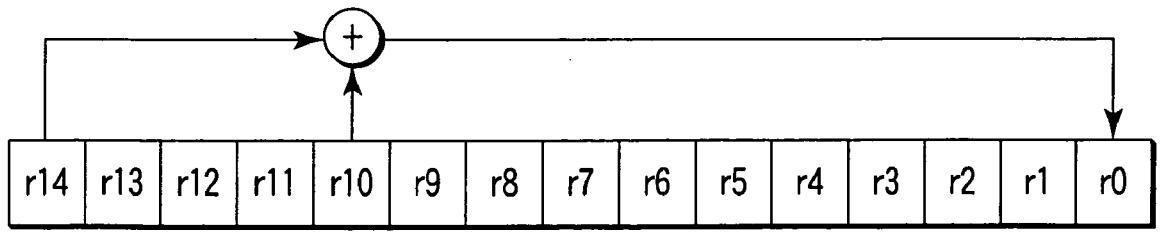
FIG. 9 is an explanatory view of the definitions of a recording type.
FIGS. 10A and 10B are explanatory views of an example of initial values of a shift register upon scrambling main data, and that shift register.

FIG. 9 shows definition of the recording type. That is, if an ECC block belongs to an embossed data zone, the recording type="reserved". If an ECC block belongs to a rewritable data zone and also to a lead-in or lead-out area, the recording type="reserved". If an ECC block belongs to a rewritable data zone and also to a data area, the recording type means 0b=General data or 1b=Real-time data.

In case of General data, if a block has any defect, a Linear replacement algorithm is applied to the corresponding sector. In case of Real-time data, if a block has any defect, the Linear replacement algorithm is not applied to the corresponding sector.

The error detection code (IED) of the data ID will be described below.

Let $C_{i,j}$ (i=0 to 11, j=0 to 171) be bytes allocated in a matrix, and $C_{0,j}$ (j=0 to 4) be bytes for the IED. Then, the IED is given by:

$$IED(X) = \sum_{j=4}^{5} C_{o,j} \cdot X^{5-j} = \{I(X) \cdot X^2\} \bmod \{G_E(X)\} \quad [\text{Eq 1}]$$

provided that $$I(X) = \sum_{j=0}^{3} C_{o,j} \cdot X^{3-j} \quad [\text{Eq 2}]$$

$$G_E(X) = \prod_{k=0}^{1} (X + \alpha^k)$$

where α is the primitive root of the primitive polynomial.

$$P(X) = X^8 + X^4 + X^3 + X^2 + 1 \quad [\text{Eq 3}]$$

Next, 6-byte RSV will be explained below. The first byte of the RSV is used as seed information for scramble. The remaining 5 bytes are reserved (0h).

The error detection code (EDC) is a 4-byte check code, and is appended to 2060 bytes of the data frame before scramble. Assume that the MSB of the first byte of the data ID is b16511, and the LSB of the last byte is b0. Then, respective bits bi (i=31 to 0) for the EDC are:

$$EDC(X) = \sum_{i=31}^{0} biX^i = I(X) \bmod\{g(X)\} \quad [\text{Eq 4}]$$

provided that $$I(X) = \sum_{i=16511}^{32} biX^i \quad [\text{Eq 5}]$$

$$g(X) = X^{32} + X^{31} + X^4 + 1$$

FIGS. 10A and 10B are views for explaining an example of initial values of a shift register upon scrambling main data, and that shift register. FIG. 10A shows an example of initial values to be given to a feedback shift register upon generating a scrambled frame, and FIG. 10B shows the feedback shift register used to generate a scramble byte. In this case, 16 different preset values are prepared.

Bits r7 (MSB) to r0 (LSB) are shifted by 8 bits and are used as a scramble byte. An initial preset number in FIG. 10A is equal to 4 bits (b7 (MSB) to b4 (LSB)) of the data ID. At the beginning of scramble of the data frame, an initial value of r14 to r0 must be set to be an initial preset value in the table of FIG. 10A.

An identical initial preset value is used for 16 successive data frames. Next, an initial preset value is switched, and the switched identical preset value is used to the next 16 successive data frames.

Lower 8 bits r7 to r0 of the initial value are extracted as scramble byte S0. After that, 8-bit shift is made, and the next scramble byte is extracted. Such operation is repeated 2047 times. When scramble bytes S0 to S2047 are extracted from r7 to r0, the data frame is expressed by main byte Dk to scrambled byte Dik.

This scrambled byte Dik is given by:

$$D'k = DK \text{<+>} Sk \text{ for } k=0 \text{ to } 2047 \quad [\text{Eq 6}]$$

where the symbol <+> means Exclusive-OR logical operation.

The configuration of an ECC block will be described below (D) (E).

Figure 11:
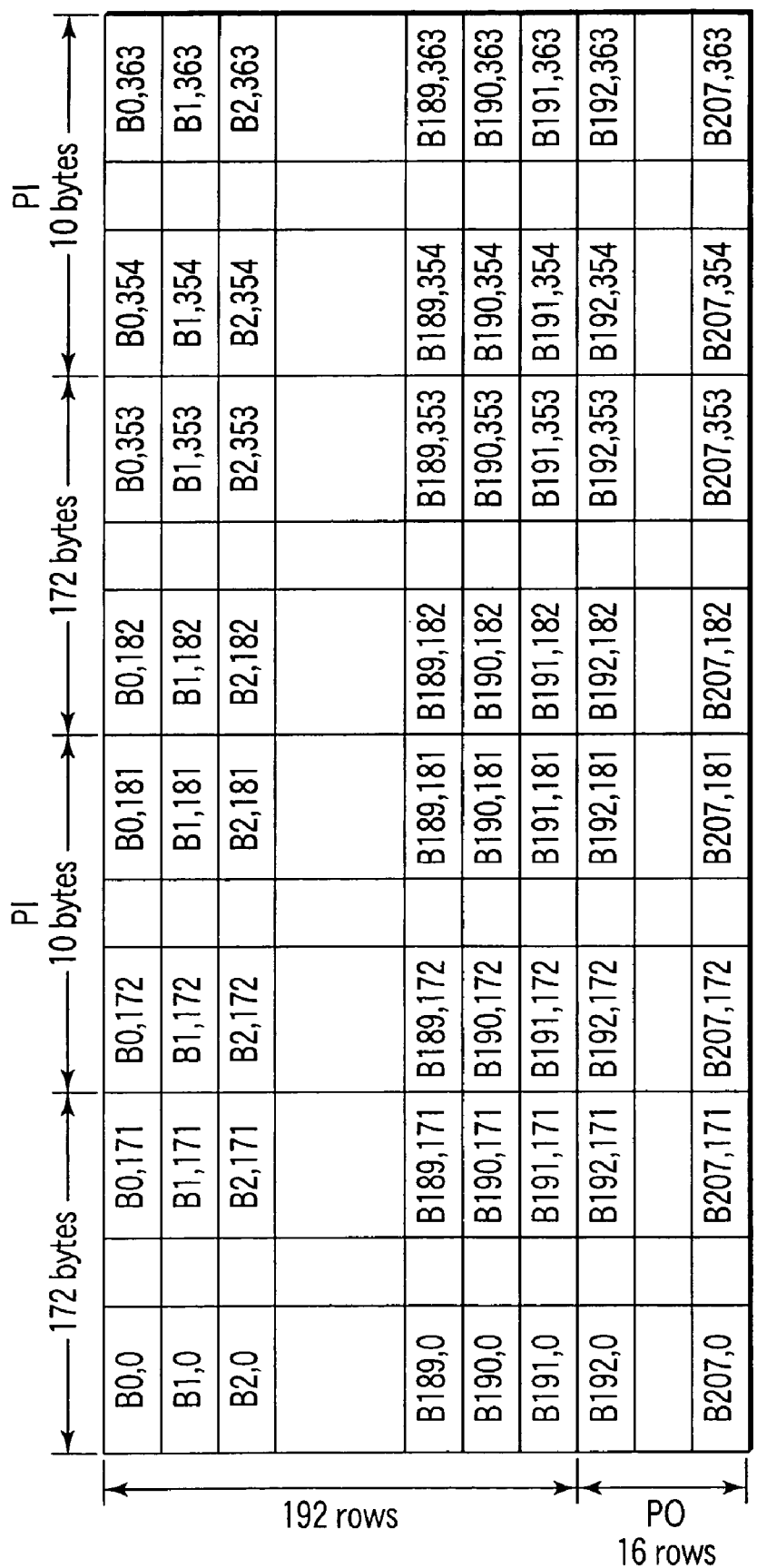
FIG. 11 is an explanatory view showing the structure of an ECC block.

FIG. 11 shows an ECC block. The ECC block is made up of 32 successive scrambled frames. 192 rows+16 rows (column direction) and (172+10)×2 columns (row direction) are arranged. Each of B0,0, B1,0, . . . is one byte. PO and PI are error correction codes, i.e., parity data of outer-codes and parity data of inner-codes.

Figure 12:
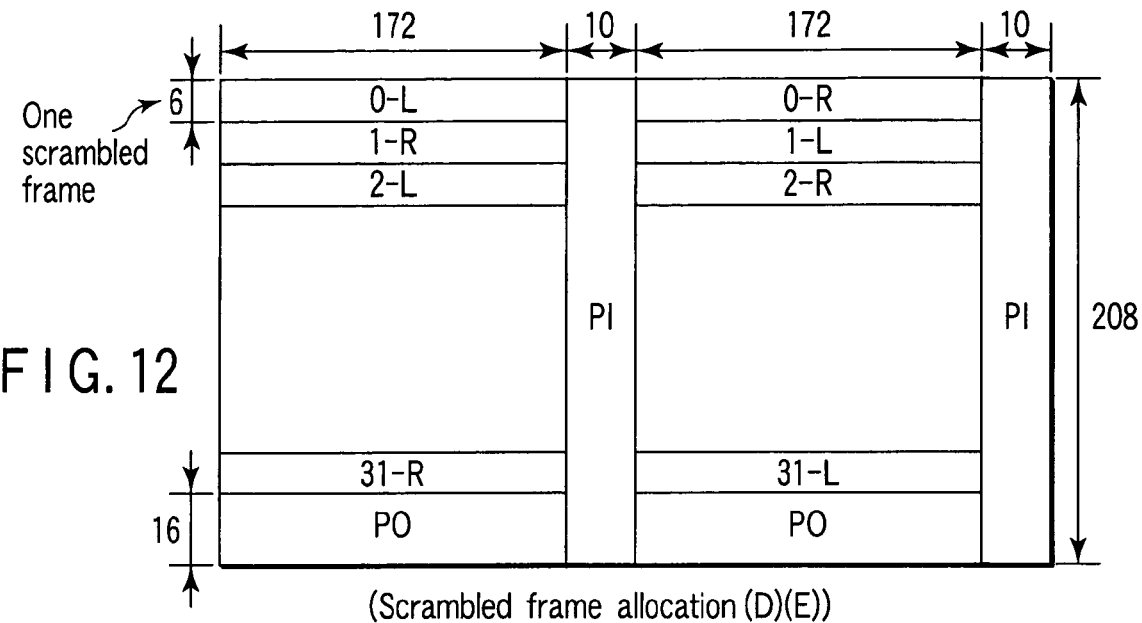
FIG. 12 is an explanatory view showing an allocation example of scrambled frames.

In the ECC block shown in FIG. 11, a (6 rows×172 bytes) unit is handled as one scrambled frame. FIG. 12 shows the scrambled frame allocation obtained by rewriting FIG. 11. Furthermore, this system handles (block 182 bytes×207 bytes) as a pair. If L is assigned to respective scrambled frame numbers in the left ECC block, and R is assigned to those in the right ECC block, scrambled frames are allocated, as shown in FIG. 12. That is, left and right scrambled frames alternately appear in the left block, and right and left scrambled frames alternately appear in the right block.

That is, the ECC block is formed of 32 successive scrambled frames. Respective rows on the left half of an odd sector are replaced by those on the right half. 172 bytes×192 rows are equal to 172 bytes×12 rows×32 scrambled frames to form an information field. 16-byte PO data is appended to 172×2 columns to form outer code RS (208, 192, 17). Also, 10-byte PI (RS(182, 172, 11)) data is appended to 208×2 rows of the right and left blocks. PI data is also appended to PO rows.

Numerals in frames indicate scrambled frame numbers, and suffices R and L indicate the right and left halves of the scrambled frames. PO and PI data shown in FIG. 11 are generated in the following sequence.

Initially, 16-byte Bi,j (i=192 to 207) is appended to column j (j=0 to 171 and j=182 to 353). This Bi,j is defined by:

$$R_j(X) = \sum_{i=192}^{207} B_{i,j} \cdot X^{207-i} = \{I_j(X) \cdot X^{16}\} \bmod \{G_{PO}(X)\} \quad [\text{Eq 7}]$$

provided that $$I_{j,k}(X) = \sum_{i=0}^{191} B_{m,n} \cdot X^{191-i} \quad [\text{Eq 8}]$$

$$G_{PO}(X) = \prod_{k=0}^{15} (X + \alpha^k)$$

The above polynomial of [Eq7] forms outer code RS (208, 192, 17) for 172×2 columns.

Next, 10-byte Bi,j (j=172 to 181 and j=354 to 363) is appended to row i (i=0 to 207). This Bi,j is defined by:

(For $j = 172$ to $181$)

$$R_i(X) = \sum_{j=172}^{181} B_{i,j} \cdot X^{181-j} = \{I_i(X) \cdot X^{10}\} \bmod \{G_{PI}(X)\} \quad [\text{Eq 9}]$$

provided that $$I_i(X) = \sum_{j=0}^{171} B_{i,j} \cdot x^{171-j} \quad [\text{Eq 10}]$$

$$G_{PI}(X) = \prod_{k=0}^{9} (X + \alpha^k)$$

(For $j = 354$ to $363$) [Eq 11]

$$R_i(X) = \sum_{j=354}^{363} B_{i,j} \cdot X^{363-j} = \{I_i(X) \cdot X^{10}\} \bmod \{G_{PI}(X)\}$$

provided that $$I_i(X) = \sum_{j=182}^{353} B_{i,j} \cdot X^{353-j} \quad [\text{Eq 12}]$$

$$G_{PI}(X) = \prod_{k=0}^{9} (X + \alpha^k)$$

where α is the primitive root of the primitive polynomial.

$$P(X) = X^8 + X^4 + X^3 + X^2 + 1 \quad [\text{Eq 13}]$$

The above polynomials of [Eq9] and [Eq11] form inner code RS (182, 172, 11) for (208×2)/2 rows.

Figure 13:
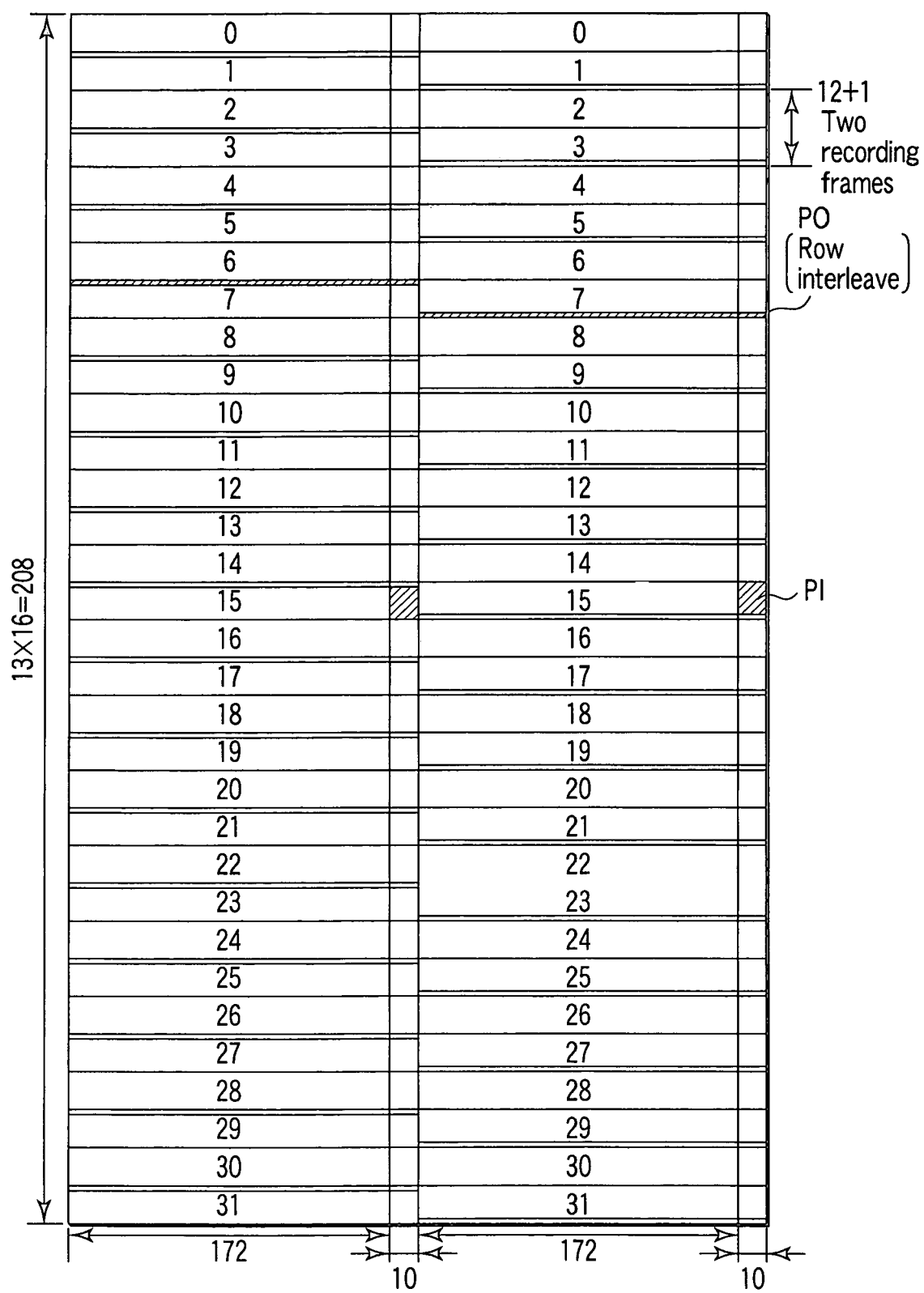
FIG. 13 is a view showing a state wherein parity of outer-code (PO) is interleaved to right and left blocks in an ECC block.

FIG. 13 shows the state wherein parity data of outer-codes (PO) are interleaved to the left and right blocks. Bi,j as elements of a B matrix shown in FIG. 11 form 208 rows× 182×2 columns. This B matrix is interleaved between neighboring rows so that Bi,j are re-allocated as Bm,n. This interleave rule is described by:

$$m = i + \lfloor (i+6)/12 \rfloor * \quad n = j \quad \{\text{when } i \leq 191, j \leq 181\} \quad [\text{Eq 14}]$$

$$m = (i-191) \times 13 - 7 \quad n = j \quad \{\text{when } i \geq 192, j \leq 181\}$$

$$m = i + \lfloor i/12 \rfloor * \quad n = j \quad \{\text{when } i \leq 191, j \geq 182\}$$

$$m = (i-191) \times 13 - 1 \quad n = j \quad \{\text{when } i \geq 192, j \geq 182\}$$

where $*\lfloor p \rfloor$ indicates a maximum integer which is not larger than p.

As a result, 16 parity rows are distributed one by one, as shown in FIG. 13. That is, each of 16 parity rows is allocated every two recording frames. Therefore, a recording frame consisting of 12 rows has 12 rows+1 row. After this row interleave, 13 rows×182 bytes are referred to as a recording frame. Therefore, the ECC block after row interleave is made up of 32 recording frames. In one recording frame, six rows are present in each of the right and left blocks, as described in FIG. 12. Also, PO is allocated at different rows in the left block (182×208 bytes) and right block (182×208 bytes). FIG. 12 shows one complete ECC block. However, in actual data reproduction, such ECC blocks are successively input to an error correction processor. In order to improve the correction performance of such error correction process, the interleave scheme shown in FIG. 13 is adopted.

Figure 14A:
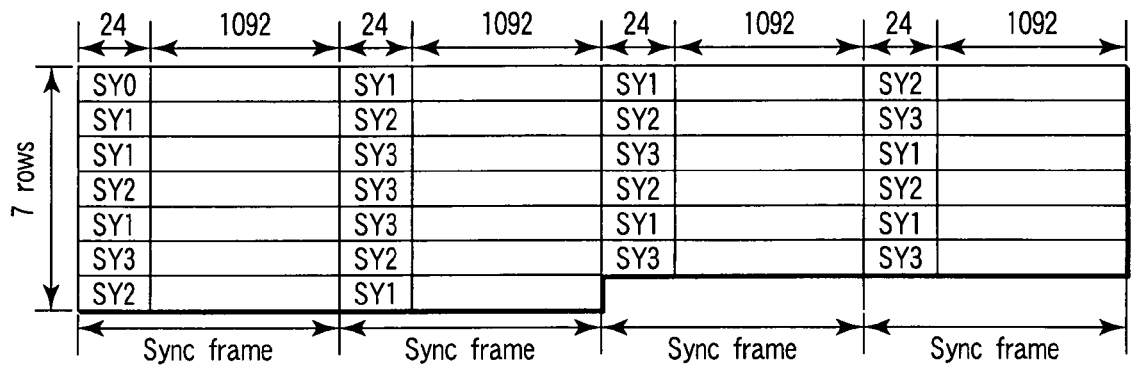
FIGS. 14A and 14B are views for explaining an example of the configuration of recorded data fields (even and odd fields)
Figure 14B:
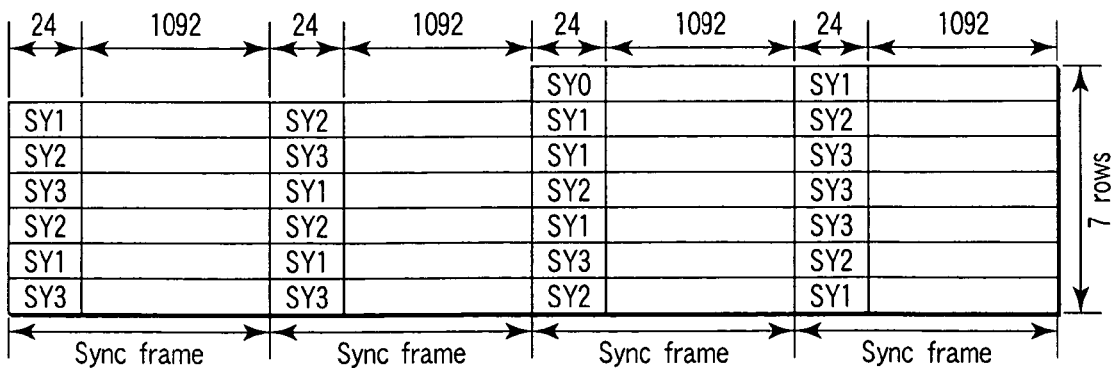

FIGS. 14A and 14B show an example of the configuration of recorded data fields (even and odd fields).

In FIGS. 14A and 14B, PO (Parity Out) information shown in FIG. 13 is inserted in sync data areas in the last two sync frames (i.e., portions where the last "sync code=SY3" portion and subsequent "sync data", and "sync code=SY1" portion and subsequent "sync data" are juxtaposed) in each of the even and odd recorded data fields.

More specifically, "part of left PO" shown in FIG. 12 is inserted in the last two sync frames in the even recorded data field, and "part of right PO" shown in FIG. 12 is inserted in the last two sync frames in the odd recorded data field. As shown in FIG. 12, one ECC block is formed of right and left "small ECC blocks", and data of different PO groups (PO belonging to the left small ECC block or PO belonging to the right small ECC block) are alternately inserted for respective sectors.

[Description of Individual Points in Embodiment of Present Invention and Unique Effects of Individual Points]

F) This embodiment is characterized in that the Sync frame structure is changed, as shown in FIGS. 14A and 14B, depending on whether the sector number of each sector which forms one ECC block, which specifies a plurality of different Sync frame structures in accordance with sectors that form the ECC block, is an even or odd number. That is, a structure in which data of different PO groups are alternately inserted for respective sectors (FIG. 13) is adopted.

. . . [Effect] In this structure, even after an ECC block is formed, the data ID is allocated at the head position of each sector. Hence, the data position upon access can be confirmed at high speed. Since PO data which belong to different small ECC blocks are inserted together in a single sector, the structure that adopts the PO insertion method shown in FIG. 13 can be simple. Hence, information extraction for each sector after the error correction process in the information reproduction apparatus can be facilitated, and an ECC block data assemble process in the information recording/reproduction apparatus can be simplified.

○ This embodiment has a structure having different PO interleave/insertion positions in right and left blocks (FIG. 13).

. . . [Effect] In this structure, even after an ECC block is formed, the data ID is allocated at the head position of each sector. Hence, the data position upon access can be confirmed at high speed.

FIG. 15 is a view for explaining an example of the practical contents of a sync code. A sync code has two states, i.e., State0 and State1 in correspondence with the modulation rules in the embodiment of the present invention. For each state, four different sync codes "SY0" to "SY3" are set. The existing DVD standard adopts RLL(2, 10) (Run Length Limited: d=2, k=10: the minimum value of a range of "0" run is 2, and its maximum value is 10) of 8/16 modulation (convert 8 bits into 16 channel bits), and four states, i.e., State1 to State4, and eight different sync code "SY0" and "SY7" are set in modulation. Compared to the existing DVD standard, the number of types of sync codes is greatly reduced in the embodiment of the present invention. The information recording/reproduction apparatus or information reproduction apparatus identifies the type of sync code by pattern matching upon reproducing information from the information storage medium. Since the number of types of sync codes is greatly reduced as in the embodiment of the present invention, the number of target patterns required for matching is reduced to simplify the process required for pattern matching, thus improving not only the processing efficiency but also the recognition speed.

As shown in FIG. 15, a sync code in the embodiment of the present invention is formed of the following parts.

<1> Sync Position Detection Code Part

. . . This part has a pattern common to all sync codes, and forms a fixed code area. By detecting this code, the allocation position of a sync code can be detected. More specifically, this part means the last 17 channel bits "01000 000000 001001" in each sync code shown in FIG. 15.

<2> Conversion Table Selection Code Part Upon Modulation

. . . This part forms a part of a variable code area, and stores a code which changes in correspondence with a State number upon modulation. This part corresponds to the first one channel bit in FIG. 15.

<3> Sync Frame Position Identification Code Part

This part stores a code used to identify each of types "SY0" to "SY3" in a sync code, and forms a part of a variable code area. This part corresponds to the 2nd to 7th channel bits in each sync code shown in FIG. 15. As will be described later, this code part allows to detect a relative position in a single sector from a combined pattern of successively detected three sync codes.

The embodiment of the present invention adopts RLL(1, 9) of 4/6 modulation as the modulation method. That is, 4 bits are converted into 6 channel bits upon conversion, and the minimum value (d value) of the range of a "0" run is 1, and its maximum value (k value) is 9. In the embodiment of the present invention, higher-density recording than the conventional system can be achieved since d=1, but a sufficiently large reproduction signal amplitude is hardly obtained at the densest mark portion.

As shown in FIG. 33, an information recording/reproduction apparatus according to the embodiment of the present invention has PR equalization circuit 130 and Viterbi decoder 156, and allows very stable signal reproduction using the PRML (Partial Response Maximum Likelihood)

technique. Since k=9, a run of 10 "0"s or more never appears in the modulated general channel bit data. Using this modulation rule, the above "sync position detection code part" has a pattern which never appears in the modulated general channel bit data.

That is, as shown in FIG. 15, 11 (k+2) "0"s successively appear in the "sync position detection code part". The information recording/reproduction apparatus or information reproduction apparatus finds this portion to detect the position of the sync position detection code part. If "0"s successively appear too long, a bit shift error readily occurs. In order to relax such adverse effect, a pattern with a short run of "0"s is allocated immediately after the 11 "0"s in the sync position detection code part.

In the embodiment of the present invention, since d=1, "101" can be set as a corresponding pattern. However, since a sufficiently large reproduction signal amplitude is hardly obtained at the densest mark portion, "1001" is allocated instead to form the pattern of the "sync position detection code part", as shown in FIG. 15.

The embodiment of the present invention is characterized in that only "SY0" of the four different sync codes shown in FIG. 15 is allocated at the first sync frame position in a sector, as shown in FIGS. 14A and 14B. As this effect, by only detecting "SY0", the head position in a sector can be immediately detected, and the head position extraction process in a sector can be greatly simplified. Also, as another characteristic feature, all combination patterns of three successive codes are different in a single sector.

FIG. 16 is a view for explaining comparative example 1 of combination patterns (column direction) of successive sync codes (upon moving between sectors). In the embodiment shown in FIGS. 14A and 14B, "SY0" appears at the sync frame position of the head of a sector in both the even and odd recorded data fields, and "SY1" and "SY1" follow. The combination pattern of three sync codes in this case is (0, 1, 1) by arranging only their sync code numbers. FIG. 16 shows a change in pattern by arranging such combination pattern in the column direction, and arranging, in the row direction, patterns obtained by shifting the combined codes one by one. For example, sync code numbers are arranged in the order of (0, 1, 1) in a column with the latest Sync Frame number="02" in FIG. 16.

The sync frame position "02" indicates the third sync frame position from the left in the uppermost row in the even recorded data field in FIG. 14A. A sync code at this sync frame position is "SY1". When intra-sector data are successively reproduced, a sync code at the immediately preceding sync frame position is "SY1", and a sync code two codes before is "SY0" (sync code number="0").

As can be seen from FIG. 16, all combination patterns of three sync code numbers arranged in the column direction are different from each other within the latest sync frame number range from "00" to "25". By utilizing this feature, the position in a single sector can be detected from the combination patterns of three successive sync codes.

The sixth row in FIG. 16 represents the number of changes in sync code number in pattern changes upon shifting the combination of three successive sync codes by one code. For example, sync code numbers are arranged in the order of (0, 1, 1) in a column with the latest Sync Frame number="02". A combination pattern obtained by shifting this combination by one code is described in a column with the latest sync frame number="03", and is (1, 1, 2). Upon comparing these two patterns, the central sync code remains the same ("1→1"), but the code before the central code changes like "0→1", and that after the central code changes like "1→2". Hence, the codes change at a total of "two positions", and the number of code changes between neighboring patterns is "2".

As can be seen from FIG. 16, a large characteristic feature of the present invention lies in that sync code numbers in a sector are arranged so that the number of code changes between neighboring patterns is 2 or more within the full latest sync frame number range from "00" to "25" (that is, sync code numbers in each combination pattern obtained by shifting a combination of three successive sync codes by one code change at least at two or more positions).

FIG. 17 is a view for explaining comparative example 2 of combination patterns (column direction) of successive sync codes (upon extending across a guard area). As will be described later using FIGS. 20A and 20B and FIG. 23, in the embodiment of the present invention, a specific data structure of the read-only information storage medium, and additionally recordable and rewritable information storage media have guard areas between neighboring ECC blocks. The first sync code is allocated in a PA (Postamble) area in this guard area, and the sync code in that guard area is set to be "SY1", as shown in FIG. 17. By setting the sync code number in this way, even when two sectors are allocated to sandwich the guard area between them, the number of code changes between neighboring patterns obtained upon shifting the combination of three successive sync codes by one code can always be maintained to be "2 or more", as shown in FIG. 17.

The seventh row in each of FIGS. 16 and 17 represents the number of code changes upon shifting the combination of three successive sync codes by two codes. For example, a pattern obtained by shifting, by two codes, the combination of sync code numbers in a column with the latest sync frame number="02" in which sync code numbers are arranged in the order of (0, 1, 1) corresponds to a column with the latest sync frame number="04", and sync code numbers are arranged in the order of (1, 2, 1) in this column. At this time, the sync code number after the central code remains unchanged ("1→1"), but the sync code number before the central code changes like "0→1", and the central sync code number changes like "1→2". Hence, the codes change at a total of "two positions", and the number of code changes upon shifting the combination by two codes is "2".

In an ideal state, i.e., when an "information storage medium is free from any defects", and neither "frame shift" nor "tracking error" occur upon successively reproducing information recorded on the information storage medium, sync code data are accurately detected in turn simultaneously with reproduction of frame data. In this case, neighboring patterns obtained by shifting the combination by one code are detected as combination patterns of three successive sync codes.

Upon adopting the sync code arrangement according to the embodiment of the present invention shown in FIGS. 14A and 14B, sync code numbers change at least at two positions in the combination patterns of three successive sync codes, as shown in FIGS. 16 and 17. Therefore, if only one sync code number changes between neighboring combination patterns, it is highly likely that some sync codes (numbers) are erroneously detected or a tracking error has occurred.

Even when an out-of-sync state has occurred due to some cause upon reproducing information on the information storage medium and the sync timing has shifted for one sync frame, the current reproduction position in a single sector can be confirmed on the basis of a combination pattern with two preceding sync codes upon detection of the next sync code. As a result, the sync timing can be reset by shifting it by one sync frame (by correcting the reproduction position).

When an out-of-sync state has occurred during continuous reproduction and the sync timing that has shifted for one sync frame is detected, pattern changes obtained by shifting the combinations of three successive sync codes by two codes appear. The seventh row in each of FIGS. 16 and 17 shows the number of sync code number change positions in a pattern.

A frame shift amount upon occurrence of a frame shift is "±1 sync frame" in most cases. Hence, most of frame shifts can be detected as long as a pattern change situation upon shifting for one sync frame is determined. As can be seen from the seventh row in each of FIGS. 16 and 17, upon occurrence of a frame shift for ±1 sync frame, the sync code arrangement method according to the embodiment of the present invention is characterized in that:

a] most of patterns have two or more sync code number change positions;

b] only patterns near the head of a sector have only one sync code number change position (only patterns with the latest sync frame numbers="03" and "04"); and c] only detected combination patterns (1, 1, 2) or (1, 2, 1) (those with the latest sync frame numbers="03" and "04") and (1, 2, 2) or (2, 1, 2) (those which are obtained by shifting one sync frame (by shifting the combinations by two codes) from the patterns with the latest sync frame numbers="03" and "04") have one sync code number change position.

With the above features, in most of cases (even when a frame shift has occurred, the shift amount is ±1 sync frame), it is determined that [some "detection error of a sync code" or "tracking error" has occurred, when the number of sync code number change positions in the combination pattern of three successive sync codes is only one, and the detected combination pattern corresponds to none of (1, 1, 2), (1, 2, 1), (1, 2, 2), and (2, 1, 2)].

Upon occurrence of a tracking error, it can be detected by checking continuity of data IDs shown in FIG. 6 or that of wobble address information (to be described later) (the continuity is disturbed when the tracking error has occurred).

FIG. 18 is a view for explaining an example of the relationship between the detected pattern contents and abnormal phenomenon contents upon detecting of an unexpected combination pattern of sync codes. By exploiting the features of the sync code arrangement method according to the embodiment of the present invention shown in FIGS. 14A and 14B, one of a "frame shift", "detection error of a sync code", and "tracking error" can be identified depending on a change in combination pattern of three successive sync codes. The aforementioned contents are summarized in FIG. 18.

A large characteristic feature of the embodiment of the present invention lies in that "frame shift" or "detection error of a sync code/tracking error" can be identified by determining whether or not the number of sync code number change positions in a pattern is only one.

In FIG. 18, pattern change states in respective cases are summarized in the column direction (vertical direction). For example, in case 1, "frame shift" is determined when a detected pattern has two or more different sync code number change positions from the expected combination pattern, and matches a pattern shifted by ±1 sync frame from the expected pattern. By contrast, in case 2, "frame shift" is determined only when the following three states are detected at the same time: "the detected pattern has only one different sync code number change position from the expected pattern", "the detected pattern matches a pattern shifted by ±1 sync frame from the expected pattern", and "the detected pattern corresponds to one of (1, 1, 2), (1, 2, 1), (1, 2, 2), and (2, 1, 2)".

[Description of Individual Points in Embodiment of Present Invention and Unique Effects of Individual Points]

J) By devising the allocation, the number of code changes upon shifting a combination of three successive sync codes is set to be two or more (FIGS. 16 to 18).

. . . [Effect] A recorded sync code cannot often be correctly read due to dust or scratches attached to the surface of the information storage medium or small defects on a recording film (light reflection film), and is recognized as another sync code number (detection error). In the conventional DVD sync code arrangement, neighboring combination patterns of sync codes have only one sync code number change position. For this reason, if a sync code number of one sync code is erroneously read (detected), it is erroneously determined that a frame shift has occurred, and the sync timing is reset to a wrong position. In such case, the remaining frame data except for the sync codes in the sync frame is assigned to a wrong position in an ECC block shown in, e.g., FIG. 13, and unwantedly undergoes an error correction process.

The frame data size for one sync frame corresponds to half a line in the right and left small ECC blocks which form the ECC block shown in FIG. 13. Therefore, when frame data is assigned to a wrong position in the ECC block for one sync frame, the error correction performance considerably impairs, and such assignment error influences all data in the ECC block.

By devising the sync code arrangement so that the number of code changes upon shifting the combination of three successive sync codes by one code is two or more like in the embodiment of the present invention, even when a sync code number is erroneously detected due to dust or scratches attached to the surface of the information storage medium or small defects on a recording film (light reflection film), determination errors of a frame shift can be minimized, and a large error correction performance drop of the ECC block can be prevented.

Furthermore, even when even when only one unexpected sync code number is detected in the combination pattern of sync codes, "whether or not a sync code is erroneously detected" can be determined. Hence, an [automatic correction process] (ST7 in FIG. 37) that automatically corrects the erroneous detection result to a correct sync code number can be executed. As a result, the reliability of the sync code detection process and the sync process using the detection result can be remarkably improved compared to the conventional DVD.

○ Even in the allocation in which the sector structures without any guard areas are repeated, it is devised to set the number of code changes to be two or more;

○ Even when the sector structures are allocated to sandwich guard areas between them, it is devised to set the number of code changes to be two or more.

Figure 23:
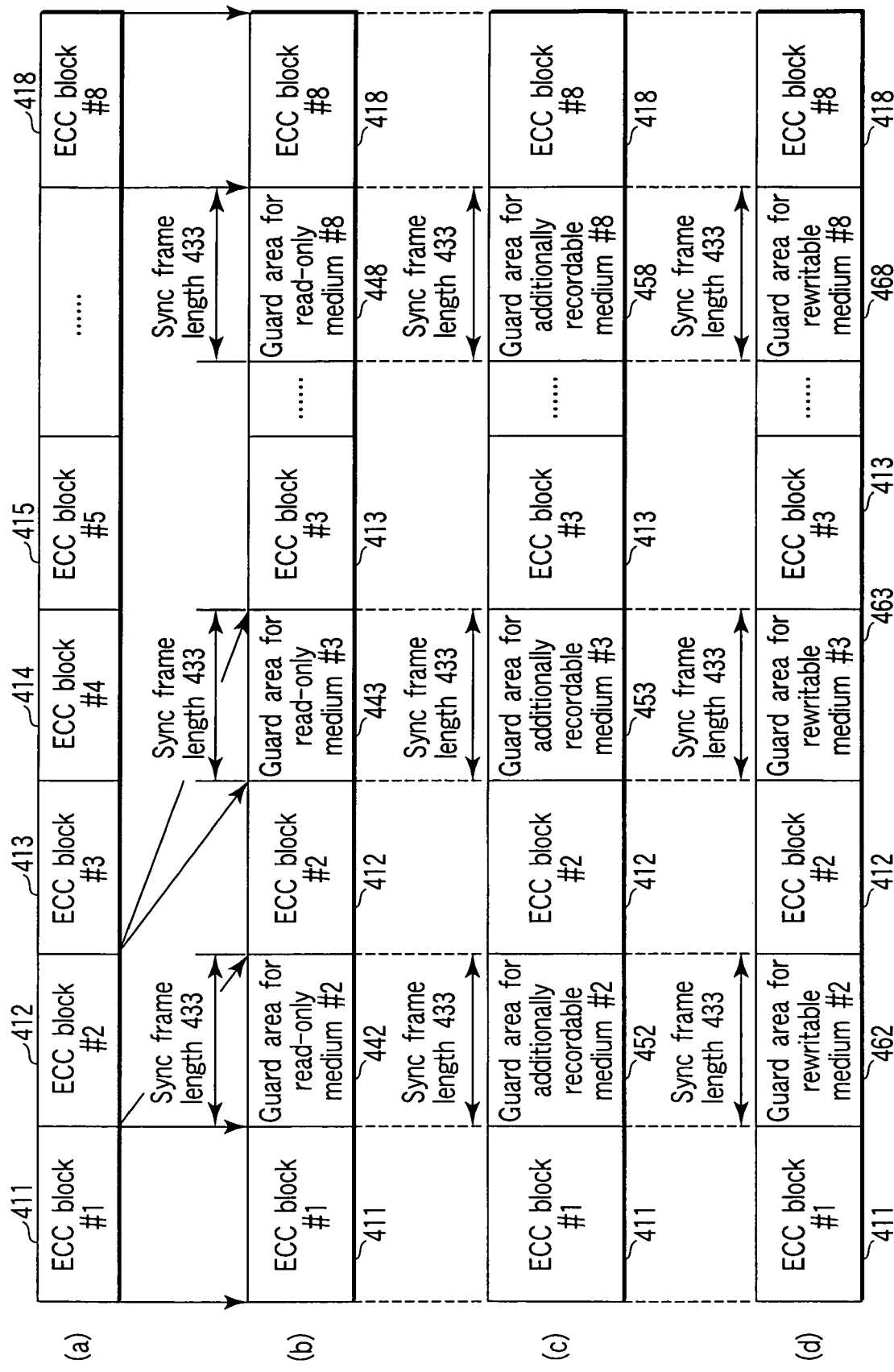
FIG. 23 is a view for explaining data recording format examples of various information recording media (read-only, additionally recordable, rewritable) by comparison.

. . . [Effect] Even when there are two different data recording formats of a read-only information storage medium, as shown in FIGS. 20A and 20B and FIG. 23, the same detection method using the sync code arrangement can also be used for additionally recordable and rewritable information storage media independently of the data recording formats. Hence, compatibility associated with the medium types and data recording format (on a read-only information storage medium) in terms of sync detection can be assured. As a result, a detection processing circuit/processing program using the sync code arrangement can be commonized independently of the medium type and recording format, and a simple arrangement and price reduction of the information recording/reproduction apparatus can be achieved.

4] First Embodiment of Read-only Information Storage Medium (Next-Generation DVD-ROM) According to Embodiment of Present Invention (C)

The embodiment of the present invention admits two different data structures of recording data on a read-only information storage medium (next-generation DVD-ROM), and allows the contents provider to select one of these structures depending on data contents to be recorded.

4-1) Description of Data Structure in First Embodiment of Read-Only Information Storage Medium (Next-Generation DVD-ROM) According to Embodiment of Present Invention FIG. 19 is a view for explaining an example of a data unit of recording data on an information storage medium. Information storage medium 221 in FIG. 19 is configured to record digital information on areas 401 (ECC blocks) partitioned by a plurality of sectors using the sync frame structure shown in FIGS. 14A to 17.

In the embodiment of the present invention, data to be recorded on information storage medium 221 has a hierarchical structure of recording data shown in FIG. 19 independently of the type (read-only/additionally recordable/rewritable) of information storage medium 221.

That is, one ECC block 401 as the largest data unit that allows error detection or correction of data is made up of 32 sectors 230 to 241. Sectors 230 to 241 shown in FIG. 19 have the same contents as those of sectors 231 to 238 to be recorded for respective packs shown in FIG. 13. As has already been explained using FIGS. 14A and 14B, and as shown in FIG. 19 again, each of sectors 230 to 241 consists of 26 sync frames #0 420 to #24 429. One sync frame includes sync code 431 and sync data 432, as shown in FIG. 19. One sync frame contains data of 1116 channel bits (24+1092), as shown in FIGS. 14A and 14B, and sync frame length 433 as a physical distance required to record this one sync frame on information storage medium 211 is nearly constant all over the medium (when a change in physical distance for intra-zone synchronization is removed).

A characteristic feature of the embodiment of the present invention also lies in that a plurality of different recording formats can be set even on a read-only information storage medium [corresponding to point (C) of invention]. More specifically, two different recording formats to be described in the first and second embodiments of read-only information storage media are available.

FIGS. 20A and 20B are views for explaining the difference between the first and second embodiments by comparison when the embodiment of the present invention is applied to a read-only information storage medium.

FIG. 20A shows the first embodiment, and ECC blocks #1 411 to #5 415 are successively recorded on information storage medium 221 to have no physical spaces between neighboring ECC blocks. By contrast, the second embodiment is different from the first embodiment in that guard areas #1 441 to #8 448 are inserted between neighboring ECC blocks #1 411 to #8 418, as shown in FIG. 20B [corresponding to point (H) of invention]. The physical length of each of guard areas #1 441 to #8 448 matches sync frame length 433.

As can be seen from FIGS. 14A and 14B, since the physical distance of data to be recorded on information storage medium 221 is handled to have sync frame length 433 as a basic unit, management of the physical allocation of data to be recorded on information storage medium 221 and access control to data can be facilitated by matching the physical length of each of guard areas #1 441 to #8 448 with sync frame length 433.

4-2) Common Part to Second Embodiment of Read-only Information Storage Medium (Next-Generation DVD-ROM) According to Embodiment of Present Invention Each of lead-in and lead-out areas adopts a data structure that records data without any gaps.

. . . [Effect] If different data structures are adopted over the entire area in the information storage medium, it may take much time for the reproduction apparatus to determine the data structure to be used at the beginning of first reproduction of the information storage medium, and the reproduction start time may delay unnecessarily. Since some areas (lead-in and lead-out areas) of an information storage medium adopt a common data structure, these areas can be accessed first upon startup (at the beginning of reproduction of the information reproduction apparatus or information recording/reproduction apparatus immediately after the information storage medium is loaded), and minimum required information can be reproduced in the identical format. Therefore, reproduction can be stably and quickly started upon startup.

4-3) Recording Location of Identification Information of Two Different Formats [Corresponding to Point (C) of Invention]

○ A common format must be used in a single disc (the format cannot be changed from the middle of the disc);
as another embodiment,
○ Two different formats are allowed to be used in a single disc together in accordance with the contents to be recorded; or
○ Format identification flag information (whether or not two formats are locally included) of a DVD-ROM is recorded on a disc;
  ☆ The format identification flag information is recorded in a control data zone shown in FIG. 17;
  ☆ The format identification flag information is recorded in a recordable area; and
    For a rewritable information storage medium, the identification flag is recorded in a disc identification zone in a rewritable data zone (although not shown).

5] Second Embodiment of Read-Only Information Storage Medium (Next-Generation DVD-ROM) According to Embodiment of Present Invention 5-1) Description of Structure that Allocates "ROM-Compatible Guard Areas" Between Neighboring ECC Blocks The recording format of the second embodiment of the read-only information storage medium according to the embodiment of the present invention adopts a structure that inserts guard areas #1 441 to #8 448 between neighboring ECC blocks #1 411 to #8 418, as shown in FIG. 20B [corresponding to point (C) of invention].

5-2) Description of Detailed Data Structure in "ROM-Compatible Guard Area" in Second Embodiment [Corresponding to Point (H) of Invention]

The reproduction operation in conventional ROM media must read out an error correction block that contains a request data block first. For this purpose, a position where the designated block may be present is calculated and estimated based on, e.g., a block number difference or the like from the current position, thus starting a seek operation. After the seek operation has reached the estimated designated position, read clocks are extracted from information data to attain channel bit synchronization, frame sync signal detection, and symbol synchronization, so as to read out symbol data, and a block number is then detected to confirm the designated block.

More specifically, in general ROM media reproduction, only an RF signal specified by information pits is available as a detection signal. Hence, all processes such as disc rotation control, information linear velocity detection, and generation of channel bit read clocks as data read clocks are done using the RF signal. Since a recordable/reproducible medium has address information or the like as the goal of the embodiment of the present invention in a signal format different from the recording format of data information so as to designate a recording position, channel bit clock generation PLL or the like can detect a linear velocity or the like using such signal, and the oscillation frequency of PLL can be controlled to be in the neighborhood of an accurate channel bit clock frequency. For this reason, an optimal system that can shorten the PLL lockup time and can prevent runaway can be provided.

However, ROM media cannot use a similar control system since such signal is not available. Hence, a system is built using, e.g., maximum code length (Tmax) and minimum code length (Tmin) signals of conventional information signals. That is, it is important for ROM media to attain a PLL lock state as early as possible, and a signal format for that purpose is demanded. However, the data/track structure of ROM media such as existing CD-ROMs, DVD-ROMs, and the like is determined in consideration of only the recording density, and that of recordable/reproducible media is then built. Hence, different data streams are adopted for respective media.

Upon developing the recording system of next-generation media with a view to approximating the data streams of ROM media and recordable/reproducible media (R/RAM and the like), introduction of a recording density improving measure has been considered. As one of recording density improving techniques, an improvement of the modulation efficiency may be adopted, and introduction of a new modulation scheme that can reduce the shortest pit length (Tmin) with respect to the recording/reproduction beam size is examined. When the shortest pit length is reduced with respect to a beam system, a sufficiently large signal amplitude cannot be assured, and data can be read out by, e.g., the PRML technique, but it becomes difficult to attain phase detection of channel bit clock generation PLL required for channel bit separation. Since PLL lock facility in ROM media that depend only on the pit signal, as described above, becomes increasingly crucial due to introduction of the high-density technique, high-speed seek becomes harder to attain, and an auxiliary signal for such purpose must be inserted.

The recording format of the second embodiment of the read-only information storage medium according to the embodiment of the present invention also has as its object to implement control similar to the reproduction process of recordable/reproducible media by adopting, even for ROM media, a structure in which guard areas #1 441 to #8 448 are inserted between neighboring ECC blocks #1 411 to #8 418, as shown in FIG. 20B, and inserting signals required for seek facility and lock facility of channel bit clock generation PLL in each guard area.

Figure 21:
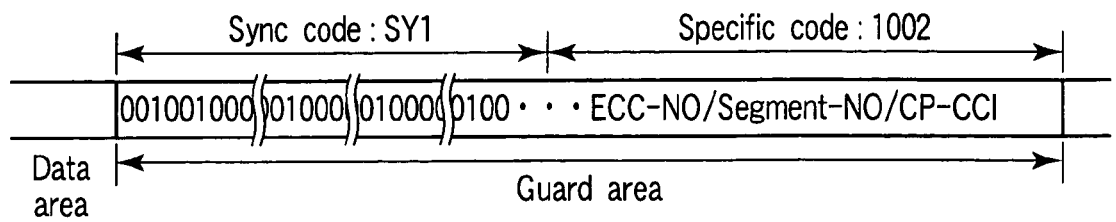
FIG. 21 is a view for explaining the data structure (example 1) in a guard area.

FIG. 21 shows an example of a guard area on ROM media. The guard area is made up of sync code: SY1 and specific code: 1002. Specific code: 1002 contains an error correction ECC block number, Segment-NO, copyright protection signal, and other control information signals. Specific code: 1002 can be used to allocate special control signals which are not stored in a data area. Such specific control signals include, for example, a copyright protection signal, media unique information signal, and the like, and high system expandability can be guaranteed by assuring such specific information area.

Figure 22:
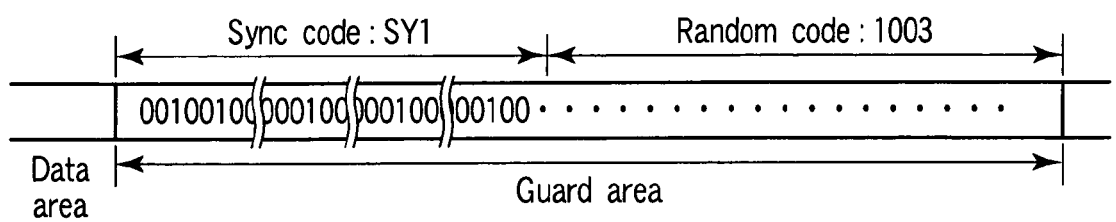
FIG. 22 is a view for explaining the data structure (example 2) in a guard area.

FIG. 22 shows another example. In the example shown in FIG. 22, the area of specific code: 1002 in FIG. 21 is used to allocate a random signal (random code 1003) that allows channel bit clock generation PLL to easily attain a lock state.

In order to allow PLL to easily attain a lock state in conventional recording media such as a DVD-RAM and the like, repetition signals with a given code length (VFO: Variable Frequency Oscillator) are inserted. ROM media are more likely to adopt a differential phase detection method as a tracking error signal detection method. In this differential phase detection method, if the signal pattern of a neighboring track remains approximate to that of the current track, a tracking error signal cannot be detected due to crosstalk from the neighboring track. For this reason, it is inappropriate to adopt a VFO signal formed of a signal of given periods used in recording media or the like. On the other hand, with the shortest code length upon using, e.g., the PRML scheme to attain higher density, many signals cannot undergo differential phase detection by channel bit clock generation PLL. In terms of PLL phase lock facility, the detection sensitivity increases with increasing number of times of phase detection, and such point must be taken into consideration.

Hence, the area of random code 1003 in FIG. 22 is configured to introduce a random signal as a combination of limited code lengths obtained by omitting some code lengths on the shortest pit side which have poor reliability in PLL phase detection, and those on the longest pit side at which the number of times of detection becomes small. That is, a random signal based on runlength-limited codes is used.

Note that specific code: 1002 in FIG. 21 may be scrambled using a random signal from a random number generator, whose initial value is designated by a segment number. Upon modulating scramble data at that time to a recording signal, it is desirable to modify a modulation table to obtain a runlength-limited recording signal stream. With this process, coincidence of neighboring track patterns in the area of specific code: 1002 can be prevented as in the scramble process function applied to the data area of an existing DVD-ROM.

6] Description of Relationship on Format Between Recordable Information Storage Medium and Read-Only Information Storage Medium (Next-Generation DVD-ROM) According to Embodiment of Present Invention FIG. 23 is a view for explaining examples of the data formats of various information storage media (read-only, additionally recordable, rewritable) by comparison. The relationship on the recording format between a recordable information storage medium and the read-only information storage medium according to the embodiment of the present invention. In FIG. 23, (a) and (b) transcribe the first and second embodiments of the read-only information storage medium shown in FIGS. 20A and 20B intact. On a recordable information storage medium, guard areas each having the same length as sync frame length 433 are formed between neighboring ECC blocks #1 411 to #8 418, as in the second embodiment of the read-only information storage medium. Note that the guard areas of the read-only information storage media and guard areas #2 452 to #8 458 of an additionally recordable information storage medium shown in (c) of FIG. 23 use different patterns of data (recording marks) to be recorded on each guard area.

Likewise, guard areas #2 442 to #8 448 of the read-only information storage medium shown in (b) of FIG. 23 and guard areas #2 462 to #8 468 of a rewritable information storage medium shown in (d) of FIG. 23 use different patterns of data (recording marks) to be recorded on each header area. In this way, the type of information storage medium 221 can be determined.

According to the embodiment of the present invention, in both the additionally recordable and rewritable information storage media, the information additional recording and rewrite processes are executed for respective ECC blocks #1 411 to #8 418.

In the embodiment of the present invention, a PA (Postamble) area (not shown) is formed at the start position of each of guard areas 442 to 468 in any of (a) to (d) of FIG. 23, and a sync code (SY1) with a sync code number="1" is allocated at the head position of that PA area, as shown in the PA column of FIG. 17.

The method of using the guard areas of the read-only information storage medium has been explained in section [5] above. Methods of using guard areas of the read-only and recordable information storage media depending on their difference will be explained again with reference to (b), (c), and (d) of FIG. 23.

Note that the additionally recordable information storage medium is a write-once storage medium that allows a recording operation only once, and normally undergoes a continuous recording process. When recording is made for specific blocks, a method of recording a next data block after the previously recorded block by an additional recording scheme is adopted. For this reason, a term "additionally recordable information storage medium" is used in FIG. 23.

Prior to a description of the difference of the guard structures of respective media, a difference of data streams of the read-only information storage medium and recordable information storage medium will be explained. On the read-only information storage medium, the designated relationship between channel bits and symbol data remains fixed in all data blocks as well as guard areas. However, on the additionally recordable information storage medium, at least the channel bit phases may change between blocks where the recording operation halts. On the rewritable information storage medium, since a rewrite process is made for respective ECC blocks, the phase may change for respective ECC blocks. That is, the channel bit phases remain fixed from the beginning to the end on the read-only medium, but the channel bit phases may largely change in guard areas on the recordable medium.

On the other hand, on the recordable medium, a recording track groove is physically formed on a recording track, and is wobbled for the purpose of recording rate control, insertion of addressing information, and the like. For this reason, the oscillation frequency of channel bit clock generation PLL can be controlled, and runaway of the oscillation frequency can be prevented in the processing operation such as variable speed reproduction. However, since the additionally recordable information storage medium after recording is used as a read-only medium, coincidence of recording signal patterns between neighboring tracks must be avoided in anticipation of the adoption of the differential phase detection method as the tracking error detection method described in section [5].

When the rewritable information storage medium adopts a structure that does not use the differential phase detection (DPD) method as the tracking error detection method, no problem is posed about coincidence of information signal patterns between neighboring tracks. In such case, a guard area preferably adopts a structure that allows channel lock generation PLL to easily lock, i.e., the area of random code 1003 in FIG. 22 preferably stores a signal of given periods like a VFO signal.

Due to the presence of different natures depending on the types of media, guard area 442 in (b) of FIG. 23, guard area 452 in (c), and guard area 462 in (d) adopt optimized data structures that consider the natures of the media.

The header area of the read-only information storage medium preferably stores a pattern that allows easy linear velocity detection, and a lock facilitation signal of channel bit generation PLL based on a random signal.

The header area of the additionally recordable information storage medium preferably stores a lock facilitation signal of channel bit generation PLL based on a random signal, which can cope with phase variation in the header area, since the oscillation frequency of channel bit clock generation PLL is prevented from running away by wobbling detection and can undergo neighborhood control.

It is optimal for the rewritable information storage medium to adopt a VFO pattern of given periods as a PLL lock facilitation signal, and to use other header mark signals and the like.

Since different guard areas are used depending on the types of information storage media, media identification is facilitated. Also, a copyright protection system can improve the protection performance, since read-only and recordable media use different guard areas.

[Description of Individual Points in Embodiment of Present Invention and Unique Effects of Individual Points]

H) The Guard Area Allocation Structure Between Neighboring ECC Blocks (FIG. 23)

. . . [Effect] The read-only, additionally recordable, and rewritable media can be quickly and easily identified;

Different data contents are used among the read-only, additionally recordable, and rewritable media (→ used in identification);

A random signal is used in a DVD-ROM header;

. . . [Effect] Even when positions coincide with each other between neighboring tracks, DPD signal detection can be stably made based on the DVD-ROM header position.

Figure 24:
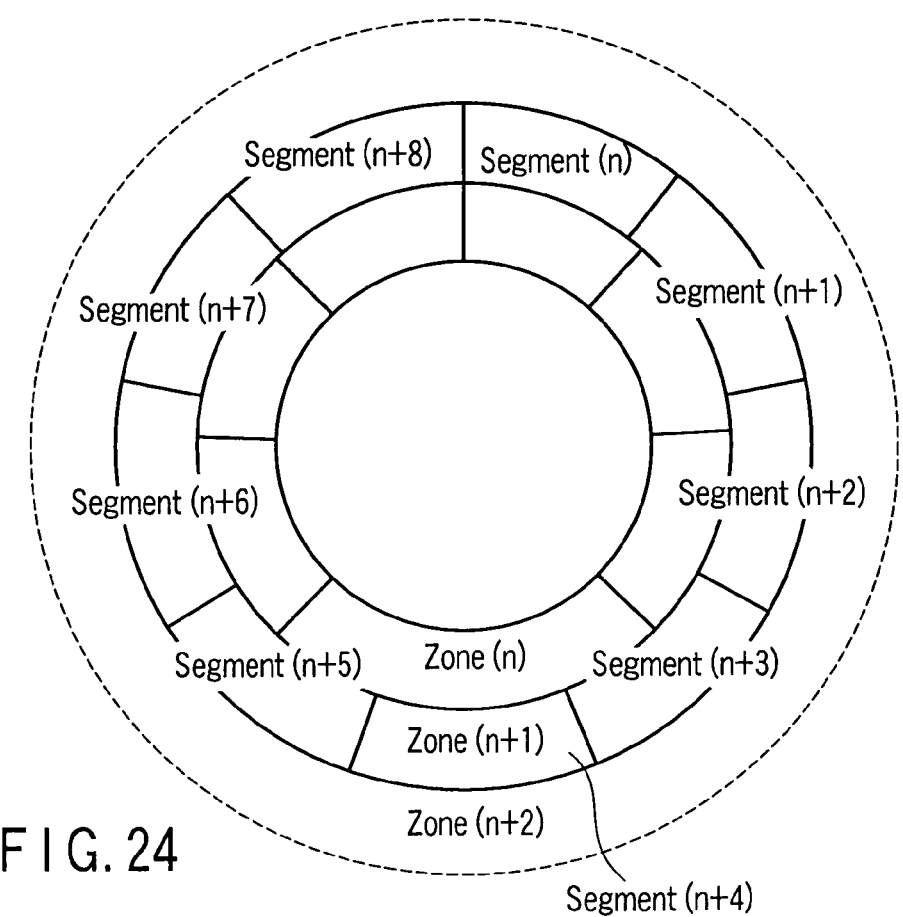
FIG. 24 is a view showing the zone structure of a rewritable information storage medium in the embodiment of the present invention.

FIG. 24 shows the zone structure of the rewritable information storage medium according to the embodiment of the present invention.

7-1) Description of Zone Structure

The rewritable information storage medium according to the embodiment of the present invention adopts a zone structure, as shown in FIG. 24. In the embodiment of the present invention, reproduction linear velocity: 5.6 m/s
channel length: 0.086 μm
track pitch: 0.34 μm
channel frequency: 64.8 MHz
recording data (RF signal): (1, 7)RLL
wobble carrier frequency: about 700 kHz (93T/wobble)
modulation phase difference [deg]: ±90.0
segment/track: 12 to 29 segments
zone: about 18 zones 7-2) Description of Recording Format of Address Information in Embodiment of Present Invention (Wobble Modulation Based on Phase Modulation+NRZ Method)

In the embodiment of the present invention, address information on a recordable information storage medium is recorded in advance using wobble modulation. As the wobble modulation method, phase modulation of ±90° (180°) is used, and an NRZ (Non Return to Zero) method is adopted. For a rewritable information storage medium, an L/G (Land and Groove) recording method is used. A large characteristic feature of the embodiment of the present invention also lies in that the wobble modulation method is adopted in the L/G recording method.

Figures 25, 26:
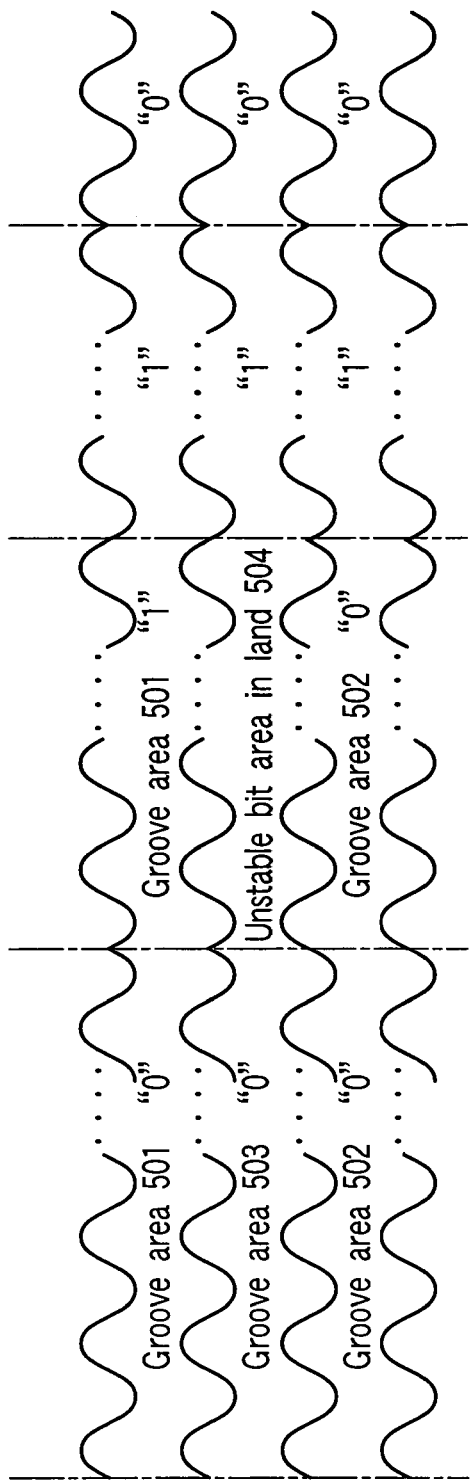
FIG. 25 is an explanatory view of 180° phase modulation and an NRZ method in wobble modulation.
FIG. 26 is an explanatory view of the principle of generation of unstable bits upon making wobble modulation by land (L)/groove (G) recording.

FIG. 25 is a view for explaining 180° phase modulation and the NRZ method in wobble modulation. A practical explanation will be given using FIG. 25. In the embodiment of the present invention, 1-address bit (or address symbol) area 511 is expressed by 8 or 12 wobbles, and the frequency, amplitude, and phase match throughout 1-address bit area 511. When identical address bit values continuously appear, the same phase continues at a boundary (indicated by each "black triangle mark" in FIG. 25); when the address bit is inverted, a wobble pattern is inverted (180° phase shift).

[Description of Individual Points in Embodiment of Present Invention and Unique Effects of Individual Points]

O) L/G Recording Adopts 180° (±90°) Wobble Phase Modulation (FIG. 25)

. . . [Effect] When an unstable bit is generated on a land due to a change in track number of a groove in "L/G recording+wobble modulation of a groove", the overall level of a reproduction signal changes from a recording mark recorded on that unstable bit, and the error rate of the reproduction signal locally impairs from that recording mark. However, since wobble modulation for a groove adopts 180° (±90°) phase modulation like in the embodiment of the present invention, the land width changes in a symmetrical and sinusoidal pattern at the unstable bit position on the land. Hence, a change in overall level of the reproduction signal from the recording mark has a very predictable pattern close to a sinusoidal pattern. Furthermore, when tracking is stably applied, the unstable bit position on the land can be estimated in advance. Hence, according to the embodiment of the present invention, a structure that can improve the reproduction signal quality by applying a correction process to the reproduction signal from a recording mark by circuits can be realized.

7-3) Description of Mixing of Unstable Bit Due to L/G Recording Method and Wobble Modulation As information indicating addresses on information storage medium 221, the rewritable information storage medium according to the embodiment of the present invention has three different kinds of address information: zone number information as zone identification information, segment number information as segment address information, and track number information indicating track address information. A segment number means a number in a round, and a track number means a number in a zone. When the zone structure shown in FIG. 24 is adopted, intra-zone identification information and segment address information of the address information assume identical values between neighboring tracks, but track address information assumes different address information values between neighboring tracks.

FIG. 26 is a view for explaining the principle of generation of an unstable bit upon making wobble modulation in land (L)/groove (G) recording. A case will be examined below wherein " . . . 0110 . . . " is recorded as track address information in groove area 501, and " . . . 0010 . . . " is recorded as track address information in groove area 502, as shown in FIG. 26. In such case, the land width of land area 503 sandwiched between "1" and "0" of neighboring groove areas periodically changes, thus generating an area where an address bit is not settled by wobbles. In the embodiment of the present invention, such area will be referred to as "unstable bit area 504".

When a focused beam spot has passed such unstable bit area 504, the total amount of light which is reflected by this area and returns via an objective lens (not shown) changes periodically due to a periodical change in land width. Since a recording mark is also formed in unstable bit area 504 in the land, the reproduction signal for that recording mark periodically varies due to the above influence, thus deteriorating the reproduction signal detection characteristics (deteriorating the error rate of the reproduction signal).

7-4) Description of Contents About Gray Code and Special Track Code (According to Embodiment of Present Invention) Adopted in Embodiment of Present Invention The embodiment of the present invention uses already known "gray codes" or special track codes newly invented in the embodiment of the present invention by improving the gray codes (corresponding to point (O) of invention] for the purpose of reducing the frequency of occurrence of unstable bit area 504.

FIG. 27 shows an example of gray codes. The gray code is characterized in that "only 1 bit changes" (like alternating binary patterns) every time a decimal number changes by "1".

FIG. 28 shows a special track code newly proposed by the embodiment of the present invention. This special track code is characterized in that "only 1 bit changes" every time a decimal value changes by "2" (track numbers m and m+2 change like alternating binary patterns), and for integer n, only the most significant bit changes between 2n and 2n+1 and all other lower bits match.

The special track codes in the embodiment of the present invention are not limited to the above specific example. For example, codes which are characterized in that "only 1 bit changes" every time a decimal value changes by "2" (track numbers m and m+2 change like alternating binary patterns), and an address bit changes while "holding a special relationship" between 2n and 2n+1 may be set.

[Description of Individual Points in Embodiment of Present Invention and Unique Effects of Individual Points]

P) Gray codes or special track codes are adopted for track addresses (FIGS. 27 and 28)

. . . [Effect] The frequency of occurrence of an unstable bit on a land due to a change in track number of a groove in "L/G recording+wobble modulation of a groove" is suppressed. At the unstable bit position on the land, the land width locally changes in a symmetrical pattern. As a result, not only a wobble detection signal cannot be obtained from the unstable bit position on the land, but also the overall level of the reproduction signal from the recording mark recorded on it changes, thus locally deteriorating the error rate of the reproduction signal from the recording mark. In this way, by suppressing the frequency of occurrence of an unstable bit on a land, the frequency of occurrence of such trouble position is suppressed, and the wobble detection signal and the reproduction signal from the recording mark can be stably reproduced.

8] Description of Embodiment of Segment Format

Figure 29:
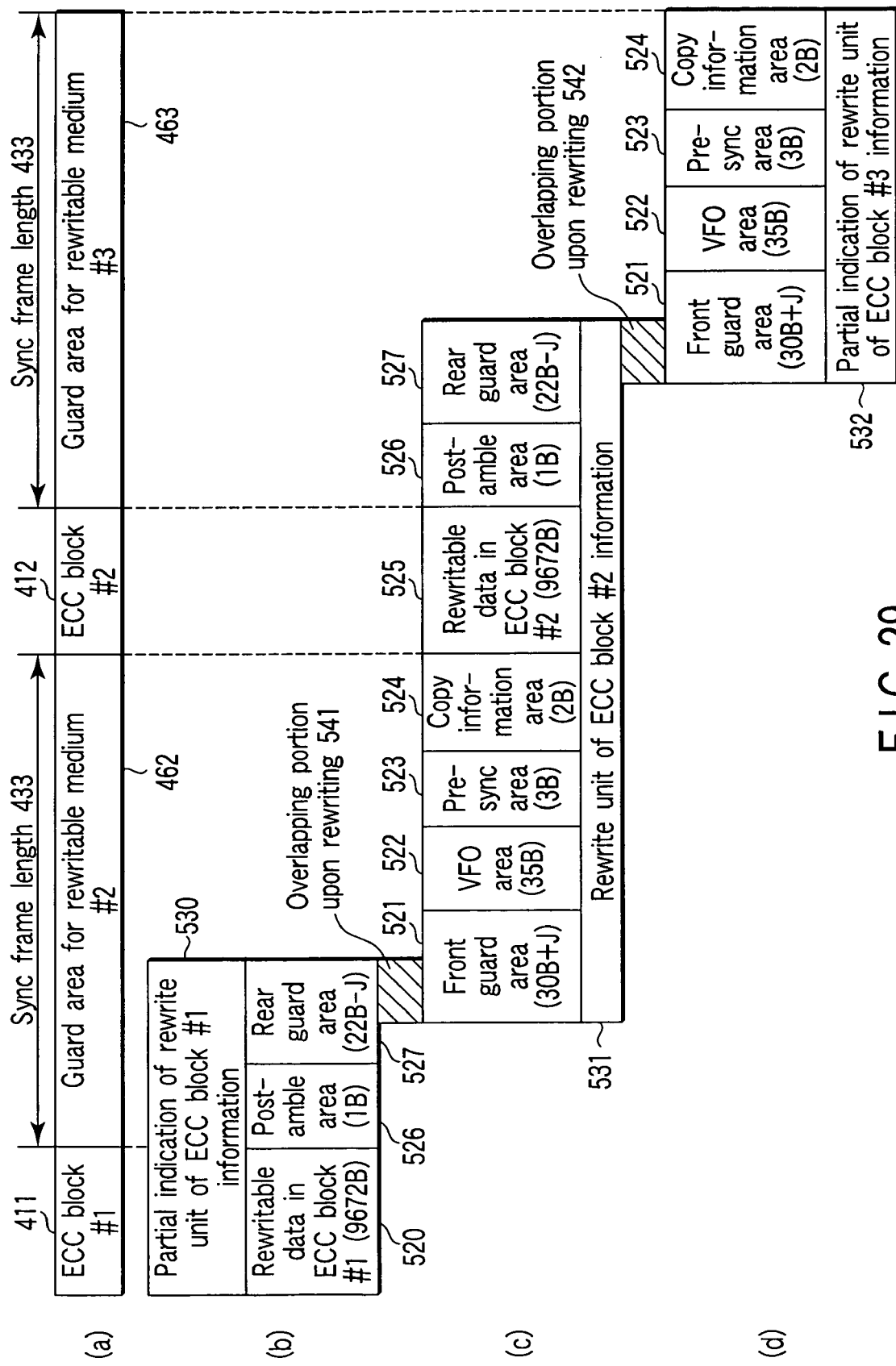
FIG. 29 is a view for explaining an example of a recording method of rewritable data to be recorded on a rewritable information storage medium.

FIG. 29 is a view for explaining an example of the recording method of rewritable data to be recorded on a rewritable information storage medium. FIG. 29 shows the recording format of rewritable data to be recorded on a rewritable information storage medium. In FIG. 29, (a) shows the same contents as those of (d) of FIG. 23 above. In the embodiment of the present invention, rewritable data is rewritten for respective ECC blocks. In FIG. 29, (c) shows the rewritable data structure in a rewritable unit. Rewritable data is rewritten on an information storage medium by rewrite unit 531 of ECC block #2 information. The data contents of rewritable data 525 in ECC block #2 have a data structure of the same format independently of the types of media such as a read-only information storage medium ((a) and (b) of FIG. 23), additionally recordable information storage medium ((c) of FIG. 23), and the like, and data for 9672 bytes can be recorded. That is, the data contents of rewritable data 525 in ECC block #2 have the structure shown in FIG. 13. Each sector data which forms an ECC block is made up of 26 sync frames, as shown in FIG. 19 or FIGS. 14A and 14B (data field structure).

As shown in (c) of FIG. 29, in rewrite unit 531 of ECC block #2 information, 2 bytes are assigned to copy-protection compatible copy information area 524 before rewritable data 525 in ECC block #2. Also, 3 bytes are set for pre-sync area 532 indicating the end position of a VFO area before area 524. VFO (Variable Frequency Oscillator) area 522 set for 35 bytes is used to attain synchronization upon reproduction of rewritable data 525. Immediately after rewritable data 525, postamble area 526 indicating the end position of rewritable data 525 is allocated.

Front and rear guard areas 521 and 527 are respectively allocated at the leading and trailing end portions of rewrite unit 531 of ECC block #2 information. Front guard area 521 has 30 bytes+J, and rear guard area 527 has 22 bytes−J. By changing the value "J", "random shift" that changes the write start/end position of rewrite unit 531 of ECC block #2 information can be realized. A phase change recording film has a feature in that the characteristic deterioration of the recording film readily conspicuously occurs at the write start/end position of rewritable data. However, in the embodiment of the present invention, the characteristic deterioration of the phase change recording film can be prevented by the aforementioned random shift.

For the purpose of comparison of the physical ranges of rewrite units, (b) of FIG. 29 shows part 530 of a rewrite unit of ECC block #1 information, and (d) of FIG. 29 shows part 532 of a rewrite unit of ECC block #3 information. A characteristic feature of the embodiment of the present invention lies in that data are rewritten so that front and rear guard areas 521 and 527 partially overlap each other to form overlapping portions 541 and 542 upon rewriting [corresponding to point (I) of invention]. Since data are rewritten so that guard areas partially overlap each other, interlayer crosstalk on a single-sided, dual-recording layer recordable information storage medium can be removed.

[Description of Individual Points in Embodiment of Present Invention and Unique Effects of Individual Points]

I) Guard areas are recorded to partially overlap each other in the recording format for a recordable information storage medium;

As shown in FIG. 29, front and rear guard areas 521 and 527 overlap each other to form overlapping portions 541 and 542 upon rewriting;

. . . [Effect] If a gap (where no recording mark is formed) is generated between front and rear guard areas between neighboring segments, since the light reflectance varies depending on the presence/absence of a recording mark, a light reflectance difference is macroscopically generated on that gap portion. For this reason, upon adopting a single-sided, dual-recording layer structure, an information reproduction signal from another layer is disturbed by the influence from that portion, and reproduction errors frequently occur. By making the guard areas partially overlap each other like in the embodiment of the present invention, a gap where no recording mark is formed can be prevented from being generated, and the influence of interlayer crosstalk from an already recorded area on the single-sided, dual recording layers can be removed, thus obtaining a stable reproduction signal.

Figure 30:
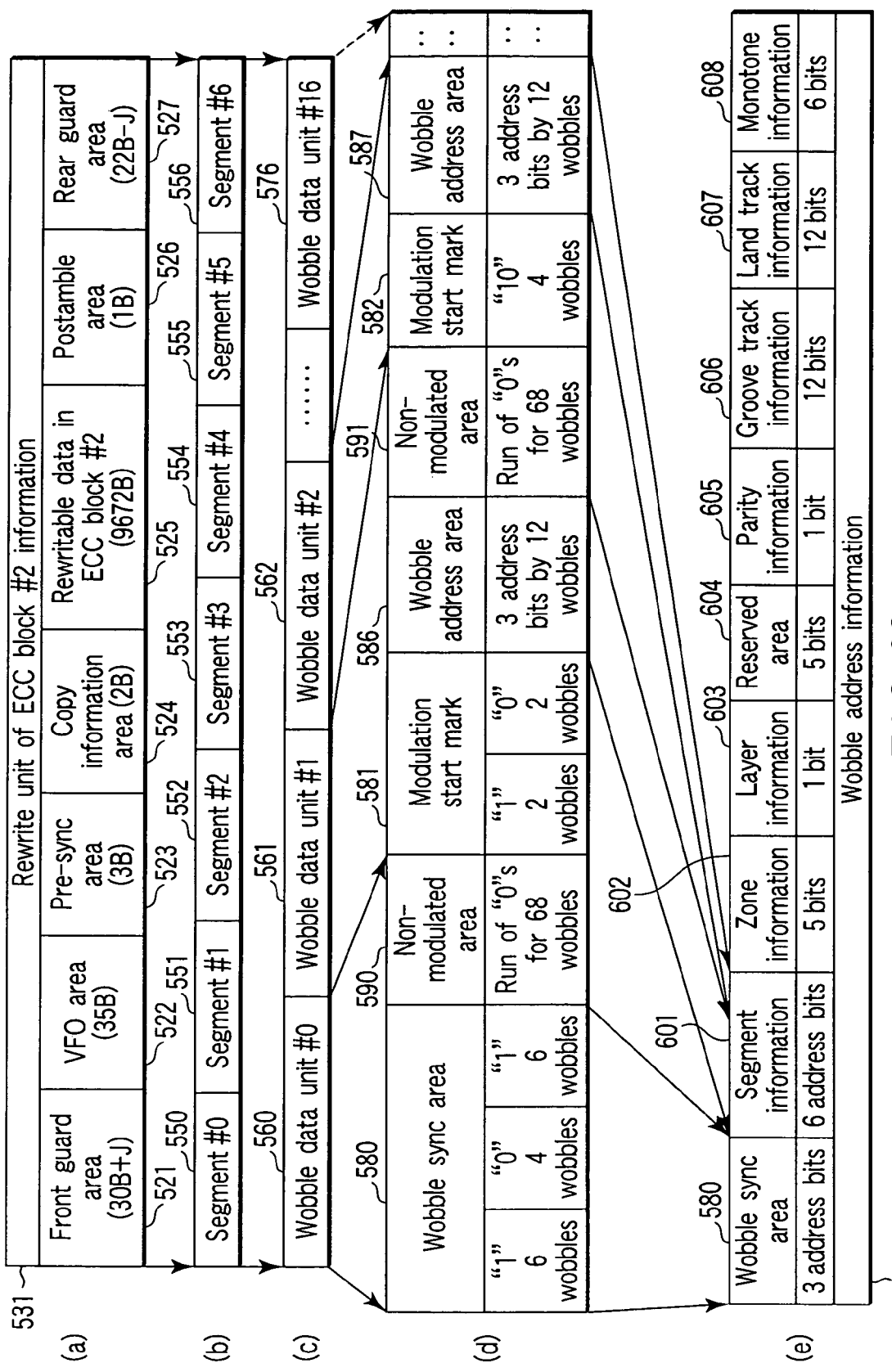
FIG. 30 is a view for explaining an example of the wobble address format on the information storage medium according to the embodiment of the present invention.

FIG. 30 is a view for explaining an example of the wobble address format on the information storage medium according to the embodiment of the present invention. The address information recording format using wobble modulation on the recordable information storage medium according to the embodiment of the present invention will be explained below using FIG. 30. A large characteristic feature of the address information setting method using wobble modulation according to the embodiment of the present invention likes in that "assignment is made using the sync frame length shown in FIG. 18 as a unit".

One sector is made up of 26 sync frames, as shown in FIGS. 14A and 14B, and one ECC block consists of 32 sectors, as can be seen from FIG. 13. Hence, one ECC block is formed of 832 (=26×32) sync frames. Since the length of each guard area present between neighboring ECC blocks matches one sync frame length, as shown in FIG. 29, a length as the sum of the guard area and ECC block is specified by 833 (=832+1) sync frames.

Since the value "833" can be factorized into prime factors as follows:

$$833 = 7 \times 17 \times 7 \qquad (1)$$

the structure allocation that utilizes this feature is adopted. That is, an area as the sum of the guard area and ECC block is segmented into "seven" wobble segments #0 550 to #6 556, as shown in (b) of FIG. 30, and wobble information 610 is recorded in advance in a wobble-modulated pattern for each of wobble segments #0 550 to #6 556. Furthermore, each of wobble segments #0 550 to #6 556 is segmented into 17 wobble data units #0 560 to #16 576 ((c) of FIG. 30).

As can be seen from equation (1), a length for seven sync frames is assigned to that of each of wobble data units #0 560 to #16 576. Each of wobble data units #0 560 to #16 576 is formed of a modulated area for 16 wobbles and non-modulated area 590 or 591 for 68 wobbles. A large characteristic feature of the embodiment of the present invention lies in that non-modulated area 590 or 591 has a very large occupation ratio to the modulated area.

Since a groove or land of non-modulated area 590 or 591 is always wobbled at a given frequency, PLL (Phase Locked Loop) is applied using these non-modulated areas 590 and 591, and reference clocks upon reproducing recording marks recorded on the information storage medium or recording reference clocks used upon recording new recording marks can be stably extracted (generated). In this manner, according to the embodiment of the present invention, by setting a very large occupation ratio of non-modulated area 590 or 591 to the modulated area, the precision and stability of extraction (generation) of the reproduction or recording reference clocks can be greatly improved.

Upon transition from non-modulated area 590 or 591 to the modulated area, modulation start mark 581 or 582 is set using four wobbles. Immediately after detection of this modulation start mark 581 or 582, wobble-modulated wobble address area 586 or 587 appears. In order to extract wobble address information 610 in practice, wobble sync area 580 and wobble address areas 586 and 587 in wobble segments #0 550 to #6 556 except for non-modulated areas 590 and 591 and modulation start marks 581 and 582 are collected, as shown in (d) and (e) of FIG. 30, and are re-allocated, as shown in (e) of FIG. 30.

Since the embodiment of the present invention adopts 180° phase modulation and the NRZ (Non Return to Zero) method, as shown in FIG. 25, an address bit (address symbol)="0" or "1" is set by the wobble phase="0°" or "180°".

As shown in (d) of FIG. 30, three address bits are set using 12 wobbles in each of wobble address areas 586 and 587. That is, four successive four wobbles form one address bit.

Since the embodiment of the present invention adopts the NRZ method, as shown in FIG. 25, no phase change takes place within four successive wobbles in each of wobble address areas 586 and 587. By utilizing this feature, wobble patterns of wobble sync area 580 and modulation start marks 581 and 582 are set. That is, wobble patterns which are never generated in wobble address areas 586 and 587 are set for wobble sync area 580 and modulation start marks 581 and 582, thus easily identifying the locations of wobble sync area 580 and modulation start marks 581 and 582.

The embodiment of the present invention is characterized in that four successive wobbles form one address bit in each of wobble address areas 586 and 587, while a 1-address bit length is set to be a length other than four wobbles at the positions of modulation start marks 581 and 582 and wobble sync area 580. That is, at the positions of modulation start marks 581 and 582, the four wobbles are further divided into two, i.e., two wobbles each, and a wobble bit changes like "1"→"0", as shown in (d) of FIG. 30. Also, in wobble sync area 580, an area where a wobble bit="1" is set to be "six wobbles" different from four wobbles. In addition, a full modulated area (for 16 wobbles) in one wobble data unit #9 560 is assigned to wobble sync area 580, thus facilitating detection of the start position of wobble address information 610 (the location of wobble sync area 580).

The contents of wobble address information 610 are as follows.

1. Track Information 606, 607

. . . Each information means a track number in a zone, and groove track information 606 that settles an address on a groove (no unstable bit is included→an unstable bit is generated on a land) and land track information 607 that settles an address on a land (no unstable bit is included→an unstable bit is generated on a groove) are alternately recorded. In only track information 606 and track information 607, track number information is recorded using gray codes shown in FIG. 27 or special track codes shown in FIG. 28.

2. Segment Address Information 601

. . . This information indicates a segment number in a track (within a round in information storage medium 221). If a segment number is counted from "0" as segment address information 601, a pattern "000000" as a run of "0"s for 6 bits appears in segment address information 601. In such case, it becomes difficult to detect the position of the boundary ("black triangle mark" portion) between neighboring address bit areas 511 shown in FIG. 25, and a bit shift that detects the position of the boundary between neighboring 1-address bit areas 511 while being shifted readily occurs. As a result, a determination error of wobble address information due to such bit shift occurs.

To avoid this problem, the embodiment of the present invention, the segmented number is counted from "000001". A characteristic feature of the embodiment of the present invention also lies in this point [corresponding to point (K) of invention].

3. Zone Identification Information 602

. . . This information indicates a zone number in information storage medium 221, and records a value "n" of "Zone (n)" shown in FIG. 24.

4. Recording Layer Identification Information 603

. . . Information storage media 221 according to the embodiment of the present invention has recording layer A 222 and recording layer B 223 independently of its media type (read-only, additionally recordable, or rewritable), and has a "single-sided, dual-recording layer" structure that allows reproduction or recording/reproduction from one surface side. Information indicating if the recording layer which currently undergoes reproduction or recording corresponds to recording layer A 222 or B 223 is recording layer identification information 603, and is designated by a recording layer number.

5. Parity Information 605

. . . This information is set for error detection upon reproduction from wobble address information 610. Seventeen address bits from segment information 601 to reserved information 604 are individually summed up, and if the sum is an even number, "0" is set; if it is an odd number, "1" is set.

6. Monotone Information 608

. . . As described above, each of wobble data units #0 560 to #16 576 is formed of a modulated area for 16 wobbles and non-modulated area 590 or 591 for 68 wobbles, and non-modulated area 590 or 591 has a very large occupation ratio to the modulated area. By further increasing the occupation ratio of non-modulated area 590 or 591, the precision and stability of extraction (generation) of the reference or recording reference clocks are improved.

An area that includes monotone information 608 shown in (e) of FIG. 30 correspond to those of wobble data unit #16 576 and wobble data unit #15 (not shown) immediately before unit #16 in (c) of FIG. 30 in their entirety. Monotone information 608 has all six address bits="0". Hence, no modulation start marks 581 and 582 are set in wobble data unit #16 576 and wobble data unit #15 (not shown) immediately before unit #16, which include this monotone information 608, and a non-modulated area with a uniform phase is formed.

[Description of Individual Points in Embodiment of Present Invention and Unique Effects of Individual Points]

G) The Segment Division Structure in ECC Block (FIG. 30)

. . . [Effect] High format compatibility among read-only, additionally recordable, and rewritable media can be assured and, especially, an error correction performance drop of a reproduction signal from recording marks in a rewritable information storage medium can be prevented.

Since the number of sectors=32 and the number of segments=7 which form an ECC block have an indivisible relationship (non-multiple relationship), an error correction performance drop of a reproduction signal from recording marks can be prevented.

[Description of Individual Points in Embodiment of Present Invention and Unique Effects of Individual Points]

K) Conditions are attached to the address number assignment method to address information (especially, segment address information)

. . . [Effect] The frequency of polarity inversion for respective symbols (address bits) of wobbles is increased to improve the detection precision of the boundary position of symbols (address bits);

○ An address number starts from "1" in place of "0" with which all bits assume identical values;

○ An address number in which three or more "1"s or "0"s successively appear is set as a missing number.

[Description of Individual Points in Embodiment of Present Invention and Unique Effects of Individual Points]

L) Address Information is Recorded by L/G Recording+ Wobble Modulation (FIG. 26)

. . . [Effect] The largest capacity can be attained. The recording efficiency can be improved by forming recording marks on both the grooves and lands rather than forming them on only the grooves. Also, when addresses are recorded in advance as prepits, recording marks cannot be recorded at prepit positions. However, according to the embodiment of the present invention, since recording marks can be recorded to be superposed on wobble-modulated groove/land areas, the wobble modulation address information recording method can assure higher recording efficiency of recording marks than the prepit address method. Therefore, the method that adopts both the schemes is suited to attain a largest capacity.

[Description of Individual Points in Embodiment of Present Invention and Unique Effects of Individual Points]

M) Unstable bits are also distributed and allocated on groove area (track information 606, 607 in (e) of FIG. 30)

. . . [Effect] Since a land portion is also provided with an area that can settle a track address without generating any unstable bit, precise address detection can also be made on the land portion.

Since an area that can settle a track address without generating any unstable bit can be estimated in advance on both the land and groove portions, the track address detection precision can be improved;

○ The groove width is locally changed upon formation of grooves to generate a constant land width area;

☆ The exposure amount is locally changed upon formation of the groove area to change the groove width;

☆ Two exposure focused beam spots are used upon formation of the groove area to change the groove width by changing the interval between the two spots;

○ An unstable bit is allocated in the groove area by changing the wobble amplitude width of the grooves.

[Description of Individual Points in Embodiment of Present Invention and Unique Effects of Individual Points]

N) Unstable bits are distributed and allocated on both land and groove by L/G recording+wobble modulation (track information 606, 607 in (e) of FIG. 30)

. . . [Effect] When unstable bits are concentrated and allocated on either the lands or grooves, the frequency of detection errors upon reproduction of address information from a portion where unstable bits are concentrated and allocated becomes very high. Since unstable bits are distributed and allocated on both the lands and grooves, the risk of detection errors is distributed, and a system which can stably and easily detect address information as a whole can be provided.

○ Upon locally changing the groove width, the groove width is controlled to obtain a constant land width of a neighboring portion;

An unstable bit is generated on the groove area of the groove-width changed portion, but any unstable bit can be avoided in the land area of the neighboring portion since its width is maintained constant.

The method of determining the position of currently reproduced data in a physical sector using an order of an arrangement of information in three successive sync codes based on the sync code allocation method shown in FIGS. 14A and 14B will be explained below using FIGS. 31 to 35.

Figure 31:
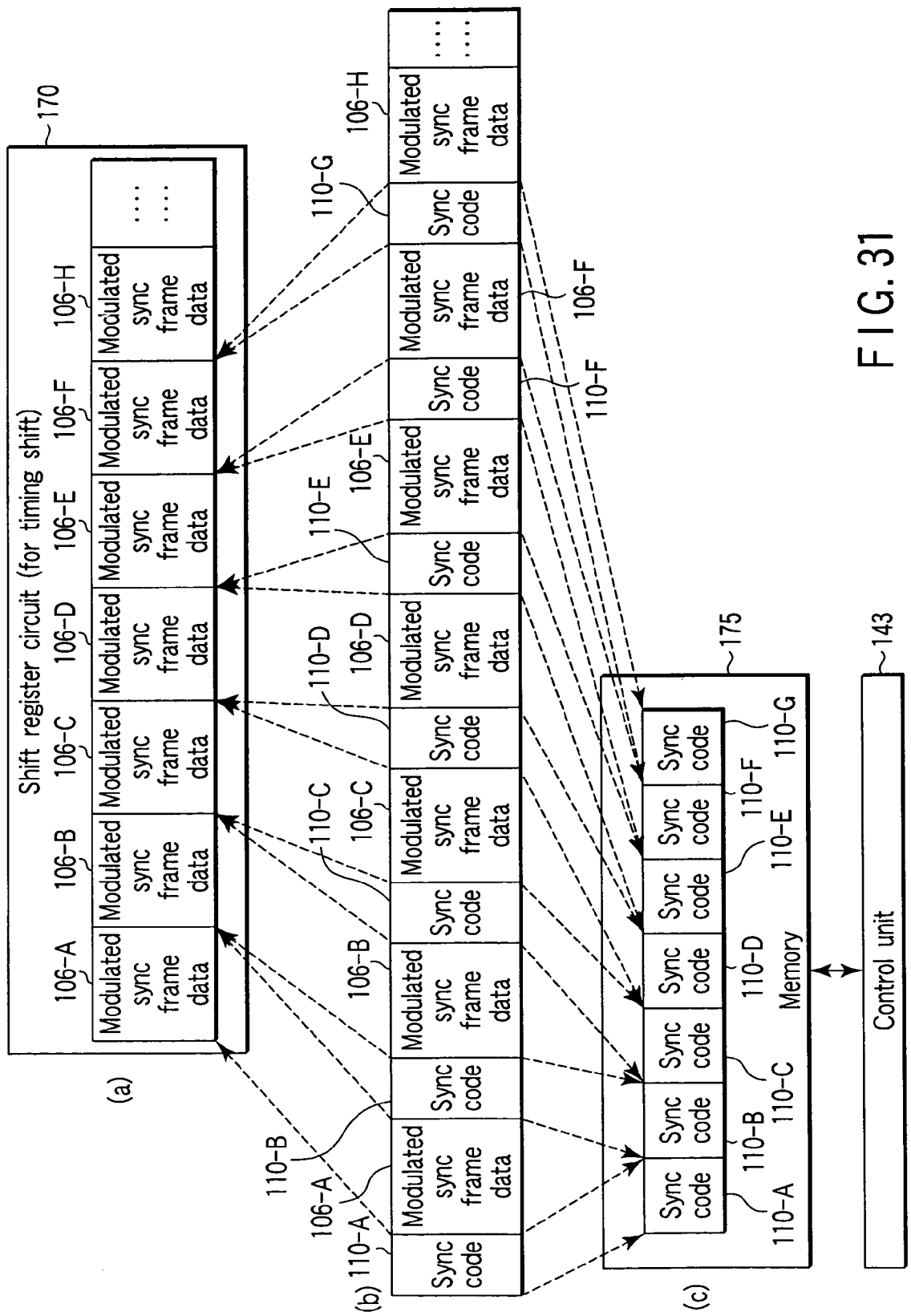
FIG. 31 is a view for explaining an example of a method of determining the sync frame position in one physical sector on the basis of the allocation order of sync frame identification codes in sync codes.
Figure 34:
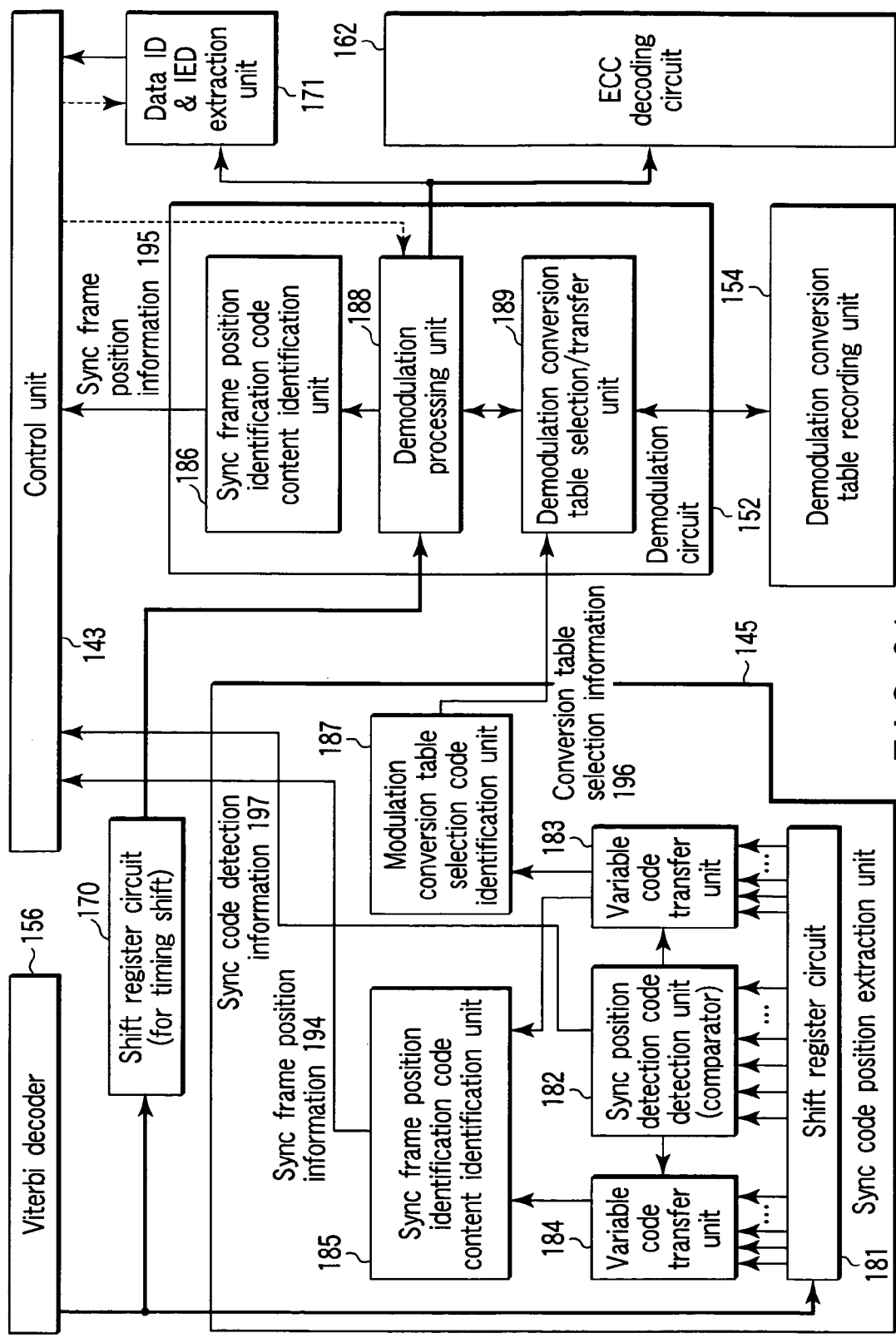
FIG. 34 is a block diagram for explaining an example of the detailed arrangement of a sync code position extraction unit (detection unit) in FIG. 33 and its peripheral components.

FIG. 31 is a view for explaining an example of the method of determining the sync frame position in one physical sector on the basis of the order of sync frame identification codes in sync codes. FIG. 32 shows a practical example upon determining the sync frame position from the order of sync frame identification codes (when the data fields shown in FIGS. 14A and 14B are adopted). FIG. 33 is a block diagram for explaining the arrangement of an information recording/reproduction apparatus according to the embodiment of the present invention. FIG. 34 is a block diagram for explaining an example of the detailed arrangement of a sync code position extraction unit (detection unit) in FIG. 33 and its peripheral components.

FIG. 33 shows the arrangement of the information reproduction apparatus or information recording/reproduction apparatus according to the embodiment of the present invention. In the embodiment of the present invention, the channel bit spacing is reduced nearly to the utmost limit so as to attain higher density of the information storage medium. As a result, when a pattern "101010101010101010101010" as repetitions of a pattern of, e.g., d=1 is recorded on the information storage medium, and that data is reproduced by information recording/reproduction unit 141, since it is approximate to the cutoff frequency of the MTF characteristics of a reproduction optical system, the signal amplitude of a reproduction signal is almost buried in noise. Hence, as a method of reproducing recording marks or pits whose density is increased nearly to the limit (cutoff frequency) of the MTF characteristics, the embodiment of the present invention uses the PRML (Partial Response Maximum Likelihood) technique.

That is, a signal reproduced from information recording/reproduction unit 141 undergoes reproduction waveform correction by PR equalization circuit 130. A/D converter 169 samples the signal output from PR equalization circuit 130 in synchronism with the timings of reference clocks 198 sent from reference clock generation circuit 160 so as to convert that signal into digital data. The digital data then undergoes a Viterbi decoding process in Viterbi decoder 156. The data after the Viterbi decoding process is processed as data which is the same as the conventional data binarized by the slice level. When the PRML technique is adopted, the error rate of data after Viterbi decoding increases if the sampling timing of A/D converter deviates. In order to improve the sampling timing precision, especially, the information reproduction apparatus or information recording/reproduction apparatus according to the embodiment of the present invention additionally comprises a sampling timing extraction circuit (a combination of Schmitt trigger binarization circuit 155 and PLL circuit 174).

The information reproduction apparatus or information recording/reproduction apparatus according to the embodiment of the present invention is characterized in that a Schmitt trigger circuit is used as a binarization circuit. This Schmitt trigger circuit has a characteristic that provides a specific width (forward voltage value of a diode in practice) to the slice reference level for binarization, and binarizes a value only when that specific width is exceeded. For example, when the pattern "101010101010101010101010" is input, as described above, no binarization switching takes place since the signal amplitude is very small. When, for example, a pattern "100100100100100100100100" coarser than the above pattern is input, since the amplitude of a reproduction signal becomes large, polarity switching of a binary signal occurs in synchronism with the timing of "1" in Schmitt trigger binarization circuit 155.

The embodiment of the present invention adopts the NRZI (Non Return to Zero Invert) method, and "1" positions of the pattern match pit edges (boundaries).

PLL circuit 174 detects frequency and phase differences between the binary signal as the output from Schmitt trigger binarization circuit 155 and reference clock signal 198 sent from reference clock generation circuit 160, and changes the frequency and phase of its output clocks. Reference clock generation circuit 160 applies feedback control to (the frequency and phase of) reference clocks 198 to decrease the error rate after Viterbi decoding using the output signal from PLL circuit 174 and decoding characteristic information (information of the convergence length (distance to convergence) in a path metric memory in Viterbi decoder 156 although not shown) of Viterbi decoder 156.

ECC encoding circuit 161, ECC decoding circuit 162, scramble circuit 157, and descramble circuit 159 in FIG. 33 execute processes for respective bytes. If 1-byte data before modulation is modulated according to the (d, k; m, n) modulation rule (which means RLL(d, k) of m/n modulation in the above description method), the modulated length is:

$$8n+m \tag{11}$$

Therefore, when the data processing unit in these circuits is converted into a processing unit after modulation, since the processing unit of modulated sync frame data 106 is given by formula (11), the data size (channel bit size) of a sync code must be set to be an integer multiple of formula (11) upon aiming at integration of processes between the sync code and modulated sync frame data. Hence, a large characteristic feature of the embodiment of the present invention lies in that the size of sync code 110 is set to be:

$$8Nn+m \tag{12}$$

to assure integration of processes between sync code 110 and modulated sync frame data 106. (N in formula (12) means an integer value.)

Since the embodiment of the present invention has been explained so far using:

d=1, k=9, m=4, n=6 when these values are substituted in formula (12), the total data size of sync code 110 is:

$$12N \tag{13}$$

Since the sync code size of the existing DVD is 32 channel bits, the processes are simplified and the reliability of position detection/information identification can be improved by setting the total data size of the sync code to be smaller than 32 channel bits in the embodiment of the present invention. Therefore, in the embodiment of the present invention, the total data size of the sync code is set to be 24 channel bits, as shown in FIG. 15.

FIG. 34 is a block diagram for explaining the detailed structure associated with peripheral units of sync code position detection unit 145 shown in FIG. 33.

Figure 35:
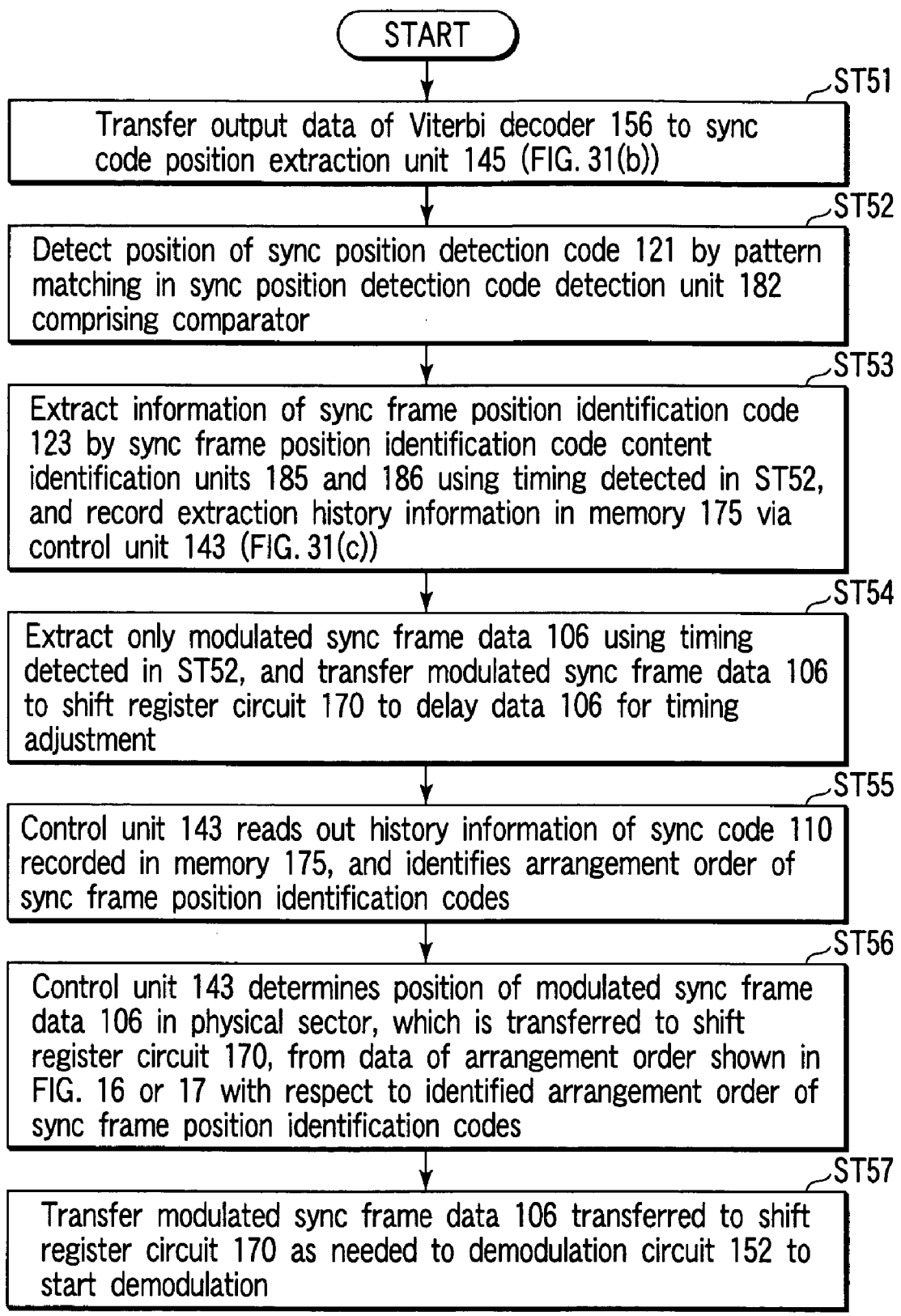
FIG. 35 is a flow chart for explaining an example of the method of determining the sync frame position in a sector from the allocation order of three successive sync codes.

FIG. 35 is a flow chart for explaining an example of the method of determining the sync frame position in a sector from the order of three successive sync codes. Output data of Viterbi decoder 156 in FIG. 33 shown in (b) of FIG. 31 is transferred to sync code position detection unit 145 (ST51 in FIG. 35), which detects the positions of sync codes 110 (ST52 in FIG. 35). After that, detected sync codes 110 are sequentially stored in memory 175, as shown in (c) of FIG. 31, via control unit 143 (ST53 in FIG. 35). If the positions of sync codes 110 are detected, only modulated sync frame data 106 can be extracted from the data output from Viterbi decoder 156, and can be transferred to shift register circuit 170 (ST54 in FIG. 35). Control unit 143 reads out history information of sync codes 110 recorded in memory 175 to identify the order of sync frame position identification codes (ST55 in FIG. 35). Control unit 143 then determines the position of modulated sync frame data 106 in a physical sector, which is temporarily saved in shift register circuit 170 (ST56 in FIG. 35).

For example, the position can be determined as follows. If the sync codes are saved in memory 175 in the order of "SY0→SY1→SY1", as shown in FIG. 31, "modulated sync frame data allocated immediately after latest sync frame number=02" is present immediately after last "SY0"; if the sync codes are saved in the order of "SY3→SY1→SY2", "modulated sync frame data allocated immediately after latest sync frame number=12" is present immediately after last "SY2".

In this way, if the position in a sector is determined and it is confirmed that modulated sync frame data 106 at a desired position is input to shift register circuit 170, that data is transferred to demodulation circuit 152 to start demodulation (ST57 in FIG. 35).

Figure 36:
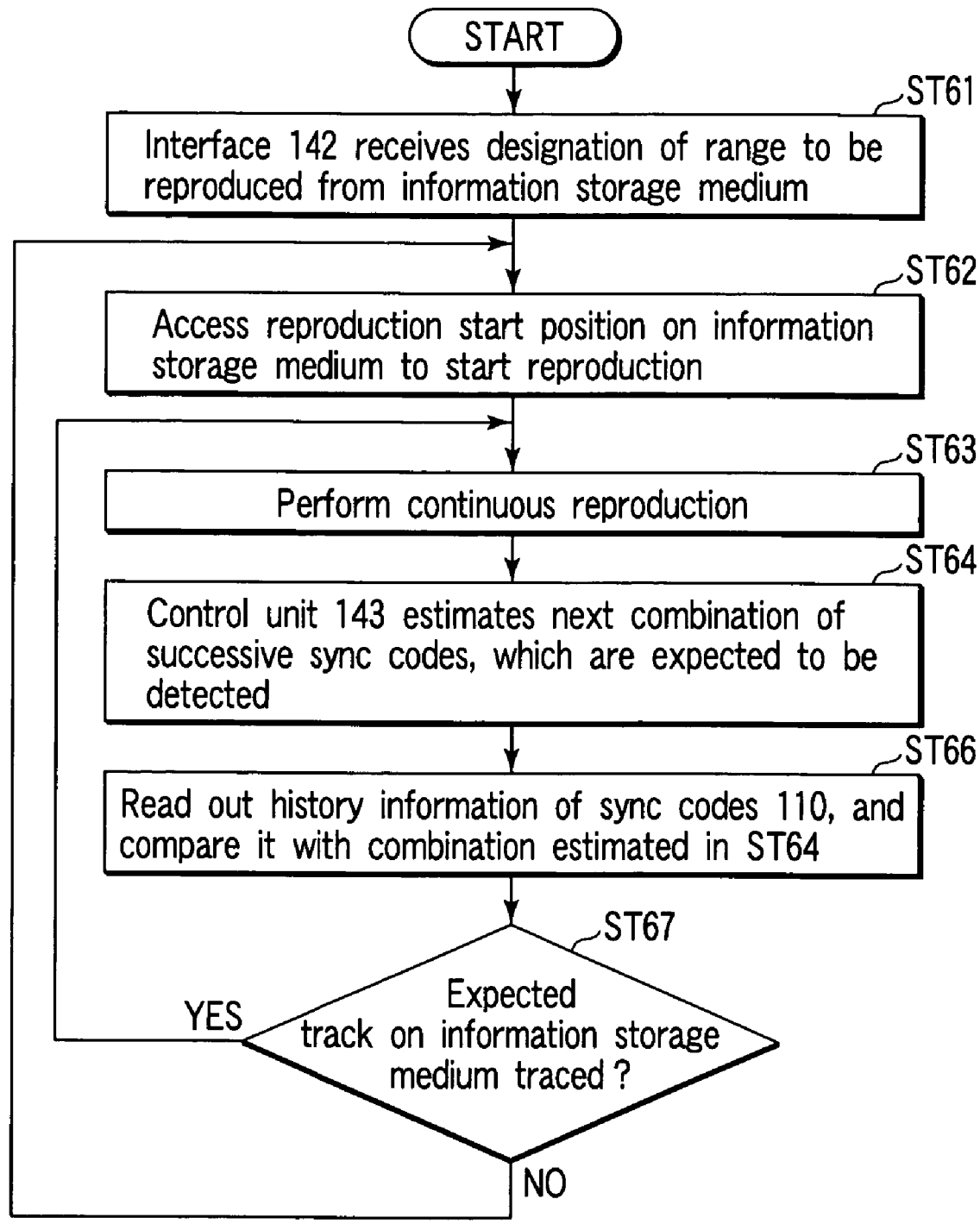
FIG. 36 is a flow chart for explaining an example of the method of detecting any abnormality (tracking error or the like) from the allocation order of a plurality of sync codes in the information recording/reproduction apparatus according to the embodiment of the present invention.
Figure 37:
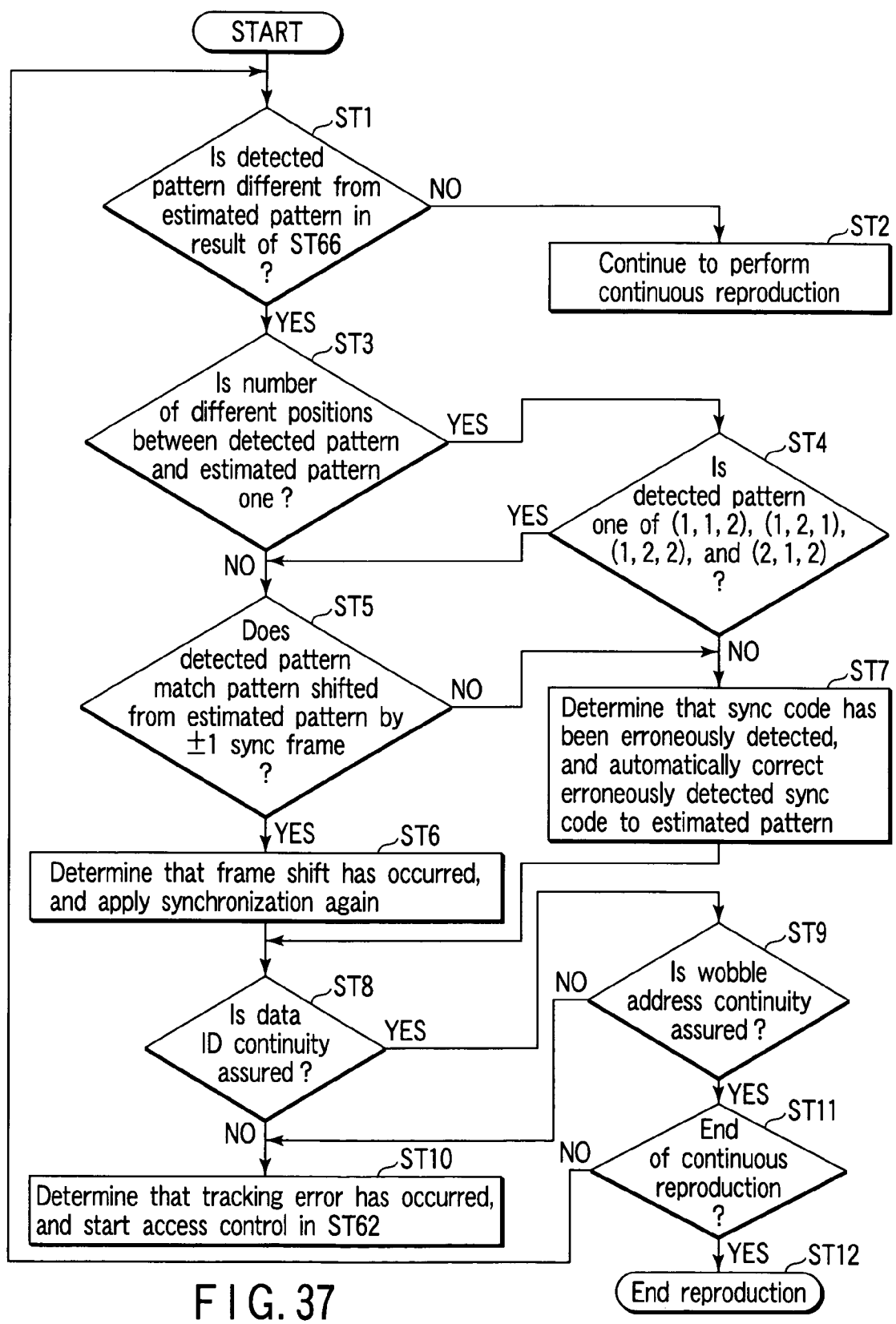
FIG. 37 is a flow chart for explaining an example of the method of determining any abnormal phenomenon and taking an appropriate measure when the detection result of a combination pattern of sync codes is different from an expected pattern.

FIG. 36 is a flow chart for explaining an example of the method of detecting any abnormality (tracking error or the like) from the order of a plurality of sync codes in the information recording/reproduction apparatus according to the embodiment of the present invention. FIG. 37 is a flow chart for explaining an example of the method of determining any abnormal phenomenon and taking a corresponding measure when the detection result of a combination pattern of sync codes is different from an expected pattern.

The abnormality detection method using the detection result of a combination pattern of sync codes upon continuous reproduction will be described below using FIG. 36. As shown in ST64, the next combination pattern of sync codes, which are expected to be detected, is estimated in advance in control unit 143, and is compared with an actually detected combination pattern of sync codes (ST66). If the comparison result indicates a mismatch, it is detected that some abnormality has occurred.

FIG. 37 shows a phenomenon estimation method and measures when the detected combination pattern of sync codes is different from the previously estimated pattern. In the embodiment of the present invention, a pattern is estimated using the relationship explanatory view shown in FIG. 18. A characteristic feature of the process in FIG. 37 lies in that whether or not "the number of positions where the detected combination pattern of sync codes is different from the previously estimated pattern is one" is determined (ST3).

If the number of different positions is only one, and if the detected pattern is one of (1, 1, 2), (1, 2, 1), (1, 2, 2), and (2, 1, 2), it is more likely that "frame shift" has occurred; otherwise, it is determined that "a sync code is erroneously detected".

Based on the determination result, if "frame shift" has occurred, synchronization is made again (ST6); or if "a sync code is erroneously detected", a process for automatically correcting the erroneously detected sync code in correspondence with the previously estimated pattern is executed (ST7).

Parallel to the above process, continuity of data IDs is checked (ST8), and continuity of wobble addresses is checked. Also, a tracking error is detected (ST9), and a measure upon detection of any tracking error is taken (ST10).

0] Point List of Embodiment of Present Invention

Prior to the description of the embodiment of the present invention, a large variety of points of the embodiment of the present invention, which are required to achieve the aforementioned objects of the present invention, will be summarized below.

In the following description, the contents of major points of the invention are classified using alphabetical letters, the devise contents (points of the embodiment of the present invention at middle level) required to implement the respective major points of the invention are summarized using "○ marks", and the detailed contents of the invention required to implement these contents are described using "☆ marks", thus hierarchically summarizing the point contents of the invention.

In the following description of the embodiment, corresponding alphabetical letters in parentheses are described in places corresponding to the points of the invention.

0-1) Point List of Embodiment of Present Invention

Point A) As shown in FIGS. 1 and 2, file or directory (folder) separation allows separated management of the conventional SD (Standard Definition) object file and its management files, and the HD (High Definition) object file and its management file on the information storage medium;

Point B) 4-bit expression of sub-picture information and compression rules (FIGS. 4A to 4D);

Point C) A plurality of different types of recording formats can be set on a read-only information storage medium (FIGS. 20A and 20B);

◇ In case of (not so important) contents which can be free to be copied again and again;

... A structure that successively records data without any gaps for respective segments is adopted;

◇ In case of important contents which are to be copy-protected;

... A structure which can separately allocate data for respective segments on the information storage medium and can record "identification information of a read-only information storage medium", "copy control information", "encryption key-related information", "address information", and the like in a gap (between neighboring segments) is adopted. In this way, contents protection and high-speed access in the information storage medium can be assured;

○ A common format must be used in a single disc (the format cannot be changed from the middle of the disc);

○ Two different formats are allowed to be used in a single disc together in accordance with the contents to be recorded;

○ Both the two formats locally have a common format area (the contents of this area are read upon startup);

○ Format identification flag information (whether or not two formats are locally included) of a DVD-ROM is recorded on a disc;

☆ The format identification flag information is recorded in the common format area;

☆ The format identification flag information is recorded in a recordable area;

Point D) ECC block structure using product codes (FIGS. 11 and 12);

As shown in FIGS. 11 and 12, the embodiment of the present invention adopts a structure in which data to be recorded on the information storage medium are two-dimensionally allocated, and PI (Parity in) and PO (Parity out) are respectively appended in the row and column directions as appending bits for error correction.

○ One error correction unit (ECC block) is formed of 32 sectors;

As shown in FIG. 12, the embodiment of the present invention adopts a structure that forms an ECC block by arranging 32 sectors from "0th sector" to "31st sector" in turn in the column direction;

Point E) A single sector is segmented into a plurality of units, and segmented units form different product codes (small ECC blocks);

As shown in FIG. 12, intra-sector data are alternately arranged every 172 bytes in right and left blocks, and independently form right and left groups (data which belong to each of the right and left groups are interleaved in a "staggered" pattern). The segmented right and left groups are collected for 32 sectors to form right and left small ECC blocks. In FIG. 12, for example, "2-R" means a sector number and right/left group identification symbol (e.g., second right-side data). (L in FIG. 12 indicates the left side.)

○ Data in a single sector are interleaved (to be alternately included in different groups at equal intervals) so as to belong to different small ECC blocks for respective groups;

Point F) A plurality of different sync frame structures are specified depending on sectors which form an ECC block;

A characteristic feature lies in that the sync frame structure is changed, as shown in FIGS. 14A and 14B, depending on whether the sector numbers of sectors which form one ECC block are even or odd numbers. That is, a structure that alternately inserts data of different PO groups for respective sectors (FIG. 13) is adopted;

○ PO interleave/insertion positions have different structures in right and left blocks (FIG. 13);

Point G) The segment division structure in ECC block (FIG. 30)

Point H) The guard area allocation structure between neighboring ECC blocks (FIG. 23);

○ Different data contents are used among the read-only, additionally recordable, and rewritable media (→ used in identification);

○ A random signal is used in a DVD-ROM header;

Point I) Guard areas are recorded to partially overlap each other in the recording format for a recordable information storage medium;

As shown in FIG. 29, front and rear guard areas 521 and 527 overlap each other to form overlapping portions 541 and 542 upon rewriting;

Point J) By devising the allocation, the number of code changes upon shifting a combination of three successive sync codes is set to be two or more (FIGS. 16 to 18);

○ Even in the allocation in which the sector structures without any guard areas are repeated, it is devised to set the number of code changes to be two or more;

○ Even when the sector structures are allocated to sandwich guard areas between them, it is devised to set the number of code changes to be two or more;

Point K) Conditions are attached to the address number assignment method to address information (especially, segment address information);

○ An address number starts from "1" in place of "0" with which all bits assume identical values;

○ An address number in which three or more "1"s or "0"s successively appear is set as a missing number;

Point L) Address information is recorded by L/G recording+wobble modulation (FIG. 26);

Point M) Unstable bits are also distributed and allocated on groove area;

Point N) Unstable bits are distributed and allocated on both lands and grooves by L/G recording+wobble modulation;

Point O) L/G recording adopts 180° (±90°) wobble phase modulation (FIG. 25);

Point P) Gray codes or special track codes are adopted for track addresses (FIGS. 27 and 28).

<Effects A According to Embodiment of Invention>

<Large Capacity Suited to High-Quality Video is Guaranteed, and Access Reliability to High-Quality Video is Improved>

(1) When an HD video is to be recorded on an information storage medium by file or folder separation from a conventional SD video, the recording capacity of the information storage medium must be increased since the HD video has a high resolution. L/G recording can increase the recording capacity compared to groove recording. Also, since no recording marks can be formed on prepit addresses, address information recording based on wobble modulation can assure higher recording efficiency than prepit addresses. Hence, "L/G recording+wobble modulation" can assure a largest recording capacity. In this case, since the track pitch becomes dense, the access reliability must be improved by realizing higher address detection performance. To solve the problem about generation of unstable bits in "L/G recording+wobble modulation", the frequency of occurrence of unstable bits is reduced by adopting gray codes or special track codes. In addition, additions, subtractions, Exclusive OR operations, and the like are made for respective bits to attain an error detection code appending process and scramble process while maintaining the gray code or special track code characteristics, thus greatly improving the address detection precision.

(2) Sub-picture information is required to have higher image quality in correspondence with that of a video to be recorded on an information storage medium. However, when sub-picture information is expressed by 4 bits in place of 2 bits in the conventional system, the data size to be recorded increases. Hence, the capacity of the information storage medium that records such information must be increased. L/G recording can increase the recording capacity compared to groove recording. Also, since no recording marks can be formed on prepit addresses, address information recording based on wobble modulation can assure higher recording efficiency than prepit addresses. Hence, "L/G recording+wobble modulation" can assure a largest recording capacity. In this case, since the track pitch becomes dense, the access reliability must be improved by realizing higher address detection performance. To solve the problem about generation of unstable bits in "L/G recording+wobble modulation", the frequency of occurrence of unstable bits is reduced by adopting gray codes or special track codes. In addition, additions, subtractions, Exclusive OR operations, and the like are made for respective bits to attain an error detection code appending process and scramble process while maintaining the gray code or special track code characteristics, thus greatly improving the address detection precision.

<Efficient Zone Segmentation is Allowed to Improve Recording Efficiency, and Large Capacity Suited to High-Image Quality Video is Guaranteed>

(3) When an HD video is to be recorded on an information storage medium by file or folder separation from a conventional SD video, the recording capacity of the information storage medium must be increased since the HD video has a high resolution. L/G recording can increase the recording capacity compared to groove recording. Also, since no recording marks can be formed on prepit addresses, address information recording based on wobble modulation can assure higher recording efficiency than prepit addresses. Hence, "L/G recording+wobble modulation" can assure a largest recording capacity. In case of L/G recording, the zone structure shown in FIG. 24 is adopted. If zones are allocated so that one round becomes an integer multiple of an ECC block, the recording efficiency suffers very much. By contrast, one ECC block is segmented into a plurality of (eight in the embodiment of the present invention) segments like in the embodiment of the present invention, and zones are allocated so that one round on the information storage medium becomes an integer multiple of a segment, thus assuring very high recording efficiency.

(4) Sub-picture information is required to have higher image quality in correspondence with that of a video to be recorded on an information storage medium. However, when sub-picture information is expressed by 4 bits in place of 2 bits in the conventional system, the data size to be recorded increases. Hence, the capacity of the information storage medium that records such information must be increased. L/G recording can increase the recording capacity compared to groove recording. Also, since no recording marks can be formed on prepit addresses, address information recording based on wobble modulation can assure higher recording efficiency than prepit addresses. Hence, "L/G recording+wobble modulation" can assure a largest recording capacity. In case of L/G recording, the zone structure shown in FIG. 24 is adopted. If zones are allocated so that one round becomes an integer multiple of an ECC block, the recording efficiency suffers very much. By contrast, one ECC block is segmented into a plurality of (eight in the embodiment of the present invention) segments like in the embodiment of the present invention, and zones are allocated so that one round on the information storage medium becomes an integer multiple of a segment, thus assuring very high recording efficiency.

<Protection of High-Image Quality Video, Identification of Medium Type, and Assurance of High Access Speed>

(5) When an HD video is to be recorded on an information storage medium by file or folder separation from a conventional SD video, the HD video has a high resolution, and it is demanded to strengthen protection of the HD video from illicit copies. As in the embodiment of the present invention, each ECC block is segmented into a plurality of segments, a read-only information storage medium has two different recording formats, and a header is recorded between neighboring segments for a high-image quality video, which is to be protected from illicit copies. Hence, format compatibility can be assured among read-only, additionally recordable, and rewritable media, and the medium type can be easily identified. Furthermore, since address information is recorded a plurality of number of times in a segment as a part of that identification information in an additionally recordable and rewritable media, a secondary effect, i.e., improvement of an access speed, can be provided.

(6) Sub-picture information is required to have higher image quality in correspondence with that of a video to be recorded on an information storage medium. It is demanded to strengthen protection of high-image quality sub-picture information, which is expressed by 4 bits in place of 2 bits in the conventional system, from illicit copies. As in the embodiment of the present invention, each ECC block is segmented into a plurality of segments, a read-only information storage medium has two different recording formats, and a header is recorded between neighboring segments for high-image quality sub-picture information, which is to be protected from illicit copies. Hence, format compatibility can be assured among read-only, additionally recordable, and rewritable media, and the medium type can be easily identified. Furthermore, since address information is recorded a plurality of number of times in a segment as a part of that identification information in an additionally recordable and rewritable media, a secondary effect, i.e., improvement of an access speed, can be provided.

<Even When Recording Density is Increased in Correspondence with High-Image Quality Video, Surface Scratches are Guaranteed to have Same Length as that on Existing Medium>

(7) When an HD video is to be recorded on an information storage medium by file or folder separation from a conventional SD video, the recording capacity of the information storage medium must be increased since the HD video has a high resolution. When the recording density increases, the influence range of a scratch with a given length formed on the surface of the information storage medium onto recording data relatively broadens. In the conventional DVD, one ECC block is formed of 16 sectors. By contrast, in the embodiment of the present invention, one ECC block is formed of 32 sectors twice those in the conventional DVD. In this way, even when the recording density is increased in correspondence with a high-image quality video, a scratch on the surface is guaranteed to have the same length as in the existing DVD. Furthermore, one ECC block is made up of two small ECC blocks, and data in one sector are distributed and allocated in two ECC blocks. Hence, data in one sector are substantially interleaved, thus reducing the influence of longer scratches and burst errors.

(8) Sub-picture information is required to have higher image quality in correspondence with that of a video to be recorded on an information storage medium. However, when sub-picture information is expressed by 4 bits in place of 2 bits in the conventional system, the data size to be recorded increases. Hence, the capacity of the information storage medium that records such information must be increased. When the recording density increases, the influence range of a scratch with a given length formed on the surface of the information storage medium onto recording data relatively broadens. In the conventional DVD, one ECC block is formed of 16 sectors. By contrast, in the embodiment of the present invention, one ECC block is formed of 32 sectors twice those in the conventional DVD. In this way, even when the recording density is increased in correspondence with a high-image quality video, a scratch on the surface is guaranteed to have the same length as in the existing DVD. Furthermore, one ECC block is made up of two small ECC blocks, and data in one sector are distributed and allocated in two ECC blocks. Hence, data in one sector are substantially interleaved, thus reducing the influence of longer scratches and burst errors.

(9) When an HD video is to be recorded on an information storage medium by file or folder separation from a conventional SD video, the recording capacity of the information storage medium must be increased since the HD video has a high resolution. When the recording density increases, the influence range of a scratch with a given length formed on the surface of the information storage medium onto recording data relatively broadens. In the conventional DVD, one ECC block is formed of 16 sectors. By contrast, in the embodiment of the present invention, one ECC block is formed of 32 sectors twice those in the conventional DVD. In this way, even when the recording density is increased in correspondence with a high-image quality video, a scratch on the surface is guaranteed to have the same length as in the existing DVD. Furthermore, one ECC block is made up of two small ECC blocks, and PO data which belong to different small ECC blocks are inserted for respective sectors in the embodiment of the present invention. Hence, PO data in small ECC blocks are interleaved (distributed and allocated) in every other sectors, thus improving the reliability of PO data against scratches, and allowing a high-precision error correction process.

(10) Sub-picture information is required to have higher image quality in correspondence with that of a video to be recorded on an information storage medium. However, when sub-picture information is expressed by 4 bits in place of 2 bits in the conventional system, the data size to be recorded increases. Hence, the capacity of the information storage medium that records such information must be increased. When the recording density increases, the influence range of a scratch with a given length formed on the surface of the information storage medium onto recording data relatively broadens. In the conventional DVD, one ECC block is formed of 16 sectors. By contrast, in the embodiment of the present invention, one ECC block is formed of 32 sectors twice those in the conventional DVD. In this way, even when the recording density is increased in correspondence with a high-image quality video, a scratch on the surface is guaranteed to have the same length as in the existing DVD. Furthermore, one ECC block is made up of two small ECC blocks, and PO data which belong to different small ECC blocks are inserted for respective sectors in the embodiment of the present invention. Hence, PO data in small ECC blocks are interleaved (distributed and allocated) in every other sectors, thus improving the reliability of PO data against scratches, and allowing a high-precision error correction process.

<Full Compatibility Between Read-Only and Additionally Recordable Media are Assured, and Additional Recording Process in Smaller Units is Allowed>

(11) In the conventional DVD-R or DVD-RW, it is impossible to execute an additional recording/rewrite process in small units. If a restricted overwrite process is executed to forcedly attain such process, already recorded information is partially destroyed. As in the embodiment of the present invention, a plurality of different recording formats can be set for a read-only medium, and the read-only medium can adopt a recording structure having a header between segments segmented in an ECC block. Hence, full compatibility between read-only and additionally recordable media can be assured. Furthermore, since an additional recording/rewrite process can be done from the middle of this header, information in the already recorded segment can be prevented from being destroyed by the additional recording/rewrite process. At the same time, since guard areas are recorded to locally overlap each other in this header in the additional recording/rewrite process, a gap area where no recording mark is present can be prevented from being formed in the header. Hence, the influence of crosstalk between two layers due to this gap area can be removed, and a problem of interlayer crosstalk in a single-sided, dual-recording layer medium can be simultaneously solved.

<Settled Address Information Allocation Frequency is Increased to Assure High Access Speed>

(12) In the embodiment of the present invention, unstable bits can be estimated using even/odd identification information of track numbers, but are not definitely settled since they are merely estimated. By contrast, track information can be detected with very high precision from a portion which has no unstable bits and is appended with an error detection code. For this reason, in the embodiment of the present invention, unstable bits are also allocated on the groove area, and are distributed and allocated on both the land and groove areas, thus forming a portion which has no unstable bits and is appended with an error detection code in the land area. However, since unstable bits are distributed and allocated on both the land and groove areas, the allocation frequency of track number information 611 and 612 having no unstable bits relatively lowers. By contrast, since the embodiment of the present invention adopts a structure that allocates address information a plurality of number of times in a segment, the allocation frequency of portions which have no unstable bits and are appended with error detection codes can be increased on both the land and groove areas, thus improving the address information reproduction precision and assuring high access speed.

<Improve Wobble Address Read Precision>

(13) When the frequency of inversion of wobbles at the boundary ("triangle mark" position) between neighboring 1-bit address areas 511 is increased, as shown in FIG. 25, the wobble address read precision can be improved. For this purpose, "000000" is excluded from values that segment address information can assume to increase the frequency of inversion of wobbles. In addition, a data scramble process is applied to increase the frequency of inversion of wobbles at the boundary ("triangle mark" position) between neighboring 1-bit address areas 511. At this time, if a long run of "0"s appears in scramble seed information, the effect of increasing the frequency of inversion of wobbles upon applying the data scramble process is hardly obtained. Therefore, "000000" is excluded from values that segment address information can assume to increase the frequency of occurrence of "1" in seed information, thus promoting the effect of increasing frequency of inversion of wobbles upon applying the data scramble process.

<Track Number Reproduction Precision on Land is Improved Since Track Number can be Reliably Reproduced Even on Land>

(14) In the embodiment of the present invention, unstable bits can be estimated using even/odd identification information of track numbers, but are not definitely settled since they are merely estimated. By contrast, track information can be detected with very high precision from a portion which has no unstable bits and is appended with an error detection code. For this reason, in the embodiment of the present invention, unstable bits are also allocated on the groove area, and are distributed and allocated on both the land and groove areas, thus forming a portion which has no unstable bits and is appended with an error detection code in the land area. As a result, the track number can be read with high reproduction precision even on the lands, and high access stability and speed on the land portion can be assured.

<Unstable Bits can be Distributed and Allocated on Groove and Land Areas by Very Simple Method>

(15) Since the embodiment of the present invention adopts ±90° wobble phase modulation, unstable bits can be distributed and allocated on the groove and land areas by a very simple method, i.e., exposure amount modulation of focused beam spot 3 used to form the groove area, or relative position change between two focused beam spots. For this reason, a conventional master disc recording apparatus used to generate information storage media can practice this invention. Since an existing apparatus can be used to practice the invention, inexpensive information storage media can be manufactured without any new equipment.

<Reproduction Precision (Reliability) of Wobble Address Information can be Greatly Improved>

(16) In the embodiment of the present invention, since both the EDC code generation process and data scramble process can be attained within the range of one of "addition operations", "subtraction operations", and "Exclusive OR" operations with arbitrary data for respective bits or their combined operations, the reproduction precision (reliability) of wobble address information can be greatly improved by a very simple method (the frequency of appearance of wobble inversion position can be improved by error detection based on EDC and the scramble process, and a reproduction system can easily apply PLL). In addition, since a very small number of additional circuit components are required to implement such processes, an inexpensive information reproduction apparatus or information recording/reproduction apparatus can be provided.

<High Error Correction Performance is Assured by Preventing Unstable Bits from Vertically Lining up in ECC Block>

(17) Since a plurality of pieces of information regularly line up in the wobble address allocation area and track number information data allocation area, the positions of unstable bits vertically line up in the ECC block shown in FIG. 13, and the error correction performance in the ECC block impairs very much. In the embodiment of the present invention, the positions of unstable bits are shifted by various methods to prevent unstable bits from lining up vertically in the ECC block, thus assuring high error correction performance in the ECC block. As a result, the error rate (after correction) of reproduction information from recording marks recorded on the information storage medium is reduced, and high-precision reproduction is achieved.

<Reproduction Reliability of Wobble Address Information can be Improved by Very Simple, Inexpensive Method>

(18) The data scramble process can be applied by a simple circuit to increase the frequency of inversion of wobbles at the boundaries between neighboring address bit areas, thus facilitating detection of the boundary positions of address bit areas, and improving the reproduction reliability of wobble address information. In addition, a data scramble circuit to be used can be prepared with very low cost, and an inexpensive information reproduction apparatus or information recording/reproduction apparatus can be provided.

(19) The frequency of inversion of wobbles at the boundaries between neighboring address bit areas is consequently increased by changing pattern contents between two address areas, thus facilitating detection of the boundary positions of address bit areas, and improving the reproduction reliability of wobble address information.

<Even/Odd Identification Information of Track Number can be Allocated with High Detection Precision Without Any Influence on Recording Marks>

(20) Since even/odd identification information of track numbers is recorded as a physical shape change in place of a wobble-modulated data structure, very high detection precision of the even/odd identification information of track numbers can be assured. Since this even/odd identification information of track numbers is allocated in a header between neighboring segments, it has no influence on recording information based on recording marks recorded in respective segments. At the same time, this information can be used to determine the types of read-only, additionally recordable, and rewritable information storage media, and illicit copies of high-image quality video information and sub-picture information, which are to be protected from illicit copies, can be easily detected.

<Unstable Bits can be Estimated with High Precision>

(21) Since even/odd identification of track numbers is recorded as a physical shape change in place of a wobble-modulated data structure, very high detection precision of the even/odd identification of track numbers can be assured. For this reason, unstable bits can be estimated with relatively high precision with reference to the even/odd identification of track numbers, which can be detected with high precision.

<Address Number is Precisely Settled on Land Area Without Any Unstable Bit on Groove Area>

(22) In the embodiment of the present invention, unstable bits can be estimated using even/odd identification information of track numbers, but are not definitely settled since they are merely estimated. By contrast, track information can be detected with very high precision from a portion which has no unstable bits and is appended with an error detection code. The embodiment of the present invention progressively sets track number information in a zigzag pattern by L/G recording. In this way, a portion which has no unstable bits and is appended with an error detection code and in which an address number is settled accurately can be set on the land area without any unstable bits on the groove area. As a result, not only a track number can be settled with high precision even on the land area, but also a relatively high access speed can be assured (since the address number is settled early).

<Address Number can be Settled Easily and Quickly on Both Lands and Grooves>

(23) Since address settlement/estimation areas are determined in advance on both the lands and grooves, the address settlement area and address estimation area can be quickly detected, and corresponding address number information settlement and estimation processes can be executed. Hence, not only the address information reproduction process method is facilitated, but also a relatively high-speed access process can be attained since the address number can be settled quickly.

<Recording Mark Reproduction Reliability in Segment>

(24) In the present invention, each ECC block is segmented into a plurality of segments, headers are allocated between neighboring segments, and track address information is allocated in each header. As a result, when wobble-modulated address information is recorded by L/G recording, unstable bits can be prevented from mixing into the segment areas, and a high-quality reproduction signal can be obtained from recording marks in the segment areas. Hence, high reproduction reliability from recording marks can be assured.

To summarize the above effects, an information storage medium, which can display "high-definition" main picture information and high-image quality sub-picture information, can assure a large capacity, can assure high format compatibility, can assure high reliability of the PC data additional recording or rewrite process and address information reproduction process, can improve the reference clock extraction precision from wobble signals, can guarantee high-speed access, and can guarantee expandability to the single-sided, dual-recording layer structure, and an information reproduction apparatus which can stably reproduce data from that information storage medium or an information recording/reproduction apparatus which can stably record data on that information storage medium can be provided.

<Effects B According to Embodiment of Invention>

Effects obtained by combinations of various embodiments and/or their arrangements of the present invention will be described below with reference to FIG. 38. In FIG. 38, ○ marks indicate principal unique effects, and Δ marks indicate additional (secondary) effects. Also, <1> to <15> in FIG. 38 correspond to the following item numbers <1> to <15>.

<<Large Capacity Suited to High-Quality Video is Guaranteed, and Access Reliability to High-Quality Video Improves>>

<1> When an HD video is to be recorded on an information storage medium by file or folder separation from a conventional SD video, the recording capacity of the information storage medium must be increased since the HD video has a high resolution. L/G recording can increase the recording capacity compared to groove recording. Also, since no recording marks can be formed on prepit addresses, address information recording based on wobble modulation can assure higher recording efficiency than prepit addresses. Hence, "L/G recording+wobble modulation" is most effective to increase the recording capacity. In this case, since the track pitch becomes dense, the access reliability must be improved by realizing higher address detection performance.

To solve the problem about generation of unstable bits in "L/G recording+wobble modulation", the frequency of occurrence of unstable bits is reduced by adopting gray codes or special track codes, so as to greatly improve the address detection precision. Also, since the combinations of sync codes are devised to allow automatic correction of an erroneously detected sync code, the position detection precision in a sector using sync codes can be dramatically improved, thus improving the reliability and speed of access control.

<2> Sub-picture information is required to have higher image quality in correspondence with that of a video to be recorded on an information storage medium. However, when sub-picture information is expressed by 4 bits in place of 2 bits in the conventional system, the data size to be recorded increases. Hence, the capacity of the information storage medium that records such information must be increased. L/G recording can increase the recording capacity compared to groove recording. Also, since no recording marks can be formed on prepit addresses, address information recording based on wobble modulation can assure higher recording efficiency than prepit addresses. Hence, "L/G recording+wobble modulation" is most effective to increase the recording capacity. In this case as well, since the track pitch becomes dense, the access reliability must be improved by realizing higher address detection performance.

To solve the problem about generation of unstable bits in "L/G recording+wobble modulation", the frequency of occurrence of unstable bits is reduced by adopting gray codes or special track codes, so as to greatly improve the address detection precision. Also, the position detection precision in a sector using sync codes can be dramatically improved, thus improving the reliability and speed of access control.

<<Efficient Zone Segmentation is Allowed to Improve Recording Efficiency, and Large Capacity Suited to High-Image Quality Video is Guaranteed>>

<3> When an HD video is to be recorded on an information storage medium by file or folder separation from a conventional SD video, the recording capacity of the information storage medium must be increased since the HD video has a high resolution. L/G recording can increase the recording capacity compared to groove recording. Also, since no recording marks can be formed on prepit addresses, address information recording based on wobble modulation can assure higher recording efficiency than prepit addresses. Hence, "L/G recording+wobble modulation" is most effective to increase the recording capacity. In case of L/G recording, the zone structure shown in FIG. 24 is adopted. If zones are allocated so that one round becomes an integer multiple of an ECC block, the recording efficiency impairs very much. By contrast, one ECC block is segmented into a plurality of (seven in the embodiment of the present invention) segments like in the embodiment of the present invention, and zones are allocated so that one round on the information storage medium becomes an integer multiple of a segment, thus assuring very high recording efficiency.

<4> Sub-picture information is required to have higher image quality in correspondence with that of a video to be recorded on an information storage medium. However, when sub-picture information is expressed by 4 bits in place of 2 bits in the conventional system, the data size to be recorded increases. Hence, the capacity of the information storage medium that records such information must be increased. L/G recording can increase the recording capacity compared to groove recording. Also, since no recording marks can be formed on prepit addresses, address information recording based on wobble modulation can assure higher recording efficiency than prepit addresses. Hence, "L/G recording+wobble modulation" is most effective to increase the recording capacity. In case of L/G recording, the zone structure shown in FIG. 24 is adopted. If zones are allocated so that one round becomes an integer multiple of an ECC block, the recording efficiency impairs very much. By contrast, one ECC block is segmented into a plurality of (seven in the embodiment of the present invention) segments like in the embodiment of the present invention, and zones are allocated so that one round on the information storage medium becomes an integer multiple of a segment, thus assuring very high recording efficiency.

<<Protection of High-Image Quality Video, and Identification of Medium Type>>

<5> When an HD video is to be recorded on an information storage medium by file or folder separation from a conventional SD video, the HD video has a high resolution, and it is demanded to strengthen protection of the HD video from illicit copies. As in the embodiment of the present invention, each ECC block is segmented into a plurality of segments, a read-only information storage medium has two different recording formats, and guard areas are provided between neighboring segments for a high-image quality video, which is to be protected from illicit copies. Hence, format compatibility can be assured among read-only, additionally recordable, and rewritable media, and the medium type can be easily identified.

<6> Sub-picture information is required to have higher image quality in correspondence with that of a video to be recorded on an information storage medium. It is demanded to strengthen protection of high-image quality sub-picture information, which is expressed by 4 bits in place of 2 bits in the conventional system, from illicit copies. As in the embodiment of the present invention, each ECC block is segmented into a plurality of segments, a read-only information storage medium has two different recording formats, and guard areas are provided between neighboring segments for high-image quality sub-picture information, which is to be protected from illicit copies. Hence, format compatibility can be assured among read-only, additionally recordable, and rewritable media, and the medium type can be easily identified.

<<Even when Recording Density is Increased in Correspondence with High-Image Quality Video, Surface Scratches are Guaranteed to have Same Length as that on Existing Medium>>

<7> When an HD video is to be recorded on an information storage medium by file or folder separation from a conventional SD video, the recording capacity of the information storage medium must be increased since the HD video has a high resolution. When the recording density increases, the influence range of a scratch with a given length formed on the surface of the information storage medium onto recording data relatively broadens. In the conventional DVD, one ECC block is formed of 16 sectors. By contrast, in the embodiment of the present invention, one ECC block is formed of 32 sectors twice those in the conventional DVD. In this way, even when the recording density is increased in correspondence with a high-image quality video, a scratch on the surface is guaranteed to have the same length as in the existing DVD. Furthermore, one ECC block is made up of two small ECC blocks, and data in one sector are distributed and allocated in two ECC blocks. Hence, data in one sector are substantially interleaved, thus reducing the influence of longer scratches and burst errors.

In the conventional DVD standard, when a sync code is erroneously detected due to scratches formed on the surface of the information storage medium, a frame shift occurs to considerably deteriorate the error correction performance in an ECC block. By contrast, in the embodiment of the present invention, when a sync code is erroneously detected due to scratches formed on the surface of the information storage medium, such detection error can be distinguished from a frame shift. Hence, not only any frame shift can be prevented, but also the erroneously detected sync code can be automatically corrected as in ST7 in FIG. 37. For this reason, the detection precision and stability of sync codes can be greatly improved. As a result, the error correction performance of each ECC block can be prevented from deteriorating, and error correction with high precision and reliability can be achieved.

<8> Sub-picture information is required to have higher image quality in correspondence with that of a video to be recorded on an information storage medium. However, when sub-picture information is expressed by 4 bits in place of 2 bits in the conventional system, the data size to be recorded increases. Hence, the capacity of the information storage medium that records such information must be increased. When the recording density increases, the influence range of a scratch with a given length formed on the surface of the information storage medium onto recording data relatively broadens. In the conventional DVD, one ECC block is formed of 16 sectors. By contrast, in the embodiment of the present invention, one ECC block is formed of 32 sectors twice those in the conventional DVD. In this way, even when the recording density is increased in correspondence with a high-image quality video, a scratch on the surface is guaranteed to have the same length as in the existing DVD. Furthermore, one ECC block is made up of two small ECC blocks, and data in one sector are distributed and allocated in two ECC blocks. Hence, data in one sector are substantially interleaved, thus reducing the influence of longer scratches and burst errors.

In the conventional DVD standard, when a sync code is erroneously detected due to scratches formed on the surface of the information storage medium, a frame shift occurs to considerably deteriorate the error correction performance in an ECC block. By contrast, in the embodiment of the present invention, when a sync code is erroneously detected due to scratches formed on the surface of the information storage medium, such detection error can be distinguished from a frame shift. Hence, not only any frame shift can be prevented, but also the erroneously detected sync code can be automatically corrected as in ST7 in FIG. 37. For this reason, the detection precision and stability of sync codes can be greatly improved. As a result, the error correction performance of each ECC block can be prevented from deteriorating, and error correction with high precision and reliability can be achieved.

<9> When an HD video is to be recorded on an information storage medium by file or folder separation from a conventional SD video, the recording capacity of the information storage medium must be increased since the HD video has a high resolution. When the recording density increases, the influence range of a scratch with a given length formed on the surface of the information storage medium onto recording data relatively broadens. In the conventional DVD, one ECC block is formed of 16 sectors. By contrast, in the embodiment of the present invention, one ECC block is formed of 32 sectors twice those in the conventional DVD. In this way, even when the recording density is increased in correspondence with a high-image quality video, a scratch on the surface is guaranteed to have the same length as in the existing DVD. Furthermore, one ECC block is made up of two small ECC blocks, and PO data which belong to different small ECC blocks are inserted for respective sectors in the embodiment of the present invention. Hence, PO data in small ECC blocks are interleaved (distributed and allocated) in every other sectors, thus improving the reliability of PO data against scratches, and allowing a high-precision error correction process.

In the conventional DVD standard, when a sync code is erroneously detected due to scratches formed on the surface of the information storage medium, a frame shift occurs to considerably deteriorate the error correction performance in an ECC block. By contrast, in the embodiment of the present invention, when a sync code is erroneously detected due to scratches formed on the surface of the information storage medium, such detection error can be distinguished from a frame shift. Hence, not only any frame shift can be prevented, but also the erroneously detected sync code can be automatically corrected as in ST7 in FIG. 37. For this reason, the detection precision and stability of sync codes can be greatly improved. As a result, the error correction performance of each ECC block can be prevented from deteriorating, and error correction with high precision and reliability can be achieved.

<10> Sub-picture information is required to have higher image quality in correspondence with that of a video to be recorded on an information storage medium. However, when sub-picture information is expressed by 4 bits in place of 2 bits in the conventional system, the data size to be recorded increases. Hence, the capacity of the information storage medium that records such information must be increased. When the recording density increases, the influence range of a scratch with a given length formed on the surface of the information storage medium onto recording data relatively broadens. In the conventional DVD, one ECC block is formed of 16 sectors. By contrast, in the embodiment of the present invention, one ECC block is formed of 32 sectors twice those in the conventional DVD. In this way, even when the recording density is increased in correspondence with a high-image quality video, a scratch on the surface is guaranteed to have the same length as in the existing DVD. Furthermore, one ECC block is made up of two small ECC blocks, and PO data which belong to different small ECC blocks are inserted for respective sectors in the embodiment of the present invention. Hence, PO data in small ECC blocks are interleaved (distributed and allocated) in every other sectors, thus improving the reliability of PO data against scratches, and allowing a high-precision error correction process.

In the conventional DVD standard, when a sync code is erroneously detected due to scratches formed on the surface of the information storage medium, a frame shift occurs to considerably deteriorate the error correction performance in an ECC block. By contrast, in the embodiment of the present invention, when a sync code is erroneously detected due to scratches formed on the surface of the information storage medium, such detection error can be distinguished from a frame shift. Hence, not only any frame shift can be prevented, but also the erroneously detected sync code can be automatically corrected as in ST7 in FIG. 37. For this reason, the detection precision and stability of sync codes can be greatly improved. As a result, the error correction performance of each ECC block can be prevented from deteriorating, and error correction with high precision and reliability can be achieved.

<<Full Compatibility Between Read-Only and Additionally Recordable Media are Assured, and Additional Recording Process in Smaller Units is Allowed>>

<11> In the conventional DVD-R or DVD-RW, it is impossible to execute an additional recording/rewrite process in small units. If a restricted overwrite process is executed to forcedly attain such process, already recorded information is partially destroyed. As in the embodiment of the present invention, a plurality of different recording formats can be set for a read-only medium, and the read-only medium can adopt a recording structure having guard areas between neighboring ECC blocks. Hence, full compatibility between read-only and additionally recordable media can be assured. Furthermore, since an additional recording/rewrite process can be done from the middle of this guard area, information in the already recorded segment can be prevented from being destroyed by the additional recording/rewrite process. At the same time, since guard areas are recorded to locally overlap each other in this guard area in the additional recording/rewrite process, a gap area where no recording mark is present can be prevented from being formed in the guard area. Hence, the influence of crosstalk between two layers due to this gap area can be removed, and a problem of interlayer crosstalk in a single-sided, dual-recording layer medium can be simultaneously solved.

<<Settlement Precision of Address Information is Improved to Assure High Access Speed>>

<12> Track information can be detected with very high precision from a portion which has no unstable bits and is appended with an error detection code. For this reason, in the embodiment of the present invention, unstable bits are also allocated on the groove area, and are distributed and allocated on both the land and groove areas. In this manner, a portion which has no unstable bits and is appended with an error detection code can be formed in the land area. As a result, the settlement precision of address information can be improved, and a constant access speed can be assured.

<<Improve Wobble Address Read Precision>>

<13> When the frequency of inversion of wobbles at the boundary ("black triangle mark" position) between neighboring 1-bit address areas 511 is increased, as shown in FIG.

25, the wobble address read precision can be improved. For this purpose, "000000" is excluded from values that segment address information can assume to increase the frequency of inversion of wobbles at the boundary ("black triangle mark" position) between neighboring 1-bit address areas 511. As a result, the boundary position detection precision of 1-address bit areas 511 can be improved, thus improving the read precision of wobble addresses.

<<Track Number Reproduction Precision on Land Improves Since Track Number can be Reliably Reproduced Even on Land>>

<14> Track information can be detected with very high precision from a portion which has no unstable bits and is appended with an error detection code. For this reason, in the embodiment of the present invention, unstable bits are also allocated on the groove area, and are distributed and allocated on both the land and groove areas. In this manner, a portion which has no unstable bits and is appended with an error detection code can be formed in the land area. As a result, the track number can be read with high reproduction precision even on the lands, and high access stability and speed on the land portion can be assured.

<<High Error Correction Performance is Assured by Preventing Unstable Bits from Vertically Lining up in ECC Block>>

<15> Since the number of sectors=32 and the number of segments=7 which form an ECC block have an indivisible relationship (non-multiple relationship), the head positions of segments in the ECC block shown in FIG. 13 are allocated at shifted positions. In the wobble address format shown in FIG. 30, unstable bit 504 shown in FIG. 26 is more likely to mix in groove track information 606 and land track information 607. In this unstable bit area 504, since the groove or land width changes, the level of a reproduction signal from this area varies, thus causing errors. As in the embodiment of the present invention, since the number of sectors and the number of segments which form an ECC block have a non-multiple relationship, unstable bits can be prevented from vertically lining up in the ECC block shown in FIG. 13, in the same manner the head positions of the segments. In this manner, since the positions of unstable bits are shifted to prevent unstable bits from lining up vertically in the ECC block, high error correction performance in the ECC block can be assured. As a result, the error rate (after correction) of reproduction information from recording marks recorded on the information storage medium is reduced, and high-precision reproduction is achieved.

Furthermore, in the embodiment of the present invention, when a sync code is erroneously detected due to scratches formed on the surface of the information storage medium, such detection error can be distinguished from a frame shift. Hence, not only any frame shift can be prevented, but also the erroneously detected sync code can be automatically corrected as in ST7 in FIG. 37. For this reason, the detection precision and stability of sync codes can be greatly improved. As a result, the error correction performance of each ECC block can be prevented from deteriorating, and error correction with high precision and reliability can be achieved. In this way, unstable bits are prevented from vertically lining up in each ECC block to assure high error correction performance, and the sync code detection precision is improved to improve the location setting precision of frame data in each ECC block, thus further improving the error correction performance (preventing error correction performance drop) by the synergistic action (synergistic effect) of them.

FIG. 38 summarizes the above effects <1> to <15>.

As described above, according to the embodiment of the present invention, the sync code detection reliability can be improved while simplifying the sync code position detection process.

What is claimed is:

1. A sync frame structure for use with an information storage medium having an area being divided by sectors, wherein
    at least one of said sectors includes one or more sync frames,
    at least one of said sync frames includes a plurality of sync codes,
    with respect to an arrangement of the sync codes in the same sector, two or more sync codes are changed from a first pattern to a second pattern, and
    provided that the first pattern comprises a combination of successive three said sync codes, and that the second pattern is obtained by shifting the arrangement of the sync codes of said first pattern by one sync code.

2. The structure of claim 1, wherein
    with respect to an arrangement of the sync codes in the same sector, a previous pattern comprising a combination of previous successive sync codes is provided, said previous pattern being configured to be used for detecting a frame shift in the sync frame, or for detecting an erroneous sync code detection.

3. The structure of claim 1, wherein
    said area being divided by the sectors includes ECC blocks each of which may serve as a unit of writing or re-writing,
    a guard area is provided between successive two of said ECC blocks formed on the information storage medium, and
    one of said sync codes is provided at a leading portion of said guard area.

4. The information storage medium as defined in claim 1, wherein digital information is recorded in the area being divided by said sectors.

* * * * *